United States Patent
Kang et al.

(10) Patent No.: US 11,157,577 B2
(45) Date of Patent: *Oct. 26, 2021

(54) METHOD FOR SEARCHING AND DEVICE THEREOF

(71) Applicant: SAMSUNG ELECTRONICS CO., LTD., Suwon-si (KR)

(72) Inventors: Woo-shik Kang, Suwon-si (KR); Min-Jeong Kang, Suwon-si (KR); Won-Keun Kong, Suwon-si (KR); Ga-hyun Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,305

(22) Filed: Jul. 19, 2019

(65) Prior Publication Data

US 2019/0340209 A1    Nov. 7, 2019

Related U.S. Application Data

(63) Continuation of application No. 16/250,508, filed on Jan. 17, 2019, which is a continuation of application
(Continued)

(30) Foreign Application Priority Data

May 23, 2014  (KR) .................. 10-2014-0062568
Nov. 27, 2014  (KR) .................. 10-2014-0167818

(51) Int. Cl.
*G06F 16/9535*  (2019.01)
*G06F 16/432*  (2019.01)
(Continued)

(52) U.S. Cl.
CPC ........ *G06F 16/9535* (2019.01); *G06F 16/433* (2019.01); *G06F 16/434* (2019.01);
(Continued)

(58) Field of Classification Search
None
See application file for complete search history.

(56) References Cited

U.S. PATENT DOCUMENTS

| 4,905,163 A | 2/1990 | Garber et al. |
| 5,864,630 A | 1/1999 | Cosatto et al. |

(Continued)

FOREIGN PATENT DOCUMENTS

| CN | 101794195 A | 8/2010 |
| CN | 102402593 A | 4/2012 |

(Continued)

OTHER PUBLICATIONS

Communication dated Jul. 25, 2019, issued by the Taiwanese Patent Office in counterpart Taiwanese Application No. 104116276.
(Continued)

*Primary Examiner* — Kim T Nguyen
(74) *Attorney, Agent, or Firm* — Sughrue Mion, PLLC

(57) ABSTRACT

Provided are a method and an apparatus for searching for and acquiring information under a computing environment. The apparatus includes: at least one input device configured to receive a first query input of a first query type and a second query input of a second query type; and a controller configured to output a query input window including a first display item corresponding to the first query input and a second display item corresponding to the second query input, to automatically switch, in response to receiving the first query input, the apparatus from a first state to receive the first query input of the first query type to a second state to receive the second query input of the second query type,
(Continued)

and to obtain a search result according to a query based on the first query input and the second query input.

21 Claims, 53 Drawing Sheets

Related U.S. Application Data

No. 15/986,374, filed on May 22, 2018, now Pat. No. 10,223,466, which is a continuation of application No. 14/588,275, filed on Dec. 31, 2014, now Pat. No. 9,990,433.

(51) Int. Cl.
  *G06F 16/732* (2019.01)
  *G06F 16/632* (2019.01)
  *G06F 16/532* (2019.01)

(52) U.S. Cl.
  CPC .......... *G06F 16/532* (2019.01); *G06F 16/634* (2019.01); *G06F 16/7328* (2019.01)

(56) References Cited

U.S. PATENT DOCUMENTS

| | | | |
|---|---|---|---|
| 6,012,030 A | 1/2000 | French-St. George et al. |
| 6,118,887 A | 9/2000 | Cosatto et al. |
| 6,118,888 A | 9/2000 | Chino et al. |
| 6,187,032 B1 | 2/2001 | Ohyu et al. |
| 6,463,426 B1* | 10/2002 | Lipson | G06K 9/6206 |
| 6,507,838 B1 | 1/2003 | Syeda-Mahmood |
| 6,553,345 B1 | 4/2003 | Kuhn et al. |
| 6,594,397 B1 | 7/2003 | Hu |
| 6,604,046 B1 | 8/2003 | Watermulen et al. |
| 6,728,752 B1 | 4/2004 | Chen et al. |
| 6,785,670 B1 | 8/2004 | Chiang et al. |
| 6,834,229 B2 | 12/2004 | Rafiah et al. |
| 6,885,977 B2 | 4/2005 | Gavra et al. |
| 6,895,407 B2 | 5/2005 | Romer et al. |
| 6,941,273 B1 | 9/2005 | Loghmani et al. |
| 6,987,866 B2 | 1/2006 | Hu |
| 7,028,269 B1 | 4/2006 | Cohen-Solal et al. |
| 7,047,169 B2 | 5/2006 | Pelikan et al. |
| 7,069,220 B2 | 6/2006 | Coffman et al. |
| 7,137,126 B1 | 11/2006 | Coffman et al. |
| 7,177,879 B2 | 2/2007 | Flank et al. |
| 7,254,384 B2 | 8/2007 | Gailey et al. |
| 7,283,973 B1 | 10/2007 | Longhmani et al. |
| 7,356,771 B2 | 4/2008 | Paul et al. |
| 7,457,825 B2 | 9/2008 | Li et al. |
| 7,505,568 B2 | 3/2009 | Simpson et al. |
| 7,519,589 B2 | 4/2009 | Charnock et al. |
| 7,539,619 B1 | 5/2009 | Seligman et al. |
| 7,555,478 B2 | 6/2009 | Bayley et al. |
| 7,583,671 B2 | 9/2009 | Ramani et al. |
| 7,599,957 B2 | 10/2009 | Liu et al. |
| 7,599,965 B1 | 10/2009 | Benitez et al. |
| 7,609,821 B2 | 10/2009 | Delaney et al. |
| 7,610,153 B2 | 10/2009 | Carter et al. |
| 7,610,306 B2 | 10/2009 | Lin et al. |
| 7,729,916 B2 | 6/2010 | Coffman et al. |
| 7,814,040 B1 | 10/2010 | Zhang et al. |
| 7,844,215 B2 | 11/2010 | Vance et al. |
| 7,873,356 B2 | 1/2011 | Flynt |
| 7,885,390 B2 | 2/2011 | Chaudhuri et al. |
| 7,904,298 B2 | 3/2011 | Rao |
| 7,949,529 B2 | 5/2011 | Weider et al. |
| 7,956,890 B2 | 6/2011 | Cheng et al. |
| 7,957,871 B1 | 6/2011 | Echeruo |
| 7,961,938 B1 | 6/2011 | Remedios |
| 7,970,822 B2 | 6/2011 | Benitez et al. |
| 7,983,915 B2 | 7/2011 | Knight et al. |
| 8,000,969 B2 | 8/2011 | Da Palma et al. |
| 8,014,575 B2 | 9/2011 | Weiss et al. |
| 8,031,981 B2 | 10/2011 | Peirce |
| 8,073,700 B2 | 12/2011 | Jaramillo et al. |
| 8,073,920 B2 | 12/2011 | Gailey et al. |
| 8,090,738 B2 | 1/2012 | Paek et al. |
| 8,108,384 B2 | 1/2012 | Sanchez |
| 8,116,908 B2 | 2/2012 | Ng-Thow-Hing et al. |
| 8,140,335 B2 | 3/2012 | Kennewick et al. |
| 8,204,842 B1 | 6/2012 | Zhang et al. |
| 8,208,608 B2 | 6/2012 | Simpson et al. |
| 8,214,764 B2 | 7/2012 | Gemmell |
| 8,219,498 B2 | 7/2012 | Banerjee et al. |
| 8,223,088 B1 | 7/2012 | Gomez et al. |
| 8,223,955 B2 | 7/2012 | Pounds et al. |
| 8,229,865 B2 | 7/2012 | Campbell et al. |
| 8,229,913 B2 | 7/2012 | Arrouye |
| 8,275,834 B2 | 9/2012 | Aldunate et al. |
| 8,280,901 B2 | 10/2012 | McDonald |
| 8,285,244 B2 | 10/2012 | Giard et al. |
| 8,326,353 B1 | 12/2012 | Nasserbakht et al. |
| 8,358,819 B2 | 1/2013 | Wu et al. |
| 8,370,383 B2 | 2/2013 | Kramer et al. |
| 8,373,753 B2 | 2/2013 | Cheng et al. |
| 8,379,193 B2 | 2/2013 | Gardner, Jr. et al. |
| 8,380,516 B2 | 2/2013 | Jaramillo et al. |
| 8,384,729 B2 | 2/2013 | Niwa |
| 8,442,814 B2 | 5/2013 | Ceusters et al. |
| 8,457,416 B2 | 6/2013 | Liu et al. |
| 8,478,815 B2 | 7/2013 | Ewe |
| 8,484,187 B1 | 7/2013 | Hong |
| 8,504,080 B2 | 8/2013 | Jo et al. |
| 8,519,909 B2 | 8/2013 | Gomez et al. |
| RE44,534 E | 10/2013 | Li et al. |
| 8,553,947 B2 | 10/2013 | Benini |
| 8,571,278 B2 | 10/2013 | Sonka et al. |
| 8,588,495 B2 | 11/2013 | Gupta et al. |
| 8,589,410 B2 | 11/2013 | Sud et al. |
| 8,589,778 B2 | 11/2013 | Boyle et al. |
| 8,589,957 B2 | 11/2013 | Paul et al. |
| 8,665,213 B2 | 3/2014 | Underkoffler et al. |
| 8,669,939 B2 | 3/2014 | Underkoffler et al. |
| 8,675,854 B2 | 3/2014 | Michaud et al. |
| 8,725,723 B2 | 5/2014 | Kim |
| 8,756,121 B2* | 6/2014 | Gonsalves | G06Q 30/08 |
| | | | 705/27.2 |
| 8,983,939 B1 | 3/2015 | Wang |
| 9,594,540 B1* | 3/2017 | Stasior | G06F 16/00 |
| 9,760,930 B1* | 9/2017 | Sarmento | G06F 16/5838 |
| 9,852,156 B2* | 12/2017 | Petrou | G06F 16/242 |
| 10,223,466 B2* | 3/2019 | Kang | G06F 16/434 |
| 10,304,111 B1* | 5/2019 | Sarmento | G06Q 30/06 |
| 2002/0184195 A1 | 12/2002 | Qian |
| 2003/0007464 A1 | 1/2003 | Balani |
| 2004/0006265 A1 | 1/2004 | Alhussiny |
| 2004/0093349 A1 | 5/2004 | Buinevicius et al. |
| 2004/0158548 A1 | 8/2004 | Boulle |
| 2005/0015307 A1 | 1/2005 | Simpson et al. |
| 2005/0154580 A1 | 7/2005 | Horowitz et al. |
| 2006/0026206 A1 | 2/2006 | Loghmani et al. |
| 2006/0136259 A1 | 6/2006 | Weiner et al. |
| 2006/0143681 A1 | 6/2006 | Lee et al. |
| 2006/0165040 A1 | 7/2006 | Rathod et al. |
| 2006/0167917 A1 | 7/2006 | Solomon |
| 2006/0198504 A1 | 9/2006 | Shemisa et al. |
| 2007/0036469 A1 | 2/2007 | Kim et al. |
| 2007/0038474 A1 | 2/2007 | Halsted |
| 2007/0043868 A1 | 2/2007 | Kumar et al. |
| 2007/0118550 A1 | 5/2007 | Yang et al. |
| 2007/0254270 A1 | 11/2007 | Hersh |
| 2008/0021502 A1 | 1/2008 | Imielinska et al. |
| 2008/0082426 A1 | 4/2008 | Gokturk et al. |
| 2008/0140723 A1 | 6/2008 | Hernandez et al. |
| 2008/0201143 A1 | 8/2008 | Olligschlaeger et al. |
| 2008/0288596 A1 | 11/2008 | Smith et al. |
| 2009/0030800 A1 | 1/2009 | Grois |
| 2009/0061902 A1 | 3/2009 | Abhyanker |
| 2009/0228270 A1 | 9/2009 | Odell et al. |
| 2009/0287626 A1 | 11/2009 | Paek et al. |
| 2009/0287680 A1 | 11/2009 | Paek et al. |
| 2010/0180009 A1 | 7/2010 | Callahan |

(56) References Cited

U.S. PATENT DOCUMENTS

| | | |
|---|---|---|
| 2010/0228776 A1 | 9/2010 | Melkote et al. |
| 2010/0257195 A1* | 10/2010 | Inoue .................. G01C 21/3623 707/769 |
| 2010/0281435 A1 | 11/2010 | Bangalore et al. |
| 2011/0025603 A1 | 2/2011 | Underkoffler et al. |
| 2011/0123078 A9 | 5/2011 | Weiss et al. |
| 2011/0129073 A1 | 6/2011 | Chaudhuri et al. |
| 2011/0137548 A1 | 6/2011 | Shen et al. |
| 2011/0145274 A1 | 6/2011 | Avinash et al. |
| 2012/0036478 A1 | 2/2012 | Boguraev et al. |
| 2012/0047134 A1 | 2/2012 | Hansson et al. |
| 2012/0117051 A1 | 5/2012 | Liu et al. |
| 2012/0117090 A1 | 5/2012 | Lee et al. |
| 2012/0191577 A1 | 7/2012 | Gonsalves et al. |
| 2012/0226624 A1 | 9/2012 | Song et al. |
| 2012/0239638 A1 | 9/2012 | Bennett |
| 2012/0270527 A1 | 10/2012 | Smith et al. |
| 2012/0294520 A1 | 11/2012 | Mei et al. |
| 2012/0327112 A1 | 12/2012 | Aldunate et al. |
| 2013/0073387 A1 | 3/2013 | Heath |
| 2013/0129177 A1 | 5/2013 | Meinel |
| 2013/0141559 A1 | 6/2013 | Cheng et al. |
| 2013/0215155 A1 | 8/2013 | Pasceri |
| 2013/0226892 A1 | 8/2013 | Ehsani et al. |
| 2013/0251248 A1 | 9/2013 | Guo et al. |
| 2013/0262258 A1 | 10/2013 | Jennings |
| 2013/0272548 A1 | 10/2013 | Visser et al. |
| 2014/0016760 A1 | 1/2014 | Chaudhuri et al. |
| 2014/0019201 A1 | 1/2014 | Appel et al. |
| 2014/0025756 A1 | 1/2014 | Kamens |
| 2014/0047359 A1 | 2/2014 | Teigene |
| 2014/0074852 A1 | 3/2014 | Sud et al. |
| 2014/0075393 A1 | 3/2014 | Mei et al. |
| 2014/0222702 A1 | 8/2014 | Jennings |
| 2015/0073967 A1 | 3/2015 | Katsuyama |
| 2016/0225086 A1 | 8/2016 | Seitz |
| 2017/0161685 A1 | 6/2017 | Jennings |
| 2018/0352394 A1* | 12/2018 | Li ........................... H04L 67/04 |

FOREIGN PATENT DOCUMENTS

| | | |
|---|---|---|
| CN | 102770862 A | 11/2012 |
| CN | 103425757 A | 12/2013 |
| KR | 10-2006-0133430 A | 12/2006 |
| KR | 10-2011-0013949 A | 2/2011 |
| TW | 201128421 A1 | 8/2011 |
| TW | 201220099 A1 | 5/2012 |
| WO | 2012058577 A1 | 5/2012 |
| WO | 2013/170383 A1 | 11/2013 |
| WO | 2013/176490 A1 | 11/2013 |

OTHER PUBLICATIONS

Communication dated Aug. 9, 2019 issued by the State Intellectual Property Office of P.R. China in counterpart Chinese Application No. 201510272556.0.
Office Action dated Mar. 6, 2019 by the European Patent Office in counterpart European Patent Application No. 18185043.9.
Search Report dated Mar. 14, 2019 by the European Patent Office in counterpart European Patent Application No. 19150621.1.
Communication dated Aug. 21, 2018, issued by the European Patent Office in counterpart European Patent Application No. 18185043.9.
Communication dated Aug. 21, 2015 by the International Searching Authority in related Application No. PCT/KR2015/005144, (PCT/ISA/220, PCT/ISA/210, & PCT/ISA/237).
Communication dated Oct. 8, 2015 by the European Patent Office in related Application No. 15169043.5.
Wang et al., "Jigsaw: Interactive Mobile Visual Search with Mulimodal Queries", Proceedings of the 19th ACM International Conference on Multimedia, MM '11, Jan. 1, 2011, 10 total pages.
Anonymous, "Tutorials of demonstration portal usability", I-Search: A Unified Framework for Multimodal Content Search, May 2, 2013, 31 total pages, retrieved from <http://vcl.iti.gr/isearch/deliverables/pr3/I-SEARCH_D8.3_v1.0.pdf>.
Zagoris, Konstantinos et al., "www.MMRetrieval.net: A Multimodal Search Engine", Similarity Search and Applications, ACM, Sep. 18, 2010, pp. 117-118, XP058351704. (2 pages total).
Communication dated Nov. 28, 2019 by the Taiwan Patent Office in counterpart Taiwan Patent Application No. 108137893.
Communication dated Nov. 29, 2019 by the Taiwan Patent Office in counterpart Taiwan Patent Application No. 108137903.
Communication dated Feb. 6, 2020 by the European Patent Office in counterpart European patent Application No. 19150621.1.
Communication dated Sep. 28, 2020 by the State Intellectual Property Office of P.R. China in counterpart Chinese Patent Application No. 201510272556.0.
Communication dated Jun. 30, 2020, issued by the Taiwan Patent Office in counterpart Taiwan Application No. 108137903.
Communication dated Apr. 24, 2020, issued by the European Patent Office in counterpart European Patent Application No. 18185043.9.
Communication dated May 22, 2020 issued by the State Intellectual Property Office of P.R. China in counterpart Chinese Application No. 201510272556.0.

* cited by examiner

| SEARCH RESULT PRIORITY | RESULT TYPE |
| --- | --- |
| 1 | IMAGE |
| 2 | BLOG |
| 3 | NEWS |
| 4 | WEB DOCUMENT |
| 5 | ADVERTISEMENT |

METHOD FOR SEARCHING AND DEVICE THEREOF

CROSS-REFERENCE TO RELATED APPLICATION

This application is a continuation application of U.S. patent application Ser. No. 16/250,508, filed Jan. 17, 2019, which is a continuation application of U.S. patent application Ser. No. 15/986,374, filed May 22, 2018, now U.S. Pat. No. 10,223,466, issued Mar. 5, 2019, which is a continuation application of U.S. patent application Ser. No. 14/588,275, filed Dec. 31, 2014, now U.S. Pat. No. 9,990,433, issued Jun. 5, 2018, which claims priority from Korean Patent Application No. 10-2014-0062568, filed on May 23, 2014 in the Korean Intellectual Property Office, and Korean Patent Application No. 10-2014-0167818, filed on Nov. 27, 2014 in the Korean Intellectual Property Office, the disclosures of which are incorporated herein in their entireties by reference.

BACKGROUND

1. Field

Apparatuses and methods consistent with exemplary embodiments relate to searching for and acquiring information under a computing environment, and more particularly, to performing a search based on a user's various requirements.

2. Description of the Related Art

Various methods of searching for and acquiring information exist. Generally, a text-based search is performed to search for information under a computing environment. The text-based search uses a search query including one or more text components such as words or phrases. Text components match each other, or are compared with an index or data, to identify documents such as webpages including text content similar to the text components, metadata, a filename, or a text expression.

With the advancement of technology, information to be searched is being further diversified, and the amount of information increases. Therefore, in addition to a text component, a different modality of components may be used for a search.

SUMMARY

Aspects of one or more exemplary embodiments provide a method and a device that receive a single modality of query or a multimodal query, and perform a search by using the received query.

Additional aspects will be set forth in part in the description which follows and, in part, will be apparent from the description, or may be learned by practice of exemplary embodiments.

According to an aspect of an exemplary embodiment, there is provided an apparatus including: at least one input device configured to receive a first query input of a first query type and a second query input of a second query type; and a controller configured to output a query input window including a first display item corresponding to the first query input and a second display item corresponding to the second query input, to automatically switch, in response to receiving the first query input, the apparatus from a first state to receive the first query input of the first query type to a second state to receive the second query input of the second query type, and to obtain a search result according to a query based on the first query input and the second query input.

The second query type may be an audio query type, and in response to receiving the first query input, the controller may be configured to automatically activate a microphone to receive the second query input.

The second query type may be an image query type, and in response to receiving the first query input, the controller may be configured to automatically activate a camera to receive the second query input.

In response to receiving the first query input, the controller may be configured to output a visual indicator indicating the second state.

In response to receiving the first query input, the controller may be configured to output an audio indicator indicating the second state.

In response to receiving a mode switch input, the controller may be configured to switch a search mode from a multimodal input mode, in which the first query input and the second query input are received via the query input window and combined to generate the query, to a single input mode in which an input of one query type is received to generate the query.

The controller may output a single query input window in the single input mode and may output a multimodal query input window, as the query input window, in the multimodal input mode.

The at least one input device may include a first input device configured to receive the first query input and a second input device, different from the first input device, configured to receive the second query input.

The at least one input device may include at least one of a microphone, a touch screen, a camera, and a keyboard.

According to an aspect of another exemplary embodiment, there is provided an apparatus including: a display configured to display a query input window; at least one input device configured to receive a first query input of a first query type and a second query input of a second query type; and a controller configured to obtain a search result according to a query based on the first query input and the second query input, wherein the display is configured to simultaneously display, in the query input window, a first region corresponding to the first query type and a second region corresponding to the second query type.

The controller may be configured to determine the first query type of the first query input and the second query type of the second query input, and the display may be configured to display the first region according to the determined first query type and the second region according to the determined second query type.

At least one of a position and a size of the first region may be adjustable according to a user input.

The display may display the query input window, in which a first display item corresponding to the first query input and a second display item corresponding to the second query input are simultaneously displayed, such that the first query type and the second query type are distinguishable from each other.

According to an aspect of an exemplary embodiment, there is provided a method including: receiving a first query input of a first query type and a second query input of a second query type; outputting, by an apparatus, a query input window including a first region corresponding to a first query input and a second region corresponding to a second query input; automatically switching, in response to receiving the first query input, the apparatus from a first state to receive the first query input of the first query type to a second state to receive the second query input of the second query type; and obtaining a search result according to a query based on the first query input and the second query input.

The method may further include, in response to receiving the second query input, simultaneously displaying a second display item corresponding to the second query input in the second region and a first display item corresponding to the first query input in the first region.

The second query type may be an audio query type, and the automatically switching may include, in response to receiving the first query input, automatically activating a microphone to receive the second query input.

The second query type may be an image query type, and the automatically switching may include, in response to receiving the first query input, automatically activating a camera to receive the second query input.

The automatically switching may include, in response to receiving the first query input, outputting a visual indicator or an audio indicator indicating the second state.

The method may further include, in response to receiving a mode switch input, switching a search mode from a multimodal input mode, in which the first query input and the second query input are received via the query input window and combined to generate the query, to a single input mode in which an input of one query type is received to generate the query.

According to an aspect of an exemplary embodiment, there is provided a non-transitory computer-readable storage medium storing a program for executing the method.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
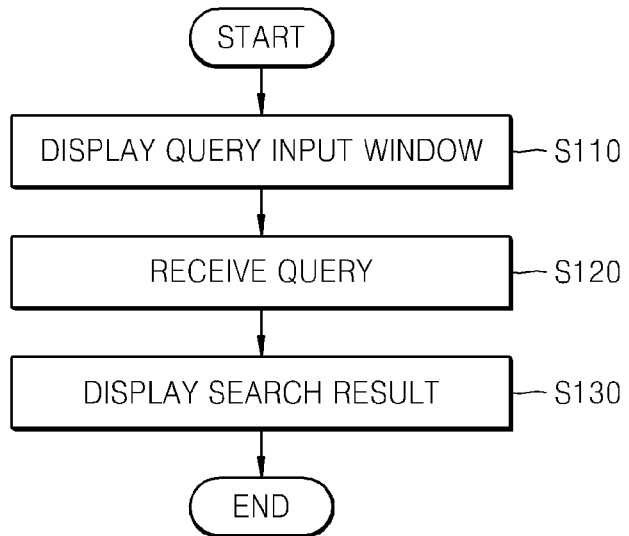
FIG. 1 is a flowchart illustrating a process of performing a search, according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In this disclosure below, when one part (or element, device, etc.) is referred to as being 'connected' to another part (or element, device, etc.), it should be understood that the former may be 'directly connected' to the latter, or 'electrically connected' to the latter via an intervening part (or element, device, etc.). Furthermore, when it is described that one part (or element, device, etc.) comprises (or includes or has) some elements, it should be understood that it may comprise (or include or has) only those elements, or it may comprise (or include or have) other elements as well as those elements if there is no specific limitation.

In the present specification, a query denotes a command for performing a search. The query may include information that is to be obtained as a search result. The query may include at least one query component (i.e., query input). The query component denotes a unit of information composing a query. For example, the query component may include at least one selected from a keyword included in a text that is input to a query input device by a user, image data, sketch information, video data, and sound data. A query type may denote a modality of a query component. Herein, the modality is defined as including a source of information about a search database that is algorithmically used for a search, in addition to a sensible aspect of a human. For example, the query type may indicate which type of a text, image data, sketch information, video data, and sound data a query component corresponds to. A query including a plurality of query types denotes that a plurality of query components included in the query correspond to a plurality of query types. For example, when a query includes a first query component, in which a query type is a text, and a second query component, in which the query type is an image, the query includes a plurality of query types.

In the present specification, a search mode may denote an operation mode for a method in which search is performed. The search mode may include a single mode (i.e., single input mode) and a multimodal mode (i.e., multimodal input mode). The single mode may denote an operation mode in which a search is performed based on a query including one or more query components having one query type. The multimodal mode may denote an operation mode in which search is performed based on a query including a plurality of query components having a plurality of query types.

Hereinafter, exemplary embodiments will be described in detail.

FIG. 1 is a flowchart illustrating a process of performing a search, according to an exemplary embodiment.

Referring to FIG. 1, in operation S110, a computing device may display a query input window that enables a user to input a query. The query input window denotes a user interface through which the computing device receives a query input by the user. The query input window may include a query input tool for inputting a query component. For example, the query input window may include at least one selected from a text box, a uniform resource locator (URL) input window, a file upload button, a sketch input window, an application execution button, etc. The text box denotes a box in which a text, that is input by using an input device (e.g., a keyboard, a keypad, a virtual keypad, etc.) is displayed. The URL input window denotes a user interface through which a URL, indicating a location of information that is to be input as a query, is input. The file upload button denotes a button that is used to perform an operation in which the computing device selects a file when selected by a user, and an operation of uploading the selected file. The sketch input window denotes a user interface that displays information that is input by a user by using an input device (e.g., a tablet, a touch panel, a track pad, a mouse, a stylus, etc.). The application execution button denotes a button that enables an application, corresponding to a selected button, to be executed. For example, when an application execution button corresponding to photographing is selected, an application for photographing may be executed. As another example, when an application execution button corresponding to recording of a sound is selected, an application for recording the sound may be executed. As another example, the query input device may extract information, such as a Quick Response (QR) code, from an image that is acquired by operating a camera, and receive a query component by using the QR code.

According to an exemplary embodiment, when a search mode corresponds to a multimodal search (i.e., multimodal input mode), the query input device may display a query input window for receiving a plurality of query components (i.e., query inputs) having a plurality of query types. Alternatively, when the search mode corresponds to a single search (i.e., single input mode), the query input device may display a single query input window. The single query input window denotes a query input window that receives a query including only one query type.

Subsequently, in operation S120, the query input device may receive a query through the displayed query input window. Here, the query input device may receive a query including a plurality of query types, i.e., receive a query including a plurality of query components having a plurality of query types.

Subsequently, the query input device may select at least one search result, based on the received query. Here, the at least one search result may be selected by using a search engine. The search engine denotes hardware, software, or a combination thereof, which searches for information based on a query. The search engine may be included in the query input device, or may be included in a separate device (e.g., a web server, a media server, a network server, etc.). When the search engine is included in the separate device, the query input device may transmit the received query to the separate device. The query input device may acquire the selected search result from the separate device in response to the transmitted query.

In operation S130, the query input device may display the selected search result. Here, the query input device may prioritize the search result. The query input device may display the search result, based on a priority of the search result.

According to an exemplary embodiment, the query input device may convert (or communicate with a server or another device to convert) a text, included in the search result, into a voice, and output the converted voice. Alternatively, the query input device may convert a voice, included in the search result, into a text, and output the converted text. Accordingly, the query input device enables a blind person or a hearing-impaired person to check the search result.

Figure 2:
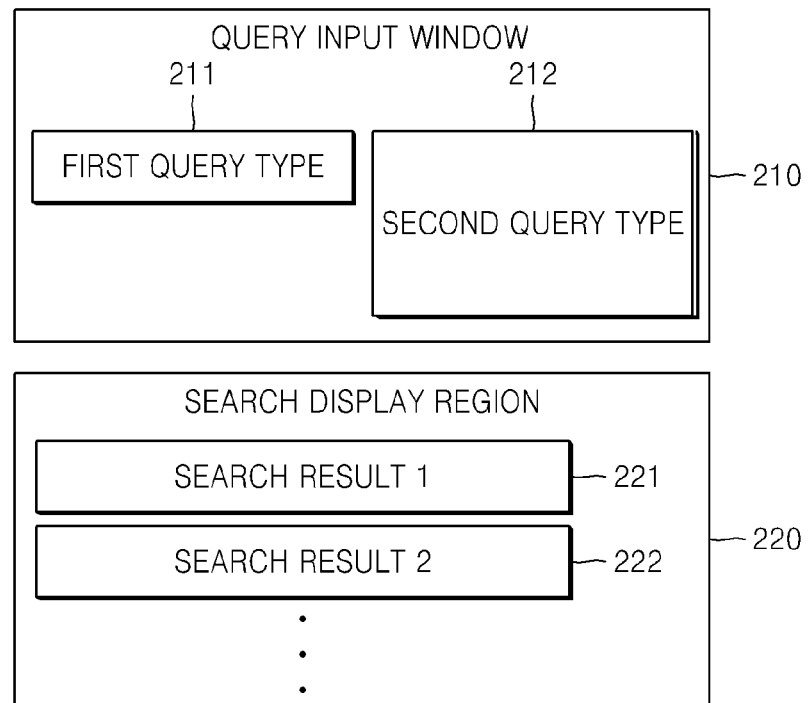
FIG. 2 is a conceptual diagram illustrating a configuration of a user interface according to an exemplary embodiment.

FIG. 2 is a conceptual diagram illustrating a configuration of a user interface according to an exemplary embodiment. The query input device may display a query input window 210 and a result display region 220 illustrated in FIG. 2, although it is understood that one or more other exemplary embodiments are not limited thereto. The query input device may separately display the query input window 210 and the result display region 220.

The query input window 210 may receive a first query component 211 (i.e., first query input) corresponding to a first query type and a second query component 212 (i.e., second query input) corresponding to a second query type. The query input window 210 may be differently displayed based on the first query type and the second query type. Furthermore, the query input window 210 may receive a query including more than two query types or less than two query types.

The result display region 220 may include a list of response results 221 and 222 (i.e., search results). The first response result 211 may include summary information about identified information in response to the search. For example, the first response result 211 may include a thumbnail for an image document, some of text included in a document, a link for a searched document, an icon, etc.

Figure 3:
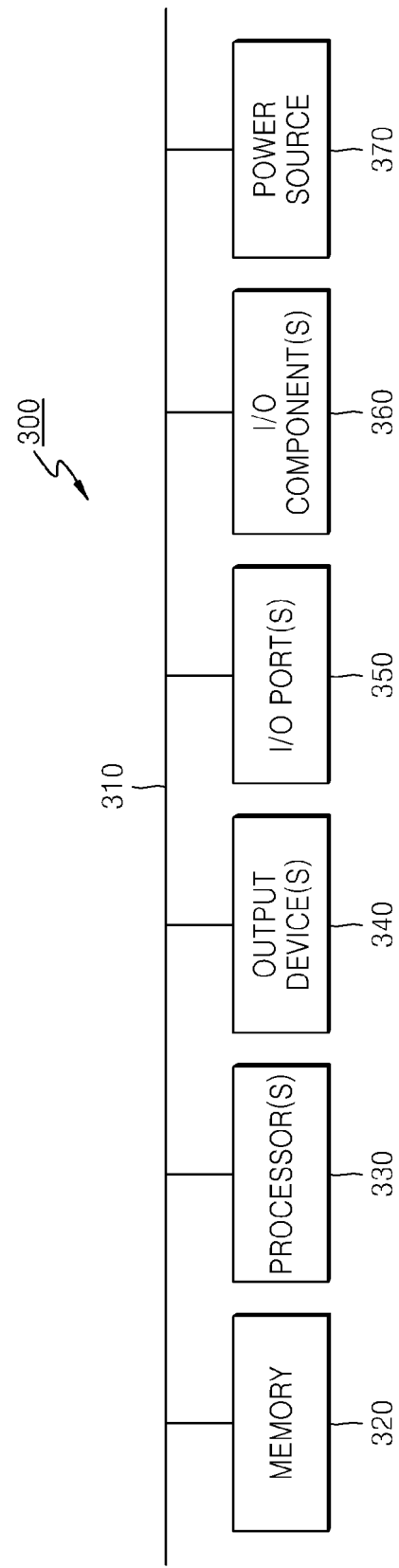
FIG. 3 is a conceptual diagram illustrating a structure for constructing a query input device according to an exemplary embodiment.

FIG. 3 is a conceptual diagram illustrating a structure for constructing a query input device 300 according to an exemplary embodiment. FIG. 3 illustrates an exemplary environment for implementing an exemplary embodiment. The query input device 300 may be implemented as a computing device. For example, the query input device 300 may be implemented as a type such as a personal computer (PC), a smartphone, a connected television (TV), a notebook (laptop) computer, a personal digital assistant (PDA), a tablet PC, a portable multimedia player, a netbook, a workstation, etc.

Exemplary embodiments may be described in association with machine-available instructions or a computer code including computer-executable instructions such as program modules executed by a device such as a computer, a personal portable terminal, or a handheld device. Generally, program modules including routines, programs, objects, components, and data structures denote a code that performs certain works or abstract data types. Exemplary embodiments may be implemented in various systems including handheld devices, consumer electronic devices, general-use computers, and special computing devices. Also, exemplary embodiments may be implemented under a distributed computing environment.

The query input device 300 may include a memory 320, at least one processor 330, at least one output device 340, at least one input/output (I/O) port 350, at least one I/O component 360, a power source 370, and a bus 310 that connects the elements. The bus 310 may include one or more types of buses such as an address bus, a data bus, or a combination thereof. Functional blocks of FIG. 3 are illustrated as lines, for conciseness. However, the query input device 300 may be substantially configured with various components. For example, the output device 340 such as a display device may be regarded as the I/O component 360. Also, the processor 330 may include a memory 320.

The query input device 300 may include various computer-readable media. The computer-readable media may be arbitrary available media accessible by the query input device 300, and may include volatile media, nonvolatile media, movable media, and non-movable media. Computer storage media may include volatile media, nonvolatile media, movable media, or non-movable media, which are implemented in an arbitrary method or technology for storing computer-readable instructions, data structures, program modules, or information such as data. The computer storage media may include RAM, ROM, EEPROM, flash memory, memory technology, CD-ROM, DVD, holographic memory, magnetic cassettes, magnetic tapes, magnetic disks, or other magnetic storage devices, may be used to encode desired information, or may include arbitrary media accessible by the query input device 300, but is not limited thereto. In an embodiment, the computer storage media may be selected from various types of computer storage media. In another embodiment, the computer storage media may be selected from non-transitory computer storage media.

The memory 320 may include volatile and/or non-volatile memory types of computer storage media. The memory 320 may be a movable memory, a non-movable memory, or a combination thereof. For example, the memory 320 may include a semiconductor memory, a hard drive, an optical disk drive, etc. The query input device 300 may include one or more processors 330 that read out data from various entities such as the memory 320 or the I/O components 360. The output device 340 provides data instructions to a user or another device. For example, the output device 340 may include at least one of a display device, a speaker, a printing component, a vibration motor, a communication device, etc.

The I/O port 350 allows the query input device 300 to be logically connected to other devices including the I/O component 360. For example, the I/O component 360 may include at least one of a microphone, a joystick, a game pad, a satellite antenna, a scanner, a printer, a wireless device, a keyboard, a track pad, a touch screen, a rotatable dial, etc.

Figure 4:
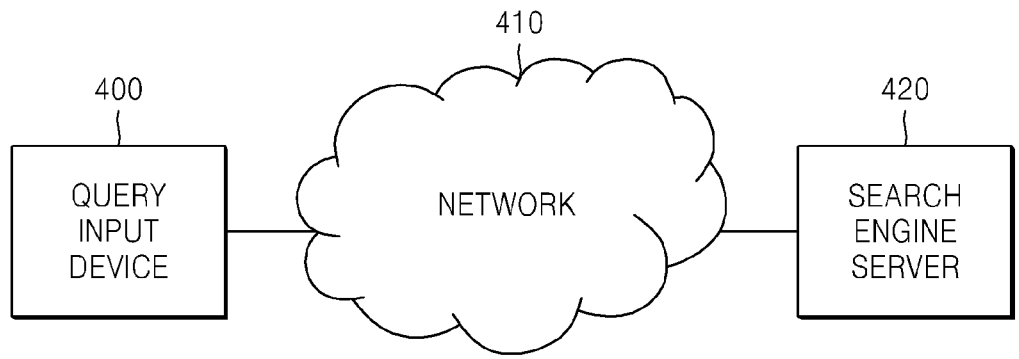
FIG. 4 is a conceptual diagram illustrating a network environment for executing an exemplary embodiment.

FIG. 4 is a conceptual diagram illustrating a network environment for executing an exemplary embodiment. The network environment is merely an example of an environment that may be applied to an exemplary embodiment, and may include an arbitrary number of components in terms of a broad configuration.

The network environment may include a network 410, a query input device 400, and a search engine server 420. The network 410 may include arbitrary computer networks such as the Internet, an Intranet, non-public and public local area networks, non-public and public wide area networks, wireless data or phone networks, etc. The query input device 400 is a device that provides a query. According to an exemplary embodiment, the query input device 400 may output a search result as well as a query input.

The search engine server 420 may include an arbitrary computing device such as the query input device 400. The search engine server 420 may provide at least some of operations that provide a search service.

Figure 5:
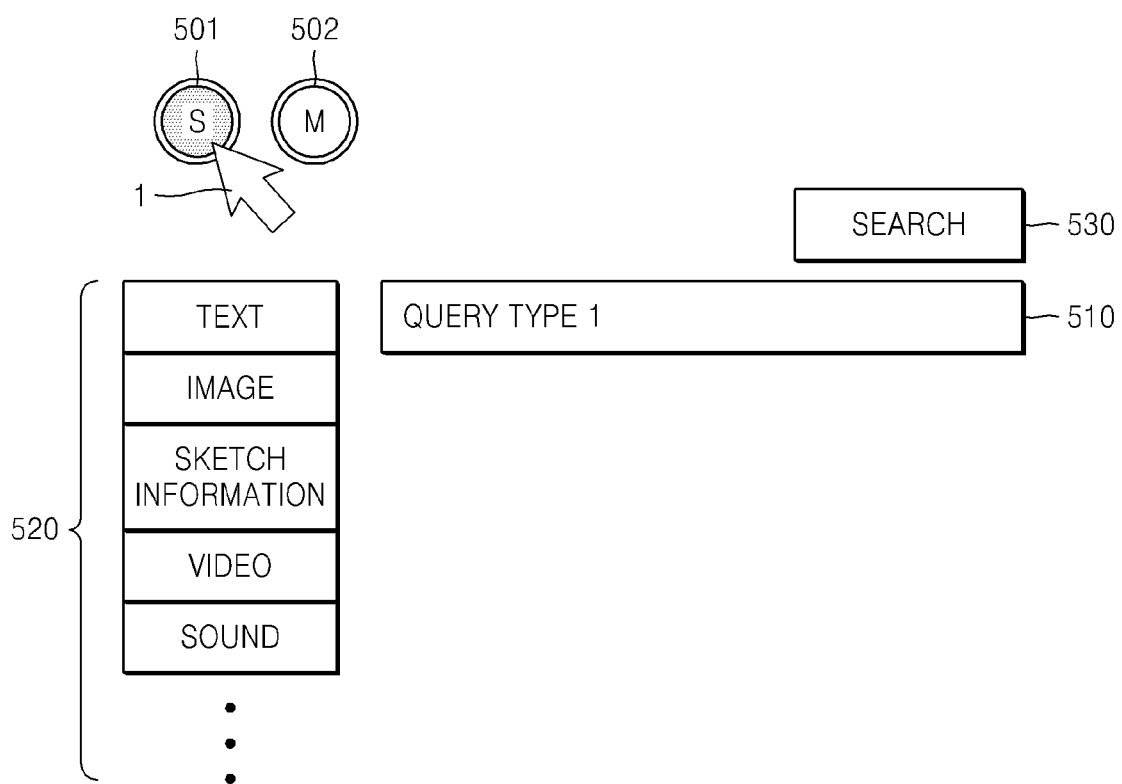
FIGS. 5 to 7 are exemplary diagrams illustrating a method of receiving a query for a single search, according to an exemplary embodiment.
Figure 6:
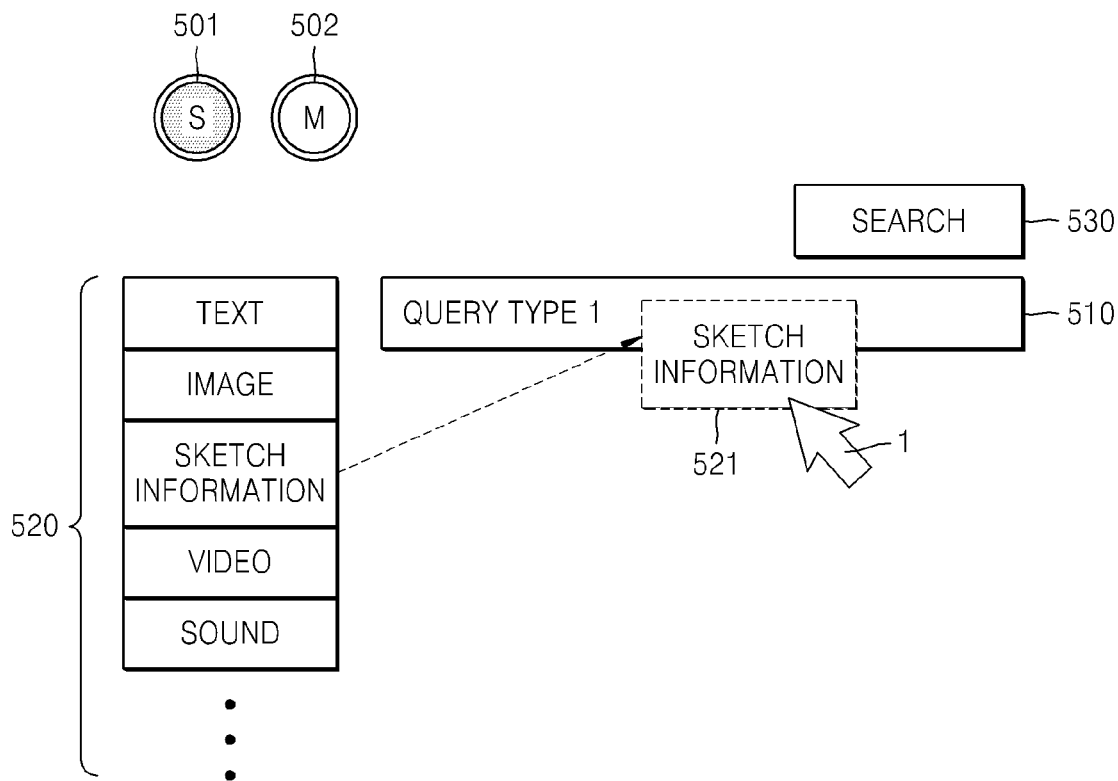
Figure 7:
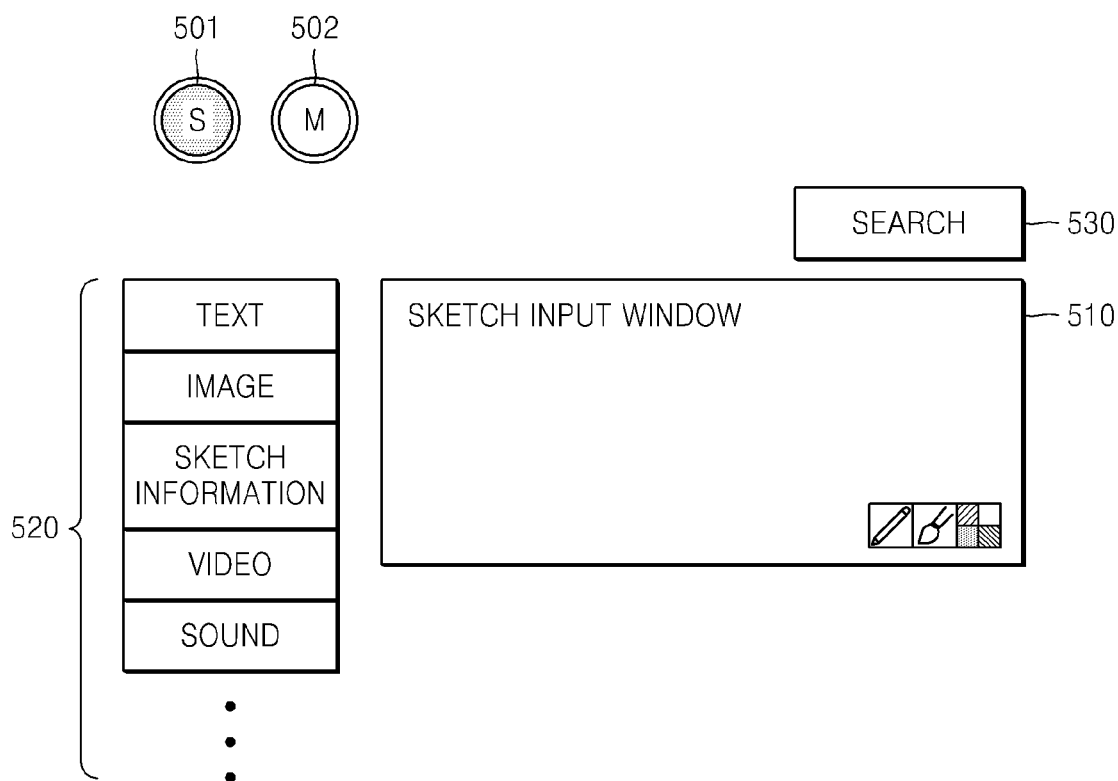

FIGS. 5 to 7 are exemplary diagrams illustrating a method of receiving a query for a single search, according to an exemplary embodiment.

When a search mode is a single search mode (i.e., single input mode), a query input device according to an exemplary embodiment may display a single query input window 510 through which a query input including one query type is input. The query input device may display at least one search mode selection object for selecting the search mode. Referring to FIG. 5, the query input device may display a single mode selection icon 501 (i.e., single input mode selection icon) and a multimodal mode selection icon 502 (i.e., multimodal input mode selection icon). When a user input for selecting the single mode selection icon 501 is received from a user 1, the query input device may display the single query input window 510. Here, the user input may vary depending on the type of the query input device or an I/O device. For example, when the query input device is a PC outputting a graphical user interface (GUI), an event in which the single mode selection icon 501 is clicked or selected by using a mouse cursor may be a user input that selects the single mode selection icon 501. As another example, when the query input device is a handheld device including a touch screen, a touch of a part of a human body or an electronic pen on a position in which the single mode selection icon 501 is displayed on the touch screen may be a user input that selects the single mode selection icon 501.

Moreover, the query input device may display a single query type list 520. The single query type list 520 may include a plurality of objects. Each object included in the single query type list 520 may respectively correspond to one query type. In FIG. 5, the single query type list 520 is illustrated as a set of button-type objects, but each of the objects may be replaced by various forms, for example, an icon, a widget, etc., in one or more other exemplary embodiments.

The query input device may determine a query type of a query component that is to be received by the single query input window 510, based on a selection to the single query type list 520. Referring to FIG. 6, the user 1 may determine the query type included in the single query input window 510 by using an input that drags and drops one of objects, included in the single query type list 520, to a region in which the single query input window 510 is displayed. The drag and drop denotes an input scheme in which one object is selected by using a mouse click or a touch input in a GUI, a position is moved, and the mouse click or the touch input ends. For example, when a drag-and-drop event for an object 521 corresponding to sketch information is received by the single query input window 510, as illustrated in FIG. 7, a sketch input window for inputting the sketch information to the single query input window 510 may be displayed. Subsequently, when an object corresponding to another query type is selected from among the objects included in the single query type list 520, the sketch input window may be changed to an input window for inputting a query component corresponding to the other query type. Here, the drag and drop may be variously replaced by various input schemes. For example, according to another exemplary embodiment, the user 1 may determine the query type by using an input such as those described above with reference to the selection of the single mode selection icon 501. According to an exemplary embodiment, an area or position of the single query input window 510 may be changed or may vary depending on a query type that is to be displayed (i.e., a display item corresponding to a query input of a query type) in the single query input window 510. Alternatively, a size of a query component (i.e., display item) displayed in the query input window 810 may be changed or may vary depending on an area of a query component input region. For example, when the number of characters input to a text input window increases, e.g., to be more than a predetermined number, a font size of each of the characters displayed in the text input window may be reduced.

Moreover, the query input device may include a search button 530 for inputting a command that allows a search to be performed based on a query input to the single query input window 510. According to one or more other exemplary embodiments, the search button 530 may not be displayed or may be changed to another form.

FIGS. 8 to 18 are exemplary diagrams illustrating a method of receiving a query for a multimodal search, according to an exemplary embodiment.

When a search mode is a multimodal search mode (i.e., multimodal input mode), a query input device according to an exemplary embodiment may display a query input window 810 through which a query including one query type is input. For example, referring to FIG. 8, the query input window 810 may include a first query component input region 811 (i.e., first region) and a second query component input region 812 (i.e., second region).

Figure 8:
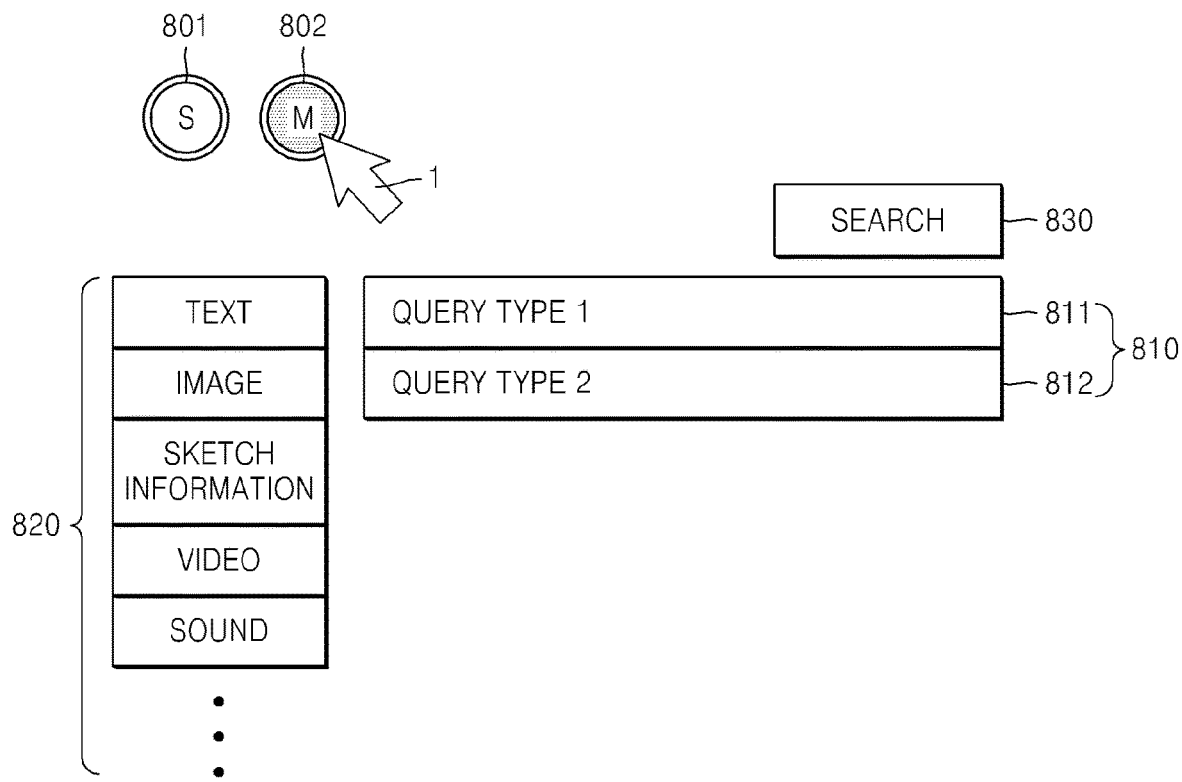
FIGS. 8 to 18 are exemplary diagrams illustrating a method of receiving a query for a multimodal search, according to an exemplary embodiment.

The query input device may display at least one search mode selection object for selecting the search mode. Referring to FIG. 8, the query input device may display a single mode selection icon 801 (i.e., single input mode selection icon) and a multimodal mode selection icon 802 (i.e., multimodal input mode selection icon). When a user input for selecting the multimodal mode selection icon 801 is received from a user 1, the query input device may display the query input window 810. A query input window, which may receive a plurality of query components (i.e., query inputs) having a plurality of query types, may be referred to as a multimodal query input window. Here, the user input may vary depending on the type of the query input device or an I/O device. For example, when the query input device is a PC outputting a GUI, an event in which the multimodal mode selection icon 801 is clicked or selected by using a mouse cursor may be a user input that selects the multimodal mode selection icon 801. As another example, when the query input device is a handheld device including a touch screen, a touch of a part of a human body or an electronic pen (e.g., stylus) on a position in which the multimodal mode selection icon 801 is displayed on the touch screen may be a user input that selects the multimodal mode selection icon 801.

Moreover, the query input device may display a single query type list 820. The single query type list 820 may include a plurality of objects. Each object included in the single query type list 820 may respectively correspond to one query type. In FIG. 8, the single query type list 820 is illustrated as a simple button type, but each of the objects may be replaced by various forms such as an icon, a widget, etc., in one or more other exemplary embodiments.

Figure 9:
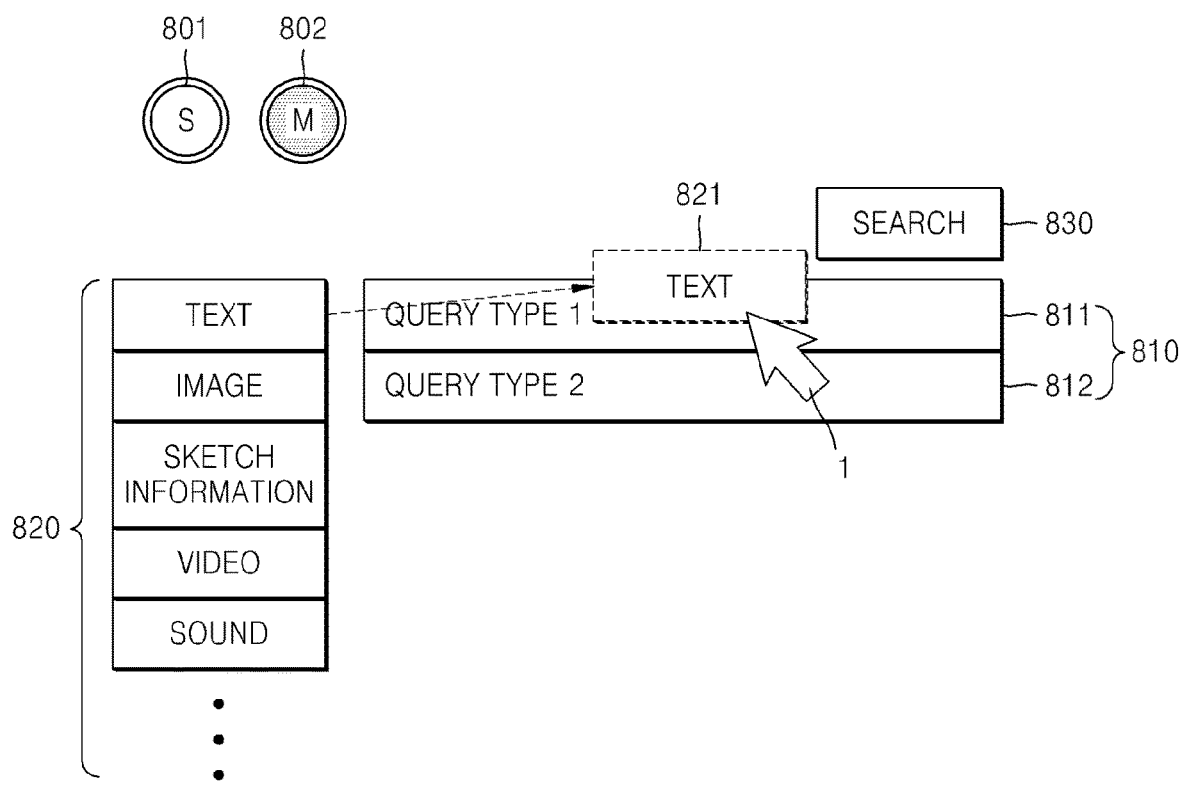
Figure 10:
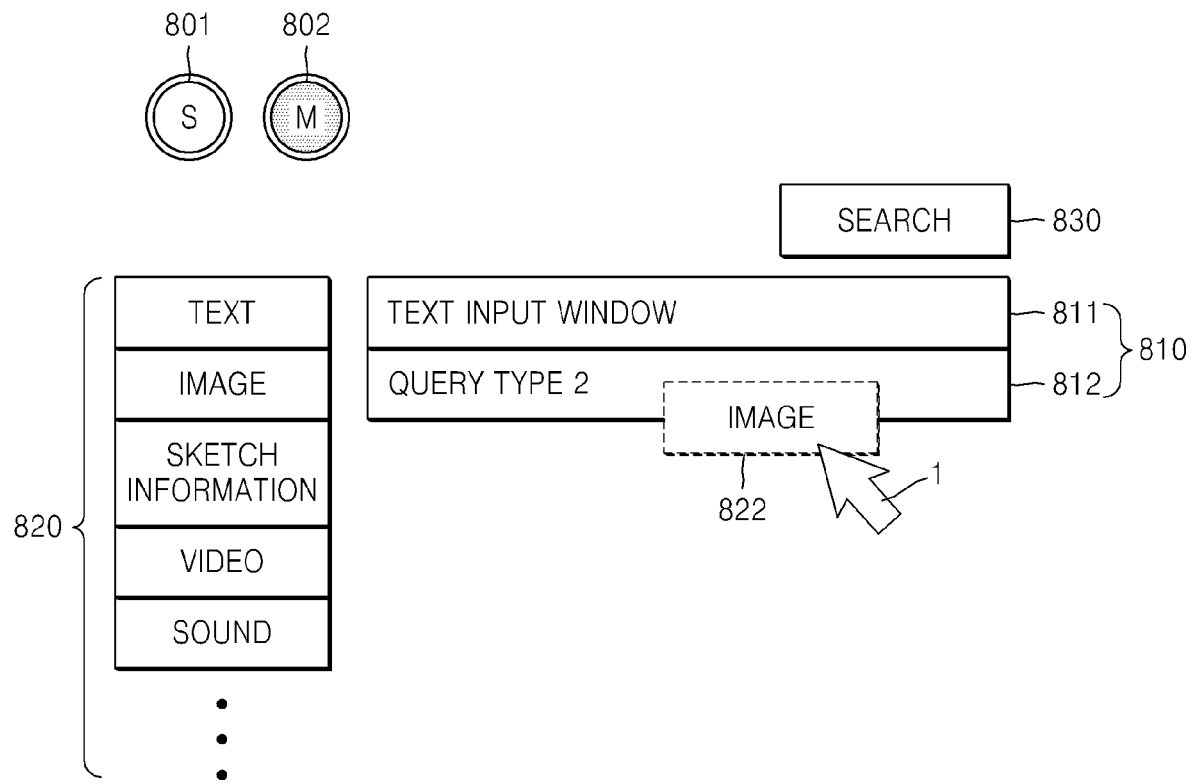
Figure 11:
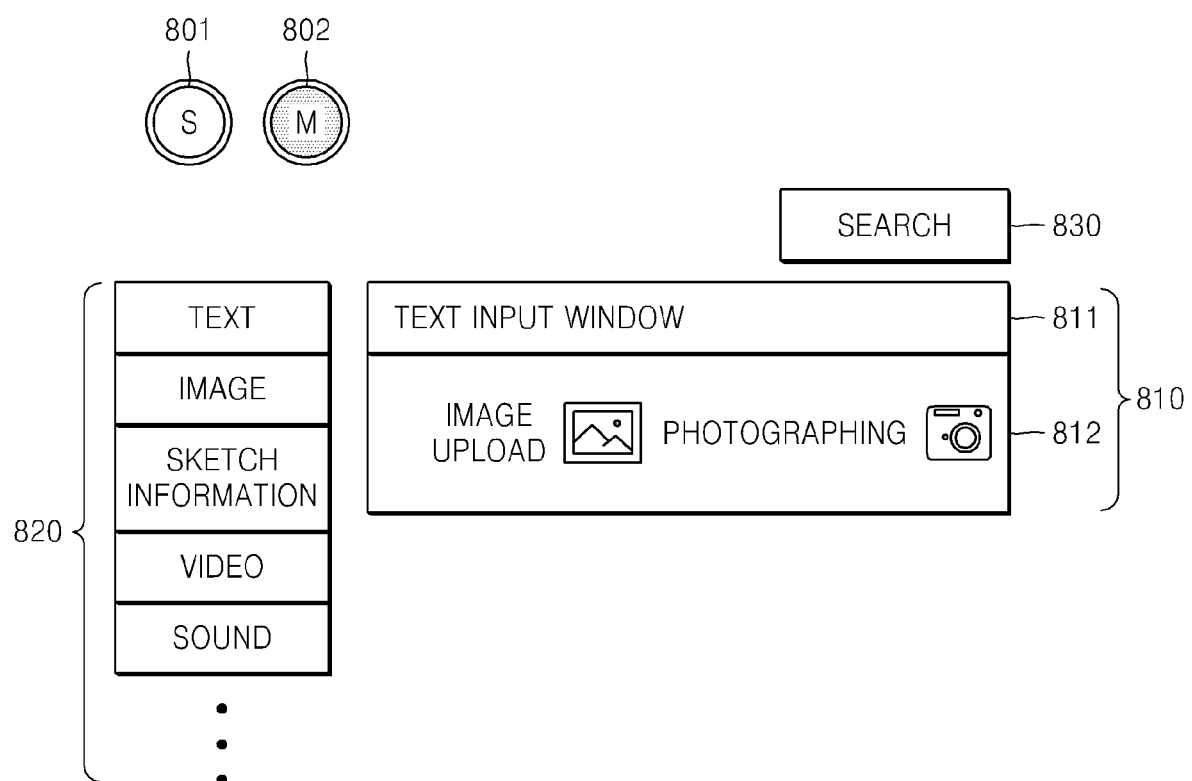

The query input device may determine a query type included in the multimodal query input window 810, based on the single query type list 820. Referring to FIG. 9, the user 1 may determine the query type included in the query input window 810 by using an input that drags and drops one of objects, included in the single query type list 820, to a region in which the query input window 810 is displayed. The drag and drop denotes an input scheme in which one object is selected by using a mouse click or a touch input in a GUI, a position is moved, and the mouse click or the touch input ends. For example, when a drag-and-drop event for an object 821 corresponding to a text is input to the first query component input region 811 of the query input window 810 as illustrated in FIG. 9, a text input window for inputting the text to the first query component input region 811 may be displayed, as illustrated in FIG. 10. The text input window may include a text box in which an input text is displayed. Also, referring to FIG. 10, when a drag-and-drop event for an object 822 corresponding to an image is input to the second query component input region 812, a user interface for inputting a query component, in which a query type is an image, to the second query component input region 812 may be displayed, as illustrated in FIG. 11. Here, the drag and drop may be variously replaced by various input schemes. For example, according to another exemplary embodiment, the user 1 may determine the query type by using an input such as those described above with reference to the selection of the multimodal mode selection icon 801. Furthermore, an area or a position of the first query component input region 811 or second query component input region 812 may be changed or may vary depending on a query type that is to be displayed (i.e., a display item corresponding to a query input of a query type) in the first query component input region 811 or the second query component input region 812. Alternatively, a size of a query component displayed in the query input window 810 may be changed or may vary depending on an area of a query component input region. For example, when the number of characters input to a text input window increases, e.g., to be more than a predetermined number, a font size of each of the characters displayed in the text input window may be reduced.

Moreover, in FIGS. 8 to 11, the query input window 810 is illustrated as receiving a query including at least two query types (i.e., query inputs of at least two query types). It is understood that the number of query types included in a query received through the query input window 810 may be greater than, equal to, or less than two in exemplary embodiments. The user 1 may select at least one from among the objects included in the single query type list 820. For example, one of the objects included in the single query type list 820 may be clicked by using a mouse or a mouse cursor. Alternatively, one of the objects displayed on the touch screen may be touched. However, it is understood that one or more other exemplary embodiments are not limited thereto.

Figure 12:
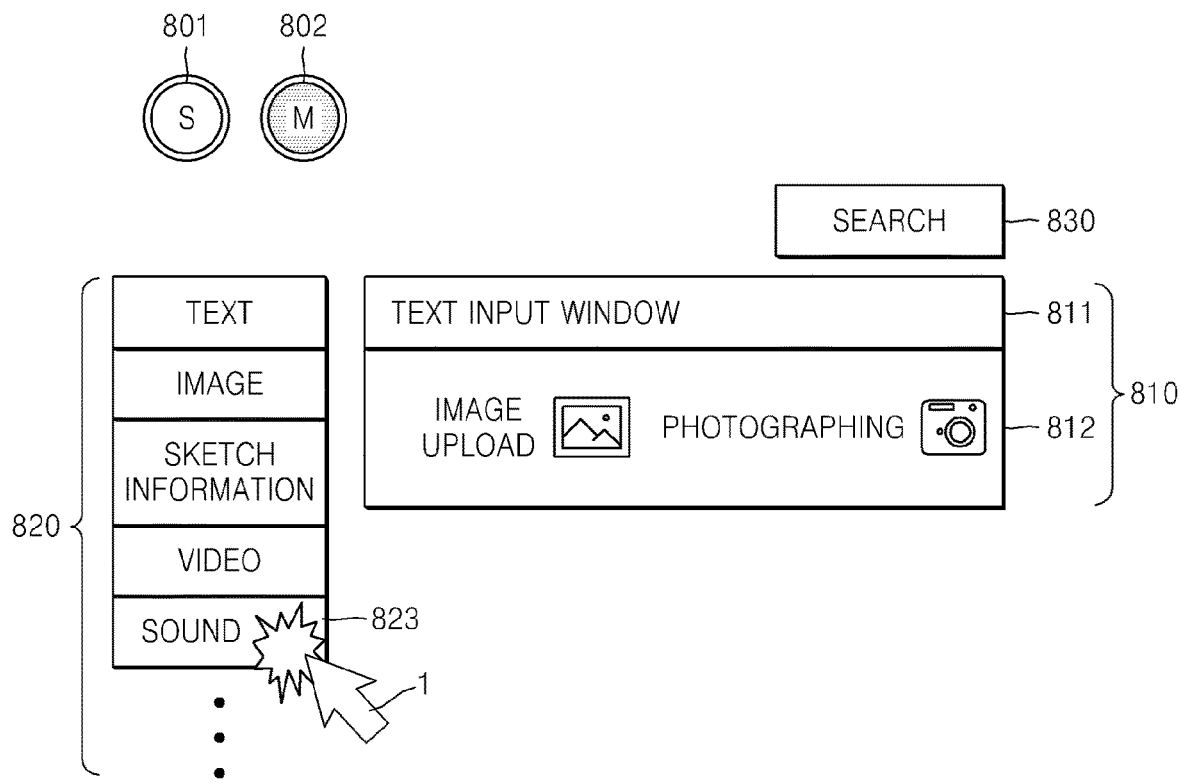
Figure 13:
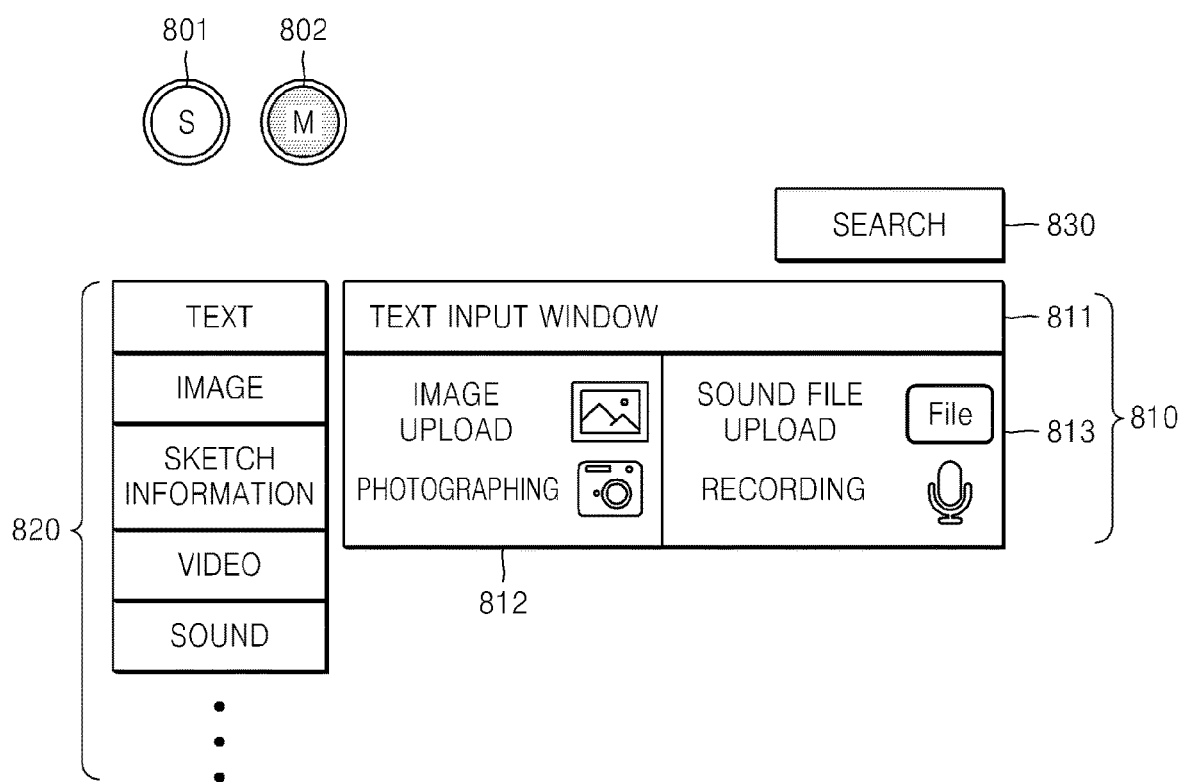

Referring to FIG. 12, an object 823 corresponding to a sound (i.e., sound or audio input) may be selected by an input received from the user 1. When at least one object is selected from among the objects included in the single query type list 820, the query input device may add a third query component input region 813 (i.e., third region) to the query input window 810. The query input device may add the third query component input region 813 to the query input window 810 without changing an overall area of the query input window 810. For example, referring to FIG. 13, the query input device may display the third query component input region 813 in a portion of the second query component input region 812. However, it is understood that one or more other exemplary embodiments are not limited thereto. For example, according to another exemplary embodiment, the query input device may display the third query component input region 813 in an additional region thereby expanding the query input window 810 as compared to before the third query component input region 813 is displayed. When an object 823 corresponding to a sound is selected as illustrated in FIG. 12, a user interface for inputting a query component, in which a query type is a sound, to the third query component input region 813 may be displayed, as illustrated in FIG. 13.

Figure 14:
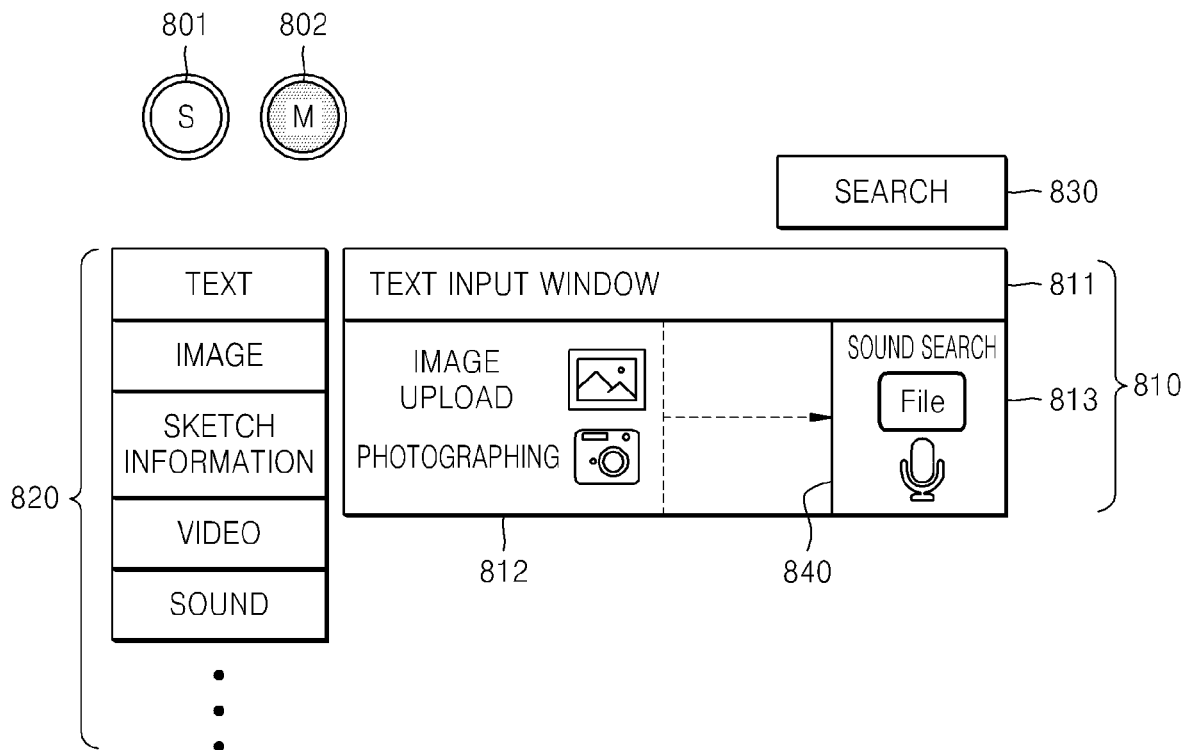

Moreover, an area of each query component input region included in the query input window 810 may be changed or may vary. For example, when a text input to the first query component input region 811 is difficult to be displayed in an entirety of the first query component input region 811, an area of the first query component input region 811 may increase. As another example, as illustrated in FIG. 14, a boundary 840 between query component input regions may be moved based on a user input. Here, the user input may be an input that drags the boundary 840, although it is understood that one or more other exemplary embodiments are not limited thereto.

Figure 15:
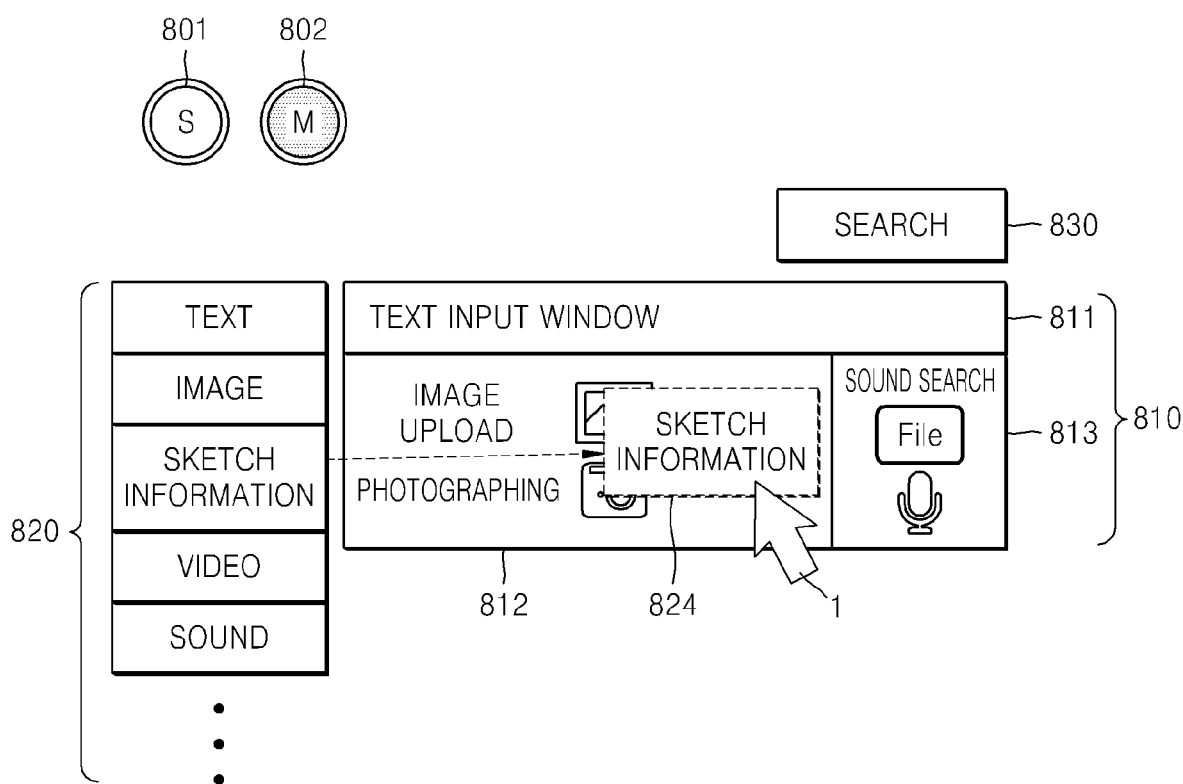
Figure 16:
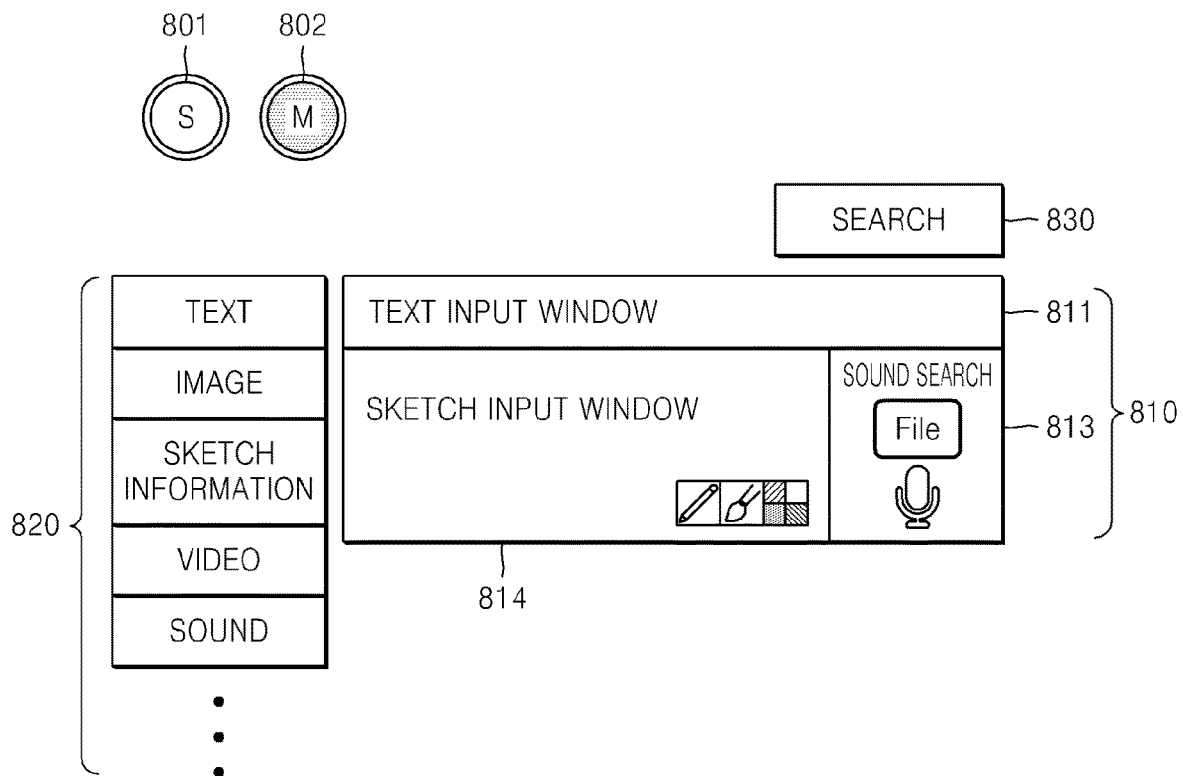

Furthermore, a user interface displayed in a query component input region may be changed to a user interface for inputting a query component corresponding to another query type. Referring to FIG. 15, an object 824 corresponding to sketch information among the objects included in the single query type list 820 may be received, and an event generated by the user 1 may be received as a user input that selects the second query component input region 812. Here, the user input may be a drag-and-drop event that starts from the object 824 displayed in the single query type list 820 and ends in the second query component input region 812, but is not limited thereto. In this case, as illustrated in FIG. 16, a sketch input window 814 for inputting sketch information may be displayed in the second query component input region 812 of FIG. 15.

Figure 17:
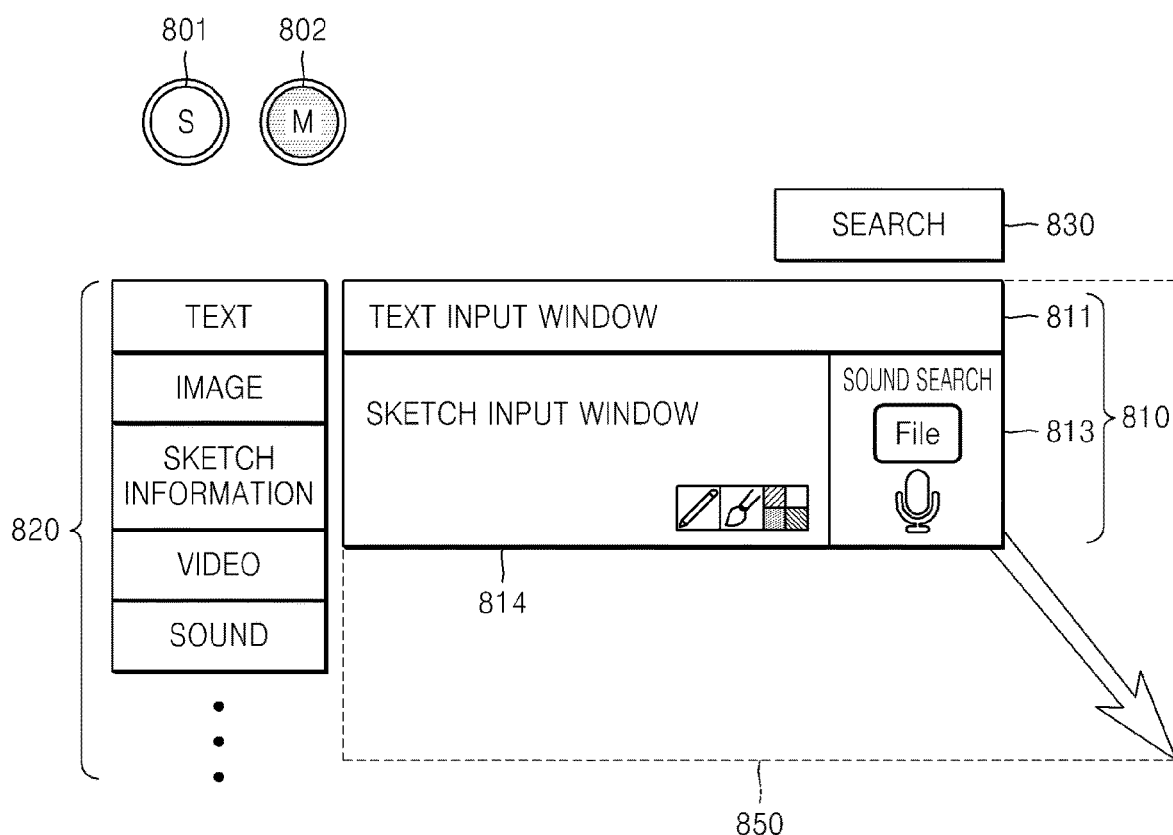

Also, a size of the query input window 810 may be changed according to a user input. The query input window 810 may be enlarged or reduced according to the user input. As illustrated in FIG. 17, when the user input is received, the query input window 810 may be displayed in an enlarged or reduced region 850. Here, the user input may be an input that drags an edge of the query input window 810, although it is understood that one or more other exemplary embodiments are not limited thereto.

Figure 18:
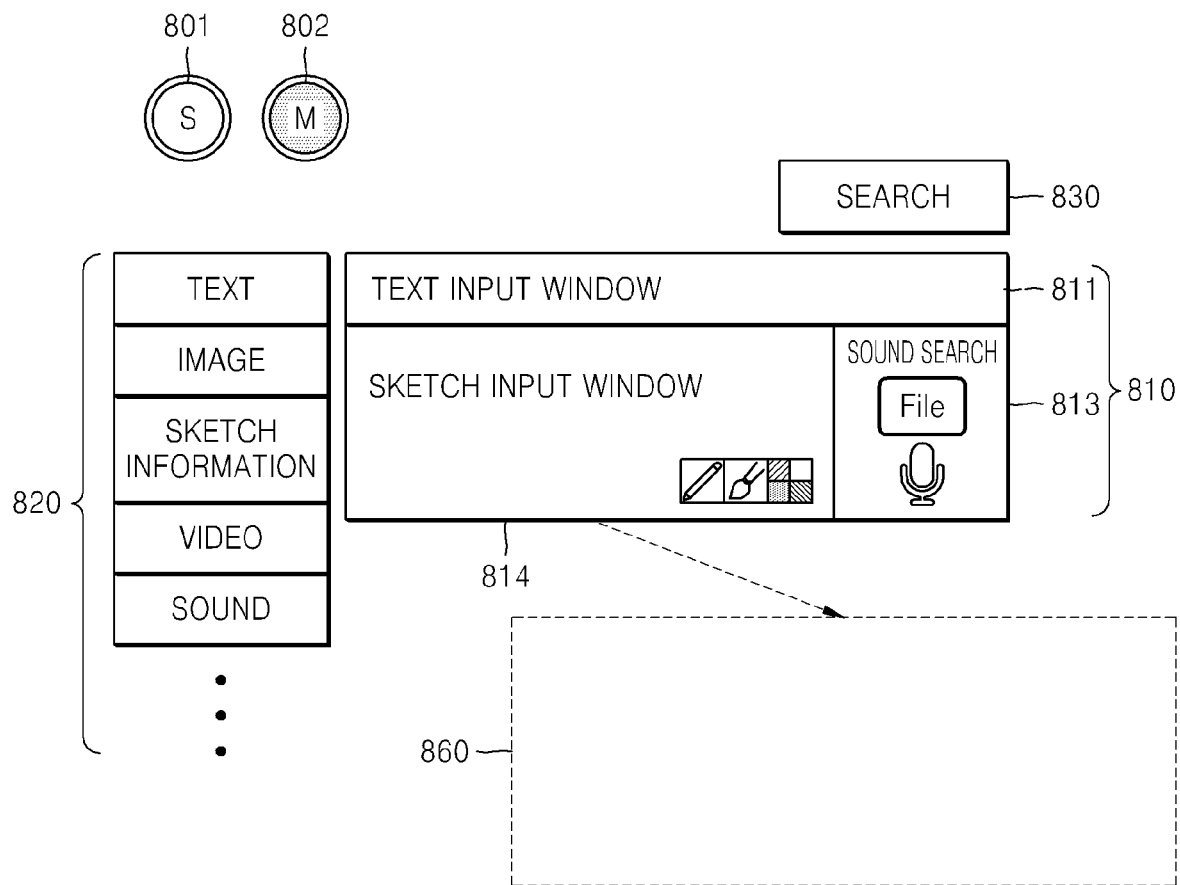

Moreover, a position in which the query input window 810 is displayed may be moved according to a user input. As illustrated in FIG. 18, when the user input is received, the query input window 810 may be displayed in a moved region 860. Here, the user input may be an input that drags a partial position of the query input window 810, although it is understood that one or more other exemplary embodiments are not limited thereto.

Figure 19:
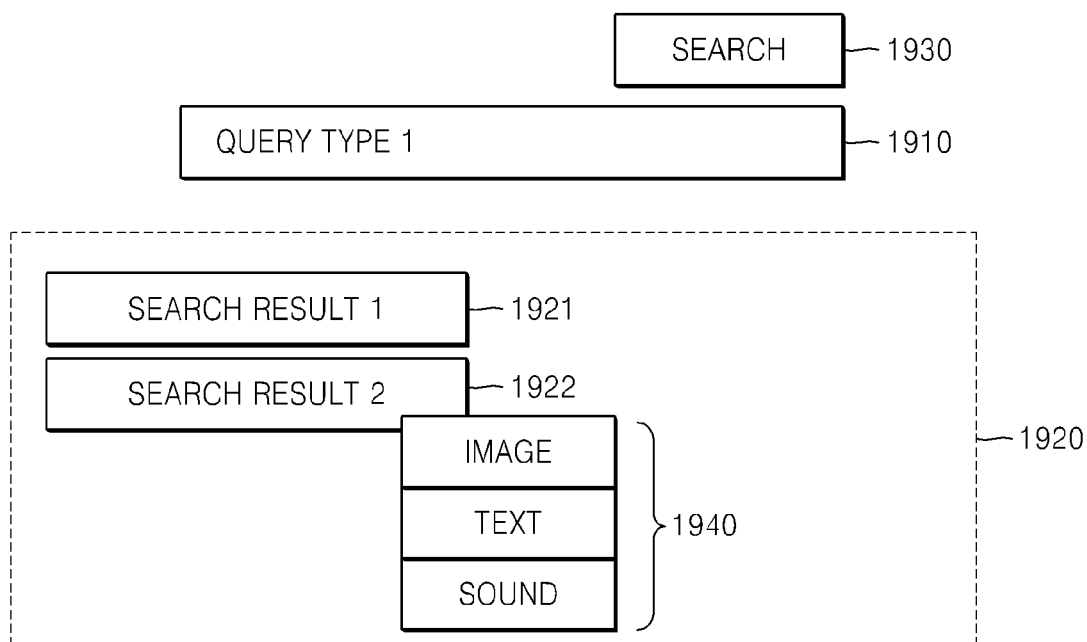
FIGS. 19 and 20 are exemplary diagrams illustrating a method of receiving a query for a multimodal search, according to another exemplary embodiment.
Figure 20:
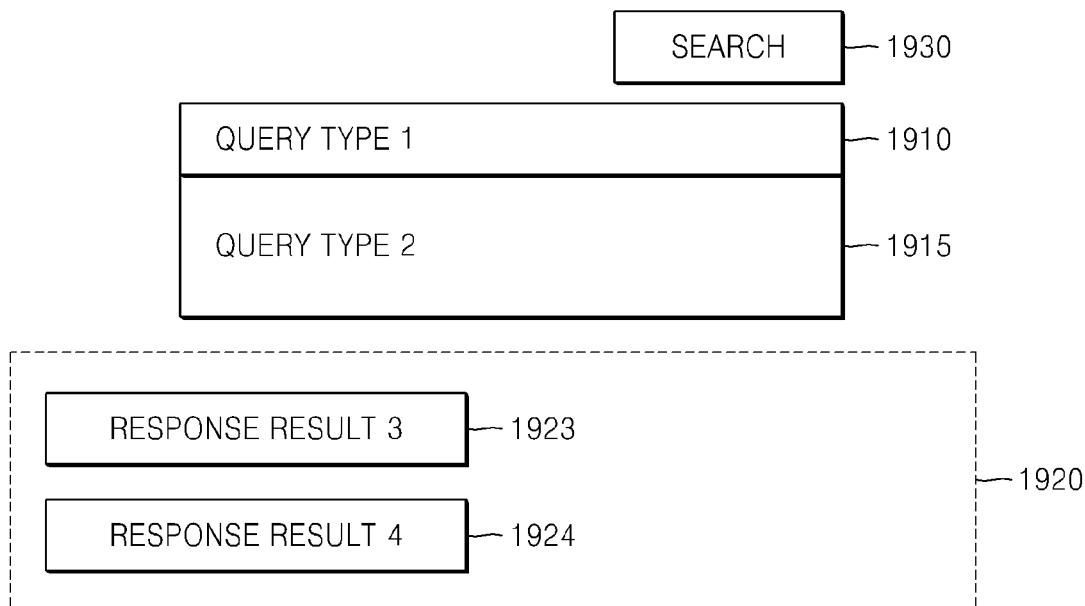

FIGS. 19 and 20 are exemplary diagrams illustrating a method of receiving a query for a multimodal search, according to another exemplary embodiment. FIG. 19 is an exemplary diagram illustrating a screen that is obtained by performing a search based on the single search mode. A query input window may include a first query component input region 1910 for inputting a query component corresponding to a first query type. A query component is received through the first query component input region 1910, and then, when a search button 1930 is selected, a search may be performed based on a query including the received query component. Here, the search may be performed by using a search engine included in the query input device. Alternatively, the query input device may transmit the query to a search engine server and receive a response to the query, and thus, the search may be performed.

Search results may be displayed in a result display region 1920 as a result of the search. Referring to FIG. 19, a first search result 1921 and a second search result 1922 may be displayed in the result display region 1920.

Subsequently, when at least one search result is selected from among the displayed search results on the basis of a user input, a query type list 1940 may be displayed. Referring to FIG. 19, when the second search result 1922 is selected, the query type list 1940 may be displayed near the second search result 1922. In FIG. 19, the query type list 1940 is illustrated as a set of objects configured with buttons, but each of the objects may be replaced by various forms, for example, an icon, a widget, etc., in one or more other exemplary embodiments.

When a query type is selected from the query type list 1940 of FIG. 19, the query input device may switch the search mode from the single search mode to the multimodal search mode. Referring to FIG. 20, a second query component input region 1915 for inputting a query component corresponding to the second query type may be further displayed. Subsequently, when a search button 1930 is selected, a multimodal search may be performed based on a query component input to the first query component input region 1910 and a query component input to the second query component input region 1920. In this case, the multimodal search may be performed based on the second search result 1922 and the query component input to the second query component input region 1920, although it is understood that one or more other exemplary embodiments are not limited thereto. For example, according to another exemplary embodiment, the multimodal search may be performed based on the original query component input to the first query component input region 1910 and query component input to the second query component input region 1920. Search results 1923 and 1924 may be displayed in a result display region as a result of the multimodal search.

Figure 21:
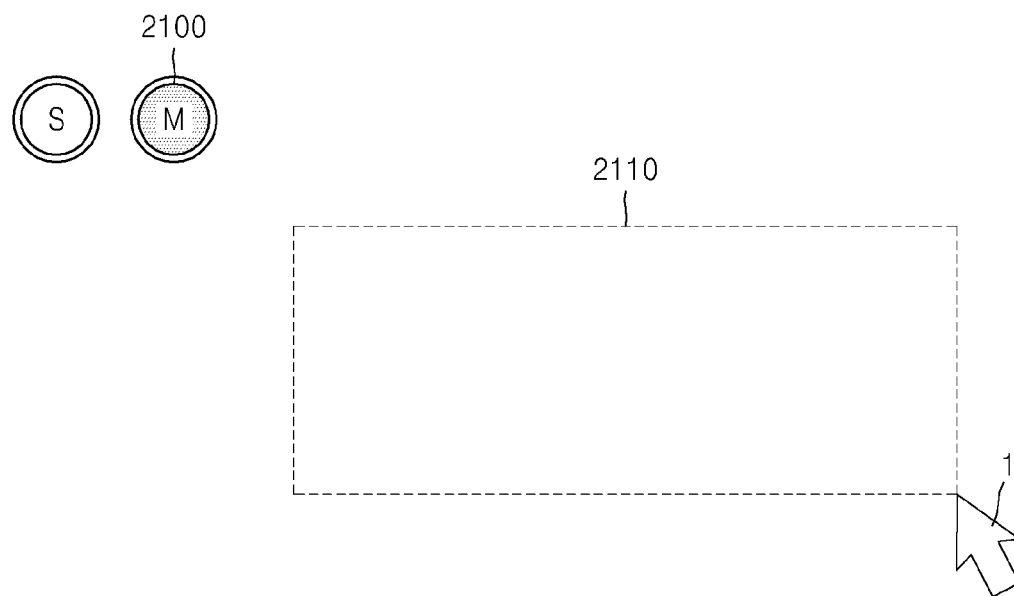
FIGS. 21 and 22 are exemplary diagrams illustrating a method of generating a query input window, according to an exemplary embodiment.
Figure 22:
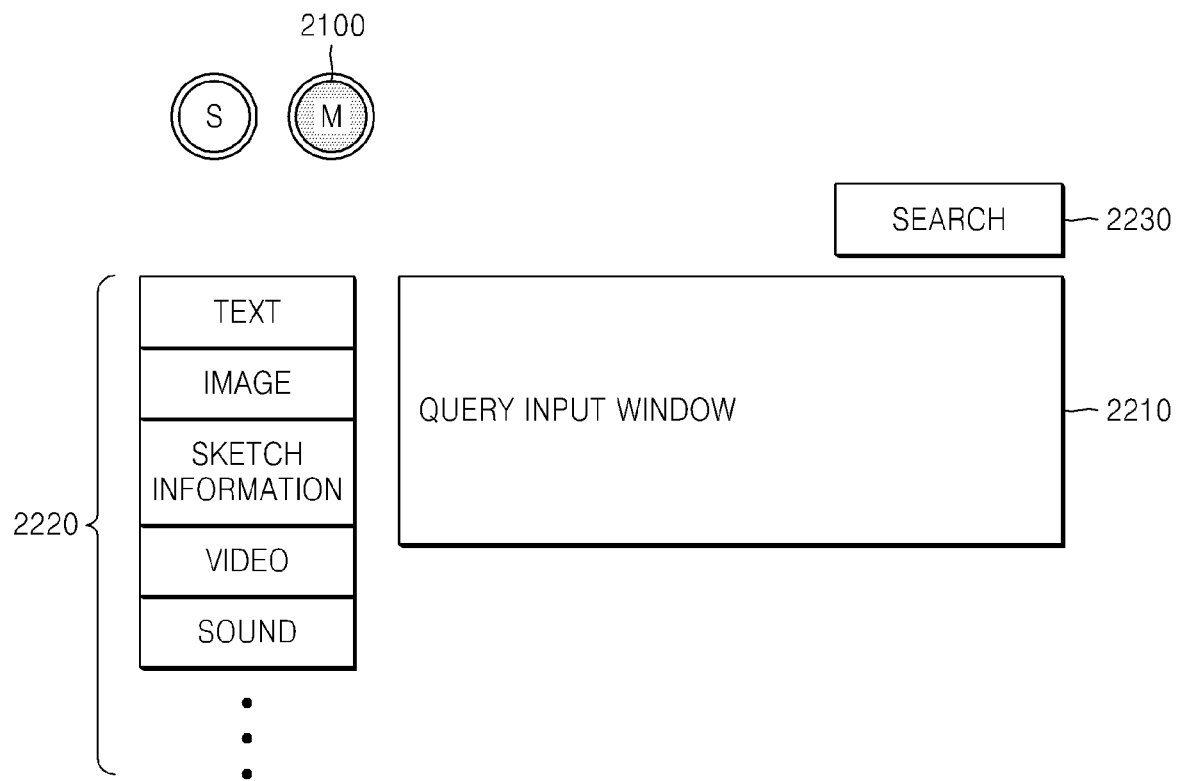

FIGS. 21 and 22 are exemplary diagrams illustrating a method of generating a query input window, according to an exemplary embodiment. According to an exemplary embodiment, a search mode is selected based on a search mode selection object 2100, and then, as illustrated in FIG. 21, an arbitrary region 2110 may be selected or generated based on a user input received from a user 1. Here, the user input may be a drag of an arbitrary position, although it is understood that one or more other exemplary embodiments are not limited thereto. When the arbitrary region 2110 is selected, as illustrated in FIG. 22, a query input window may be displayed in the arbitrary region 2110 according to the selected search mode. For example, when the selected search mode is the single search mode, the query input window may be a single query input window, and when the selected search mode is the multimodal search mode, the query input window may be a query input window. Also, a query type list 2220 and a search button 2230 may be displayed.

Figure 23:
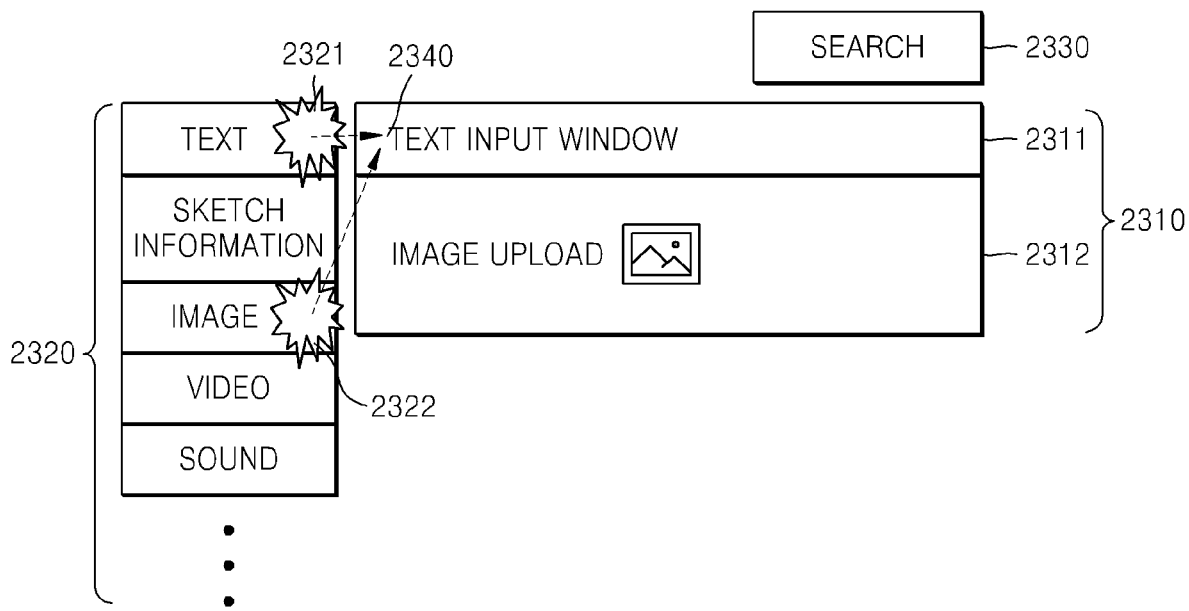
FIG. 23 is an exemplary diagram illustrating a method of receiving a query for a multimodal search, according to another exemplary embodiment.

FIG. 23 is an exemplary diagram illustrating a method of receiving a query for a multimodal search, according to another exemplary embodiment. In the exemplary embodiment of FIG. 23, the query input device may include an input device (e.g., input unit) that simultaneously receives inputs for a plurality of points. For example, the query input device may include a touch screen. While a single query type list 2320 is displayed, a plurality of objects included in the single query type list 2320 may be selected. Referring to FIG. 23, a first object 2321 (in which a query type is a text) and a second object 2322 (in which a query type is an image) may be selected. For example, two fingers of a user may respectively touch the objects 2321 and 2322 which are displayed on the touch screen. A plurality of objects are selected, and when a selected position of each object is moved to one point, a query input window 2310 for receiving query components having a plurality of query types corresponding to the plurality of objects may be displayed. For example, referring to FIG. 23, an input in which the two fingers touching the objects 2321 and 2322 displayed on the touch screen move to one point 2340 in a state of touching the touch screen and then are detached from the touch screen may be received. That is, an input that simultaneously drags and drops the plurality of objects to the one point 2340 may be received. The query input window 2310, which includes a text input window 2311 for inputting a text and an image upload window 2312 for uploading an image, may be displayed. Here, the one point 2340 may not correspond to precisely or exactly the same point. For example, when two points are disposed within an arbitrary distance (e.g., within a predetermined distance) of each other, it may be considered that a plurality of objects are located at one point.

Figure 24:
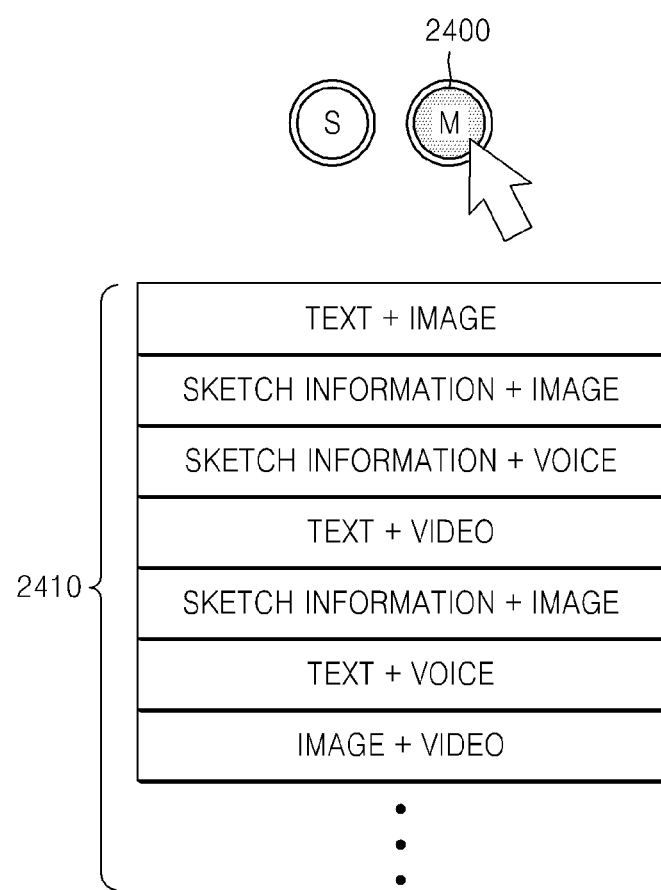
FIG. 24 is an exemplary diagram illustrating a multimodal query type list according to another exemplary embodiment.

FIG. 24 is an exemplary diagram illustrating a multimodal query type list 2410 according to another exemplary embodiment. According to the present exemplary embodiment, when a search mode is the single search mode, the query input device may display a single query type list, and when the search mode is the multimodal search mode, the query input device may display a multimodal query type list. An object included in the multimodal query type list may represent a combination of a plurality of query types. Referring to FIG. 24, when the search mode is set to the multimodal search mode by using a search mode selection object 2400, a multimodal query type list 2410 that denotes a list of a combination type in which two or more query types are combined may be displayed.

FIGS. 25A to 25E are exemplary diagrams illustrating a method of receiving a query for a multimodal search, according to another exemplary embodiment.

Figure 25A:
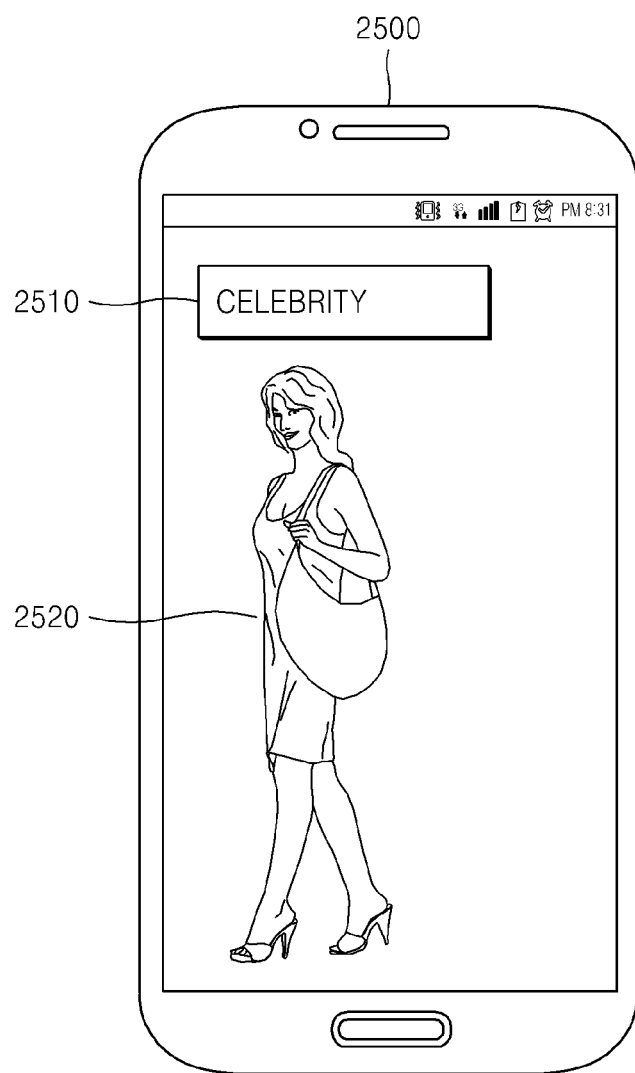
FIGS. 25A to 25E are exemplary diagrams illustrating a method of receiving a query for a multimodal search, according to another exemplary embodiment.

According to the present exemplary embodiment, a query for a multimodal search may be received by using a portion of a search result. Referring to FIG. 25A, a query input device 2500 may display an image 2520 as a search result that is obtained by performing a search based on a query input to a query input window 2510.

Figure 25B:
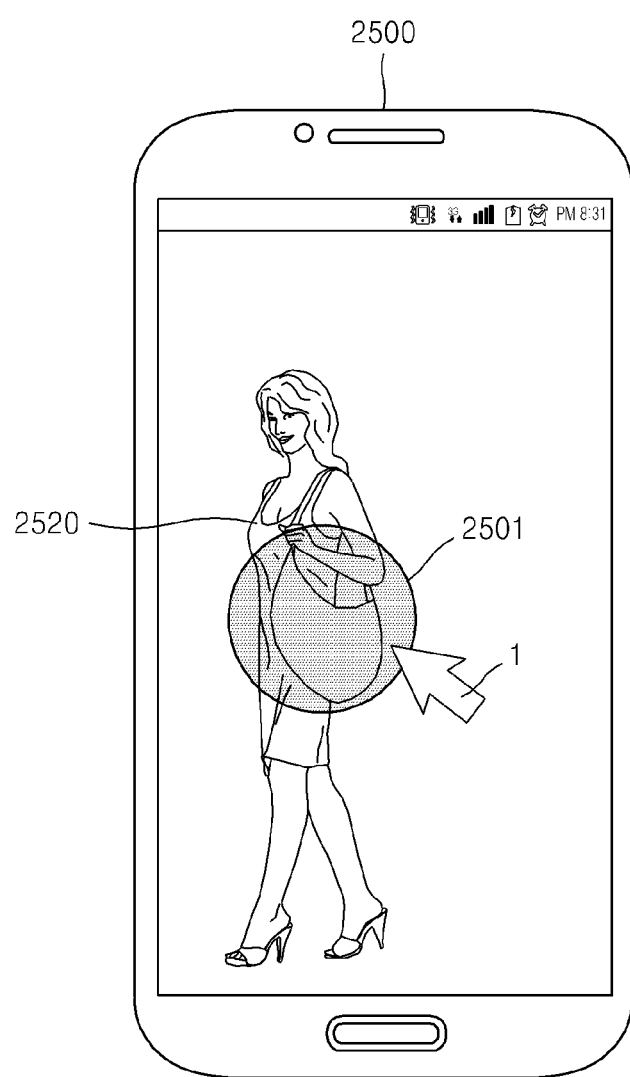
Figure 25C:
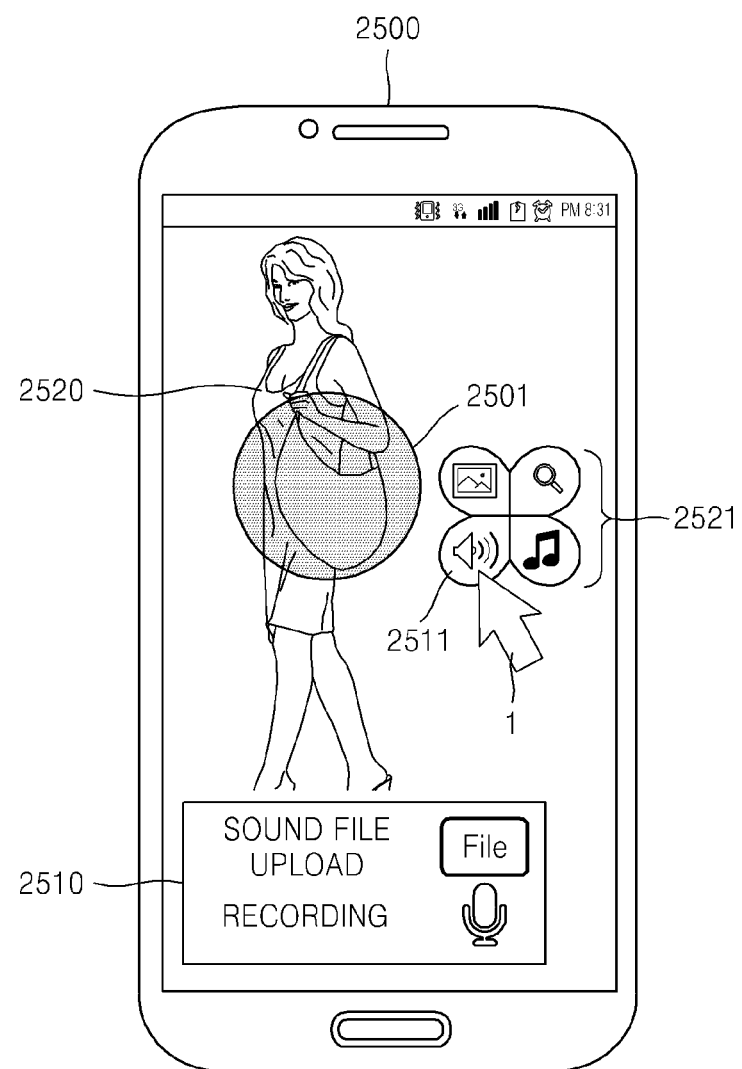

Referring to FIG. 25B, a partial region 2501 of the image 2520 may be selected. The partial region 2501 may be manually selected based on a user input, or may be automatically selected based on an analysis of the search result, for example, image recognition. For example, when a user 1 draws a looped curve by dragging a mouse cursor or using a touch input, the query input device 2500 may determine the inside of the looped curve as the partial region 2501 selected from the image 2520.

When the partial region 2501 is selected from the search result, a query type list may be displayed. According to the present exemplary embodiment, referring to FIG. 25C, the query type list may be displayed in the form of a floating icon or in the form of a floating widget near the selected partial region 2501. The floating icon or the floating widget may be displayed on content, and is an object of which a position is movable.

For the displayed query type list 2520, a user input for selecting a query type may be received from the user 1. When the query type is selected, the query input window corresponding to a displayed query type may be displayed. For example, the partial region 2501 including a bag displayed in the image 2520 illustrated in FIG. 25C may be selected. Subsequently, when an icon 2511 corresponding to voice search among a plurality of query types is selected from among a plurality of displayed floating icons 2521, the query input window 2510 for inputting a query component (in which a query type is a voice) may be displayed.

Figure 25D:
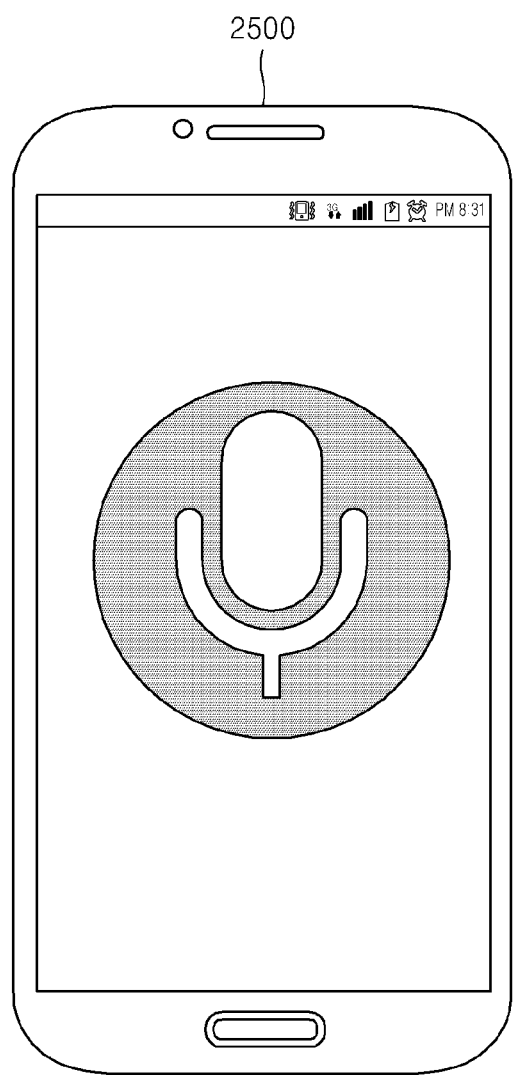
Figure 25D:

According to an exemplary embodiment, the query input window 2510 for inputting the query component (in which the query type is a voice) may include a voice (i.e., audio) recording icon. When the user 1 selects the voice recording icon, the query input device 2500 may operate a microphone, and execute an application that is used to acquire voice information. Referring to FIG. 25D, when the application for acquiring the voice information is being executed, the user 1 may input a voice to the query input device 2500.

Figure 25E:
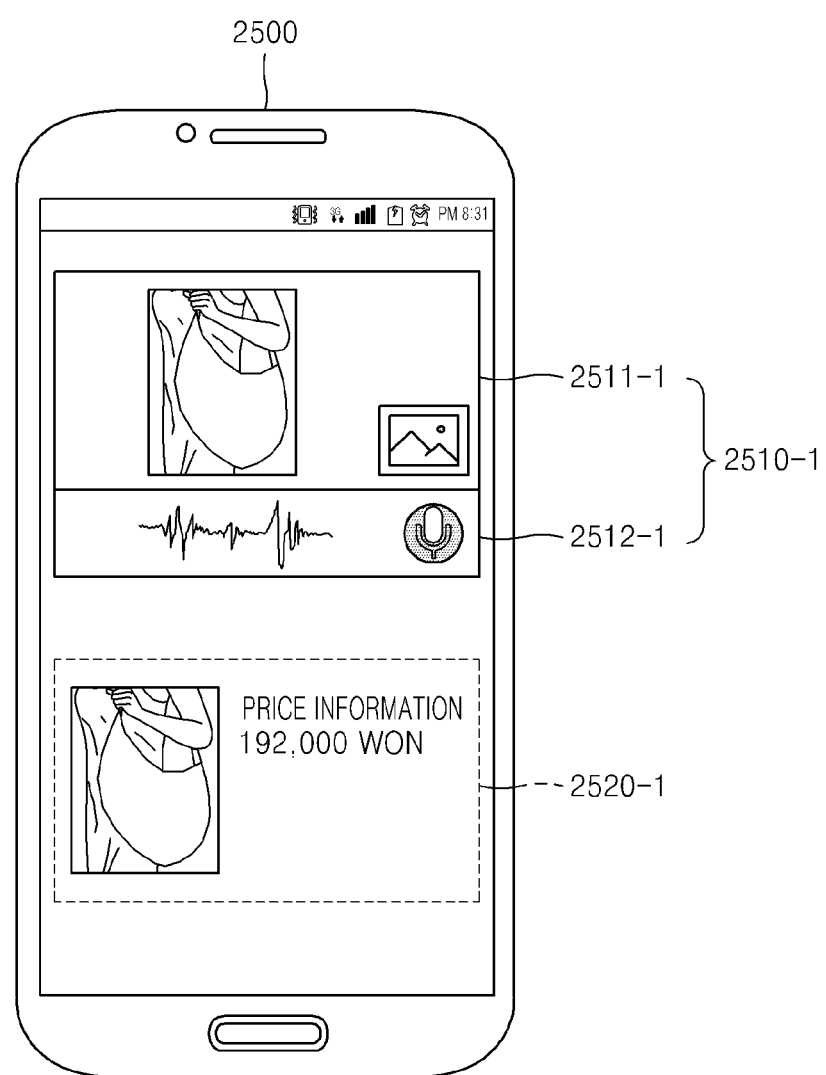

When query components are input through the query input window 2510, the query input device 2500 may receive, as the query components, a portion of a selected search result (e.g., corresponding to the partial region 2501 selected from the image 2520) and information that is input through the query input window 2510. Referring to FIG. 25E, a query input window 2510-1 that includes an image input region 2511-1 (in which an image with a bag displayed therein is displayed) and a voice input region 2512-1 (in which at least one of a waveform of input voice information, a predetermined waveform, and a text converted from the voice information is displayed) may be displayed as display items corresponding to a query. Here, the waveform of the input voice information may be a waveform corresponding to at least one of a predetermined portion of the voice information (e.g., a beginning of the voice information), a predetermined length of the voice information, a predetermined audio feature or characteristic of the voice information, etc. As illustrated in FIG. 25D, when voice information "price" is input, the query input device 2500 may perform a multimodal search based on a query that includes an image, including a bag, and a voice "price". As illustrated in FIG. 25E, the query input device 2500 may display information about the price of the bag, included in the image, in a search result display region 2520-1 as a search result obtained by performing the multimodal search.

Figure 26:
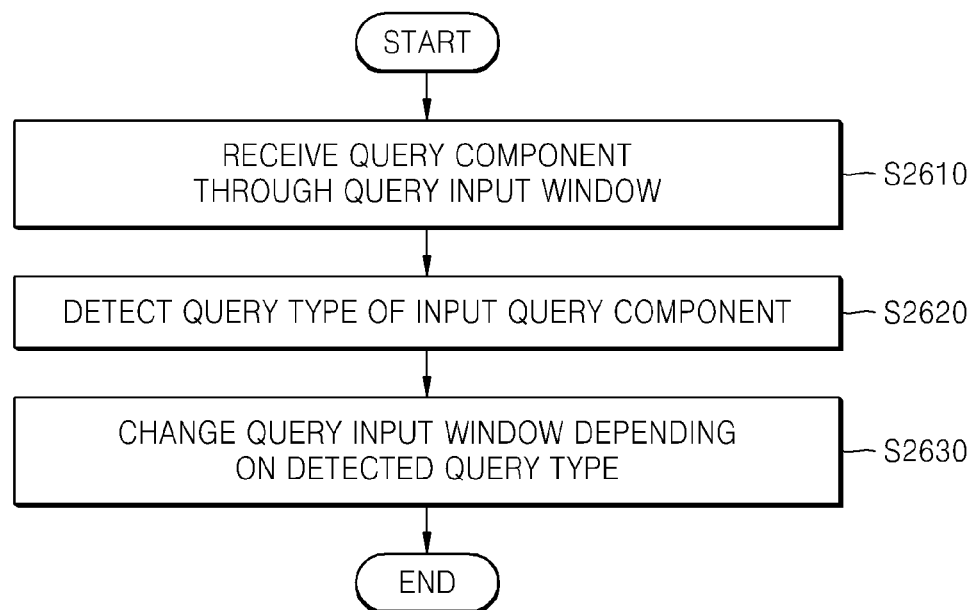
FIG. 26 is a flowchart illustrating a process of displaying a query input window, according to an exemplary embodiment.
Figure 27:
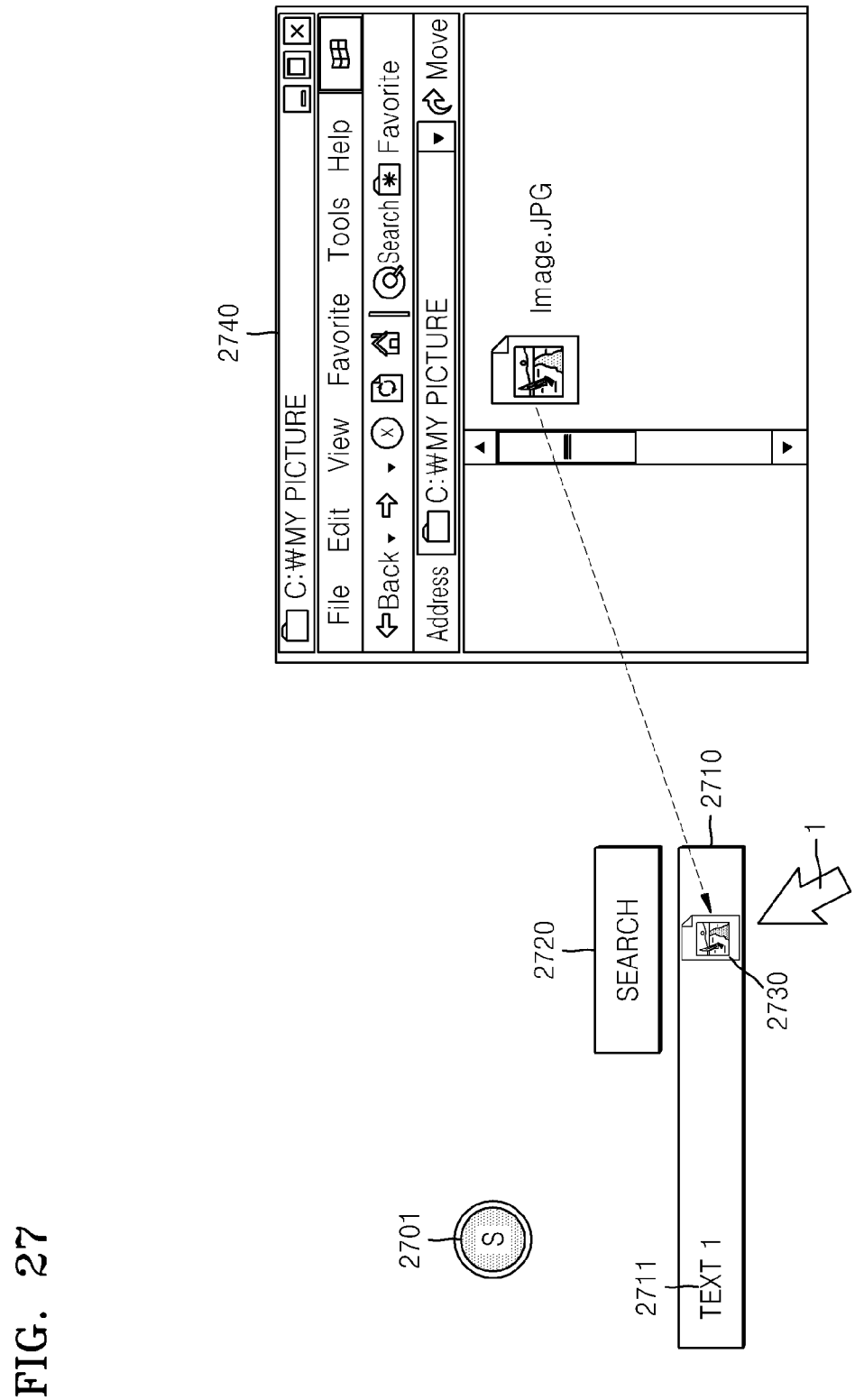
FIGS. 27 and 28 are exemplary diagrams illustrating a method of displaying a query input window, according to an exemplary embodiment.
Figure 28:

FIG. 26 is a flowchart illustrating a process of displaying a query input window, according to an exemplary embodiment. FIGS. 27 and 28 are exemplary diagrams illustrating a method of displaying a query input window, according to an exemplary embodiment. According to an exemplary embodiment, a query component may be input in a state in which a query type is not selected before a query is input.

In operation S2610, the query input device may receive a query component through a query input window. A method of receiving a query component may be variously implemented. Referring to FIG. 27, the query input device may display an indicator 2701 indicating a set search mode, a query input window 2710, and a search button 2720. The query input window 2710 of FIG. 27 includes a user interface 2711 for inputting a query component in which a query type is a text. Here, the query input device may receive an input, through which a file icon 2730 (included in a file search window 2740) is dragged and dropped to the query input window, from a user 1 in order to receive a query component. However, it is understood that one or more other exemplary embodiments are not limited to a drag-and-drop input method. For example, the file could be selected by a clicking operation (e.g., double clicking) according to another exemplary embodiment. Furthermore, the file search window 2740 is not limited to a form illustrated in FIG. 27. For example, according to another exemplary embodiment, the file search window 2740 of FIG. 27 may be displayed by dividing a screen of the query input device, or may be displayed by changing the screen of the query input device to a file search screen.

In operation S2620, the query input device may detect a query type of the received query component. A method of detecting a query type may be variously implemented. For example, when the received query component is a file, the query input device may detect the query type of the query component according to an extension of the file. In this case, when the extension of the file is jpg, gif, or bmp, the query input device may determine the query type of the query component as an image, and when the extension of the file is avi, mp4, or wmv, the query input device may determine the query type of the query component as a video. Alternatively, when an application is been used for receiving the query component, the query input device may detect a query type of the query component according to the kind of the application. For example, when information acquired by using a camera application is received as a query component, the query input device may determine a query type of a query component as an image, and when a query component is received by using a voice recording application, the query input device may determine a query type of the received query component as voice information.

In operation S2630, the query input device may change a query input window so as to include a user interface through which the query component corresponding to the detected query type is received (and through which a display item corresponding to the previously received query component is displayed). Referring to FIG. 28, when an image file is received as in FIG. 27, the query input device may change a query input window 2710, configured with a text input box that is the user interface 2711 through which a text is input, to another query input window 2710 which is configured with an image upload tool for inputting an image 2712.

Figure 29:
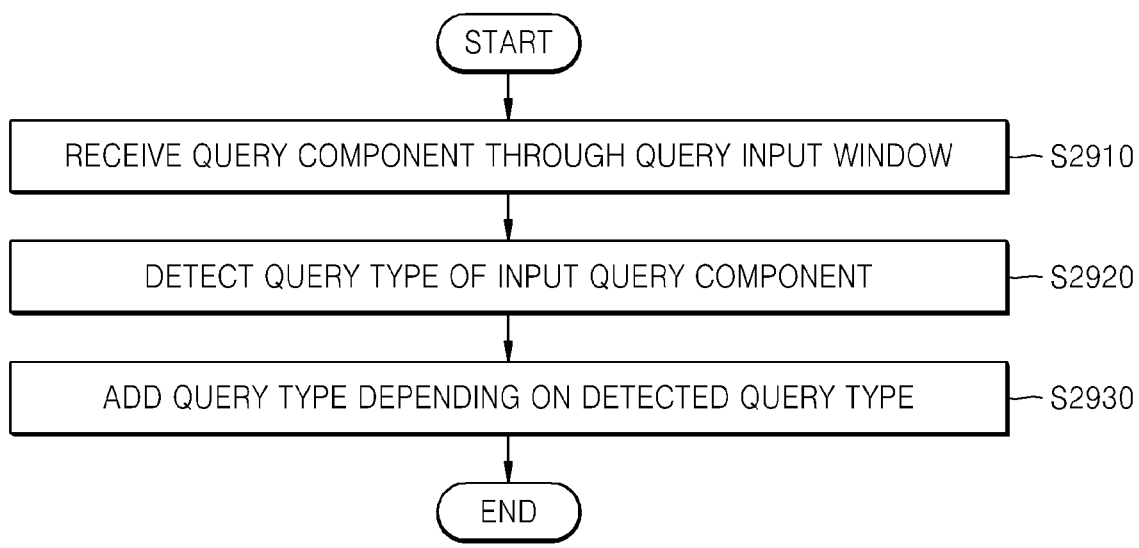
FIG. 29 is a flowchart illustrating a process of receiving a query, according to an exemplary embodiment.
Figure 30:
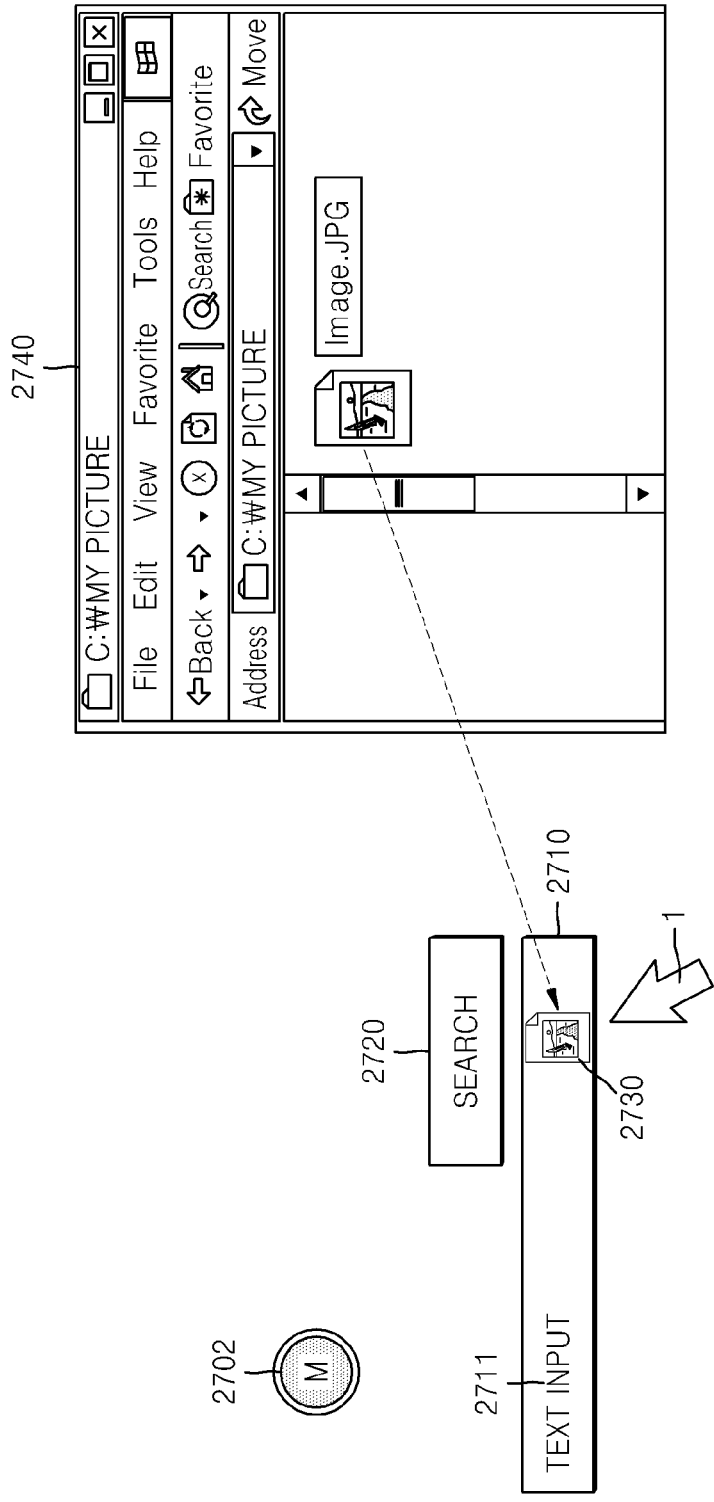
FIGS. 30 to 32 are exemplary diagrams illustrating a method of receiving a query, according to an exemplary embodiment.
Figure 31:
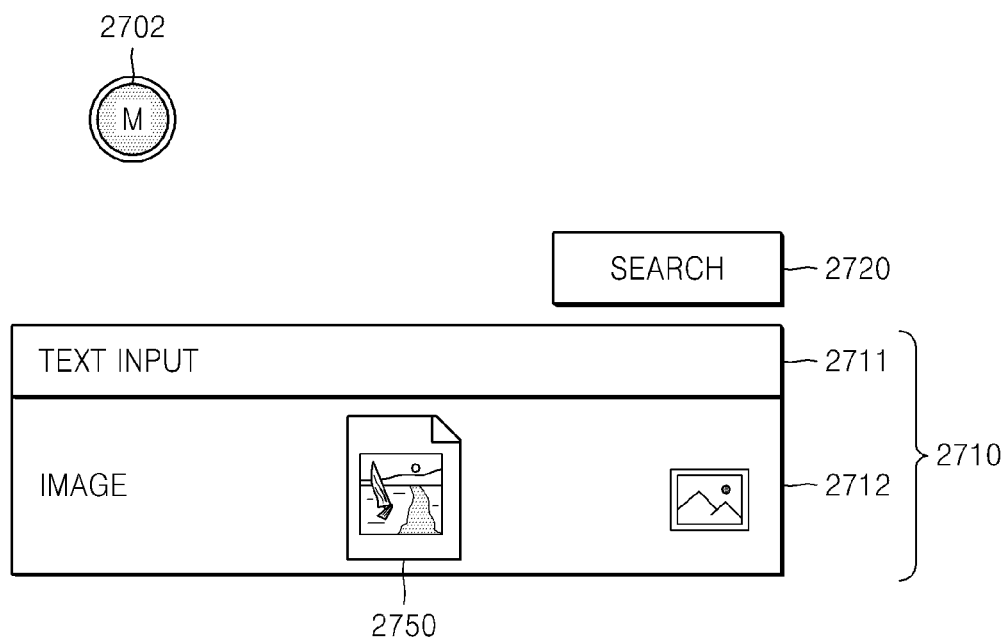
Figure 32:
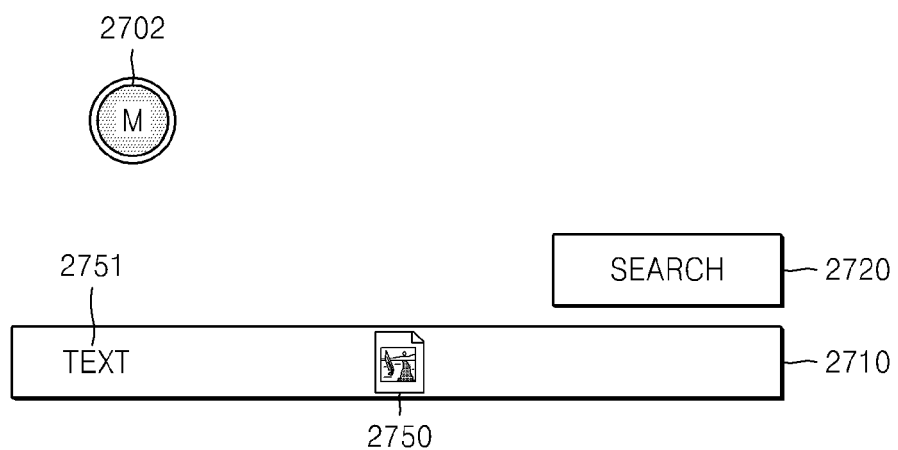

FIG. 29 is a flowchart illustrating a process of receiving a query, according to an exemplary embodiment. FIGS. 30 to 32 are exemplary diagrams illustrating a method of receiving a query, according to an exemplary embodiment. According to an exemplary embodiment, a query component may be input without first selecting a query type.

In operation S2910, the query input device may receive a query component through a query input window. A method of receiving a query component may be variously implemented. Referring to FIG. 30, the query input device may display an indicator 2702 indicating a set search mode, a query input window 2710, and a search button 2720. In FIG. 30, the query input window 2710 is illustrated as including a user interface 2711 for inputting a query component in which a query type is a text. Here, the query input device may receive an input through which a file icon 2730 (included in a file search window 2740) is dragged and dropped to the query input window, from a user 1 in order to receive a query component. However, it is understood that one or more other exemplary embodiments are not limited to a drag-and-drop input method. For example, the file could be selected by a clicking operation (e.g., double clicking) according to another exemplary embodiment. Furthermore, the file search window 2740 is not limited to a form illustrated in FIG. 30. For example, according to another exemplary embodiment, the file search window 2740 of FIG. 30 may be displayed by dividing a screen of the query input device, or may be displayed by changing the screen of the query input device to a file search screen.

In operation S2920, the query input device may detect a query type of the received query component. A method of detecting a query type may be variously implemented. For example, when the received query component is a file, the query input device may detect the query type of the query component according to an extension of the file. Alternatively, when an application is used for receiving the query component, the query input device may detect a query type of the query component according to the kind of the application.

In operation S2930, the query input device may add a query type, which is to be used to perform a multimodal search, according the detected query type. Accordingly, the query input device may add a region, which receives a query component corresponding to the added query type (and which displays a display item corresponding to the previously received query component), into the query input window. Referring to FIG. 31, since the query type is added, a region in which the query input window 2710 is displayed may be enlarged. Also, a user interface 2712 for inputting an image may be displayed in a region where the query input window is enlarged. Information 2750 about the received query component, such as a preview, an icon, or a filename, may be displayed in the added region.

While in the present exemplary embodiment, the query input window 2710 is expanded to include the user interface 2712 corresponding to the added query type, it is understood that one or more other exemplary embodiments are not limited thereto. For example, according to another exemplary embodiment, a form of the query input window 2710 displayed by the query input device may not be changed. Also, an internal region of the query input window 2710 may not be divided. In this case, a plurality of query components, respectively corresponding to different query types input through the query input window 2710, may be displayed together in the query input window 2710.

According to another exemplary embodiment, when a search mode is the multimodal mode, the query input window may include a region, which displays a received query component (i.e., which displays a display item corresponding to a previously received query component), and a region for receiving a query component. According to an exemplary embodiment, when the region for receiving the query component is selected, the query input device may execute an operation of receiving the query component. For example, in order to receive a query component in which a query type is voice information, the query input device may stand by in a state where a microphone is operated. In operation S2910, the query input device may sequentially or simultaneously receive a plurality of query components corresponding to a plurality of query types through a region of the query input window that is used to receive a query component. For example, when a user writes search in red while drawing a bicycle, the query input device may receive, as a query component, sketch information indicating the bicycle drawn by the user and voice information including a keyword "red".

In operation S2920, the query input device may detect a query type of the received query component. For example, when the received query component is a file, the query input device may detect the query type of the query component according to an extension of the file. Alternatively, when an application is used for receiving the query component, the query input device may detect a query type of the query component according to the kind of the application. As another example, when a picture is taken by using a camera, the query input device may detect that a query type of a query component is an image. Alternatively, when a character included in the picture is recognized by using optical character recognition (OCR), a text may be detected as a query type. When the query type of the received query component is detected, the query input device may display the received query component (or a display item corresponding to the received query component) in a region that displays the received query component, based on the detected query type. For example, when a query type detected from a first query component is a video, the query input device may display a preview of the video in a region that displays the first query component, and when a query type detected from a second query component is a text, the query input device may display a keyword in a region that displays the second query component. Alternatively, when a query type detected from a query component is voice information, the query input device may display, in the region that displays the query component, at least one of a voice waveform, included in the voice information or corresponding to a predetermined waveform, and text converted from the voice information. The query input device may repeatedly perform operations S2910 and S2920 to receive a plurality of query components, and may display the received query components so as to enable the user to check the query components.

When the query type is detected in operation S2920, the query input device may add a query type that is to be used for a query in operation S2930. When the query input device receives an input corresponding to a search command, the query input device may generate a query including the added query type. The query input device may perform a search, based on the query including the received query components and the detected query types. The query input device may display one or more search results as a result of the search.

Figure 33:
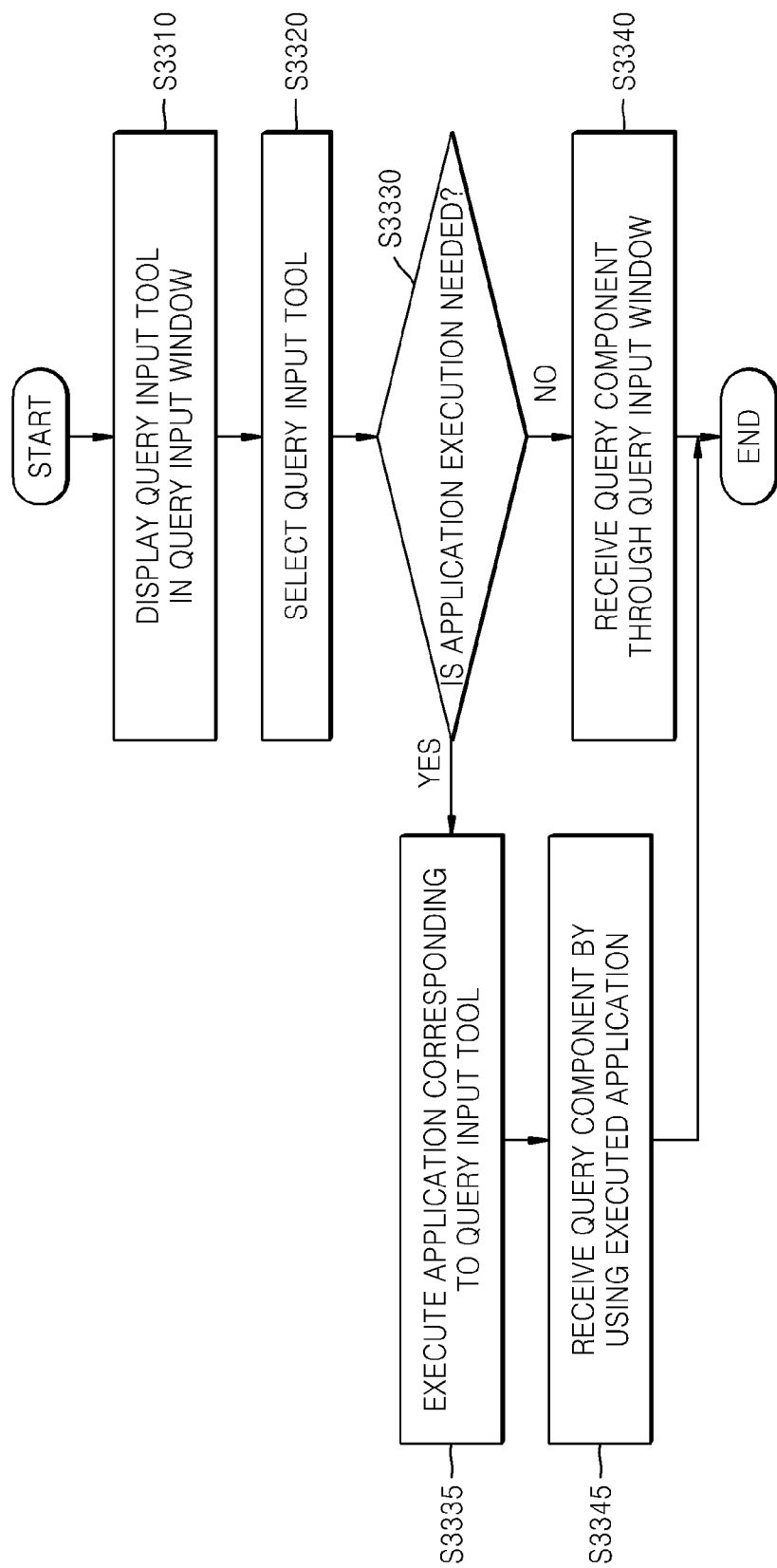
FIG. 33 is a flowchart illustrating a process of receiving a query, according to an exemplary embodiment.

When a query type is changed, a method of receiving a query component may be changed. Also, various methods of receiving a query component may be provided for one query type. Therefore, a user interface that is provided to a user for inputting a query component may be changed or may vary depending on a query type. FIG. 33 is a flowchart illustrating a process of receiving a query, according to an exemplary embodiment.

Referring to FIG. 33, in operation S3310, the query input device may display a query input tool in a query input window. Here, the query input tool denotes a user interface that is provided to a user for inputting a query component. In operation S3310, the query input device may display a query input tool according to a query type included in a query that is input through the query input window. An example of the query input tool displayed according to a query type will be described in detail below with reference to FIGS. 34 to 40.

In operation S3320, the query input device may select at least one from among a plurality of the query input tools displayed in the query input window. Specifically, in operation S3320, the query input device may receive a user input, and select a query input tool according to the received user input. The type or form of user input may vary. For example, the query input tool may be selected according to an operation in which a part of a human body, a stylus, etc., touches the query input tool displayed on the touch screen, or a mouse curser clicks the displayed query input tool.

In operation S3330, the query input device may determine whether it is to execute an application for receiving a query component, based on the selected query input tool. For example, when the selected query input tool is a text box, the query input device may determine that the query component may be directly received through the text box without executing a separate application. That is, when the separate application is not to be executed, the query input device may receive the query component through the query input window in operation S3340.

When the separate application for receiving the query component is to be executed, the query input device may execute an application corresponding to the query input tool in operation S3335. The application corresponding to the query input tool may be predetermined, or may be selected from an application list by a user. Accordingly, the query input device may receive the query component by using the executed application in operation S3345.

FIGS. 34 to 40 are exemplary diagrams illustrating a method of receiving a query component by using a query input tool displayed in a query input window, based on a query type included in a query. FIGS. 34 to 40 are merely examples for describing one or more exemplary embodiments, and it is understood that one or more other exemplary embodiments are not limited thereto.

Figure 34:
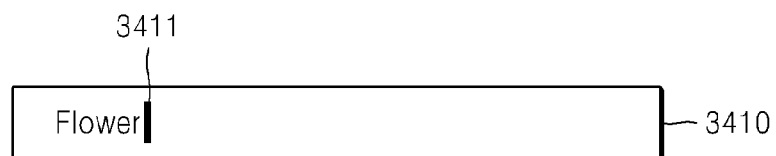
FIG. 34 is an exemplary diagram illustrating a method of receiving a query component in which a query type is a text, according to an exemplary embodiment.
Figure 35:
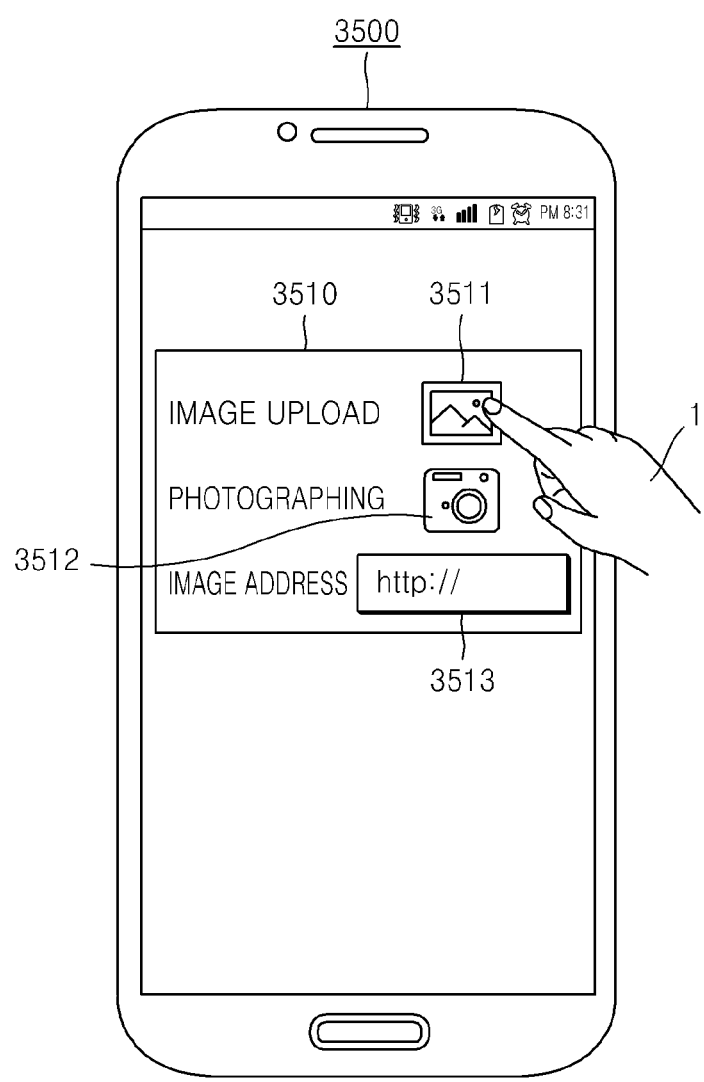
FIGS. 35 to 38 are exemplary diagrams illustrating a method of receiving a query component in which a query type is an image, according to an exemplary embodiment.
Figure 36:
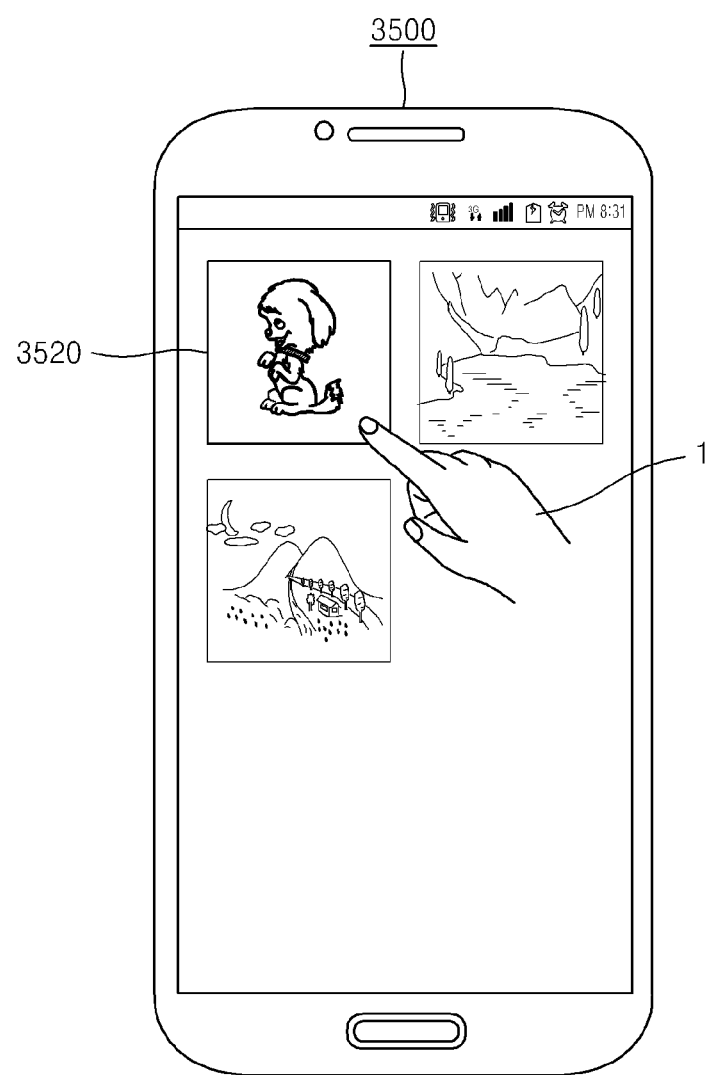

FIG. 34 is an exemplary diagram illustrating a method of receiving a query component in which a query type is a text, according to an exemplary embodiment.

When a text mode is included in a query, the query input window may include a text box 3410, which is as illustrated in FIG. 34. When the text box 3410 is selected, a cursor 3411 indicating a position to which a text is to be input may be displayed in the text box 3410. The text may be input via a keyboard, a keypad, a writing pad to receive handwriting text, etc. Furthermore, the query input device may receive a copied text through the text box 3410 from a keyboard or a clipboard. A keyword extracted from an input text may be used as a query component in search.

According to another exemplary embodiment, the query input device may acquire a text from an image (e.g., an image that is acquired by operating a camera), by using an OCR operation. Moreover, while the query input tool for receiving a text input is provided as a text box 3410 including a cursor 3411 above, it is understood that one or more other exemplary embodiments are not limited thereto. For example, according to another exemplary embodiment, the query input tool for receiving a text input may include a writing pad to receiving handwriting text that is included in the query and, for example, subsequently converted via an OCR operation by a search engine, or which is converted by the query input device to text via an OCR operation.

FIGS. 35 to 38 are exemplary diagrams illustrating a method of receiving a query component in which a query type is an image, according to an exemplary embodiment. In FIGS. 35 to 38, a query input device 3500 is described as being a handheld device including a camera, although it is understood that one or more other exemplary embodiments are not limited thereto.

When a query received through a query input window includes an image, the query input device 3500 may display a query input window 3510 including one or more tools that are used to receive an image. The one or more tools for receiving the image may each include at least one of an image upload icon 3511, a photographing icon 3512, and an image address input box 3513.

When a user 1 selects the image upload icon 3511, the query input device 3500 may operate to select an image file. For example, referring to FIG. 37, the query input device 3500 may execute a gallery application that displays a preview list of image files. When the user 1 selects at least one image 3520 from the displayed preview list by using the gallery application, the query input device 3500 may receive the selected image 3520 as a query component.

Figure 37:
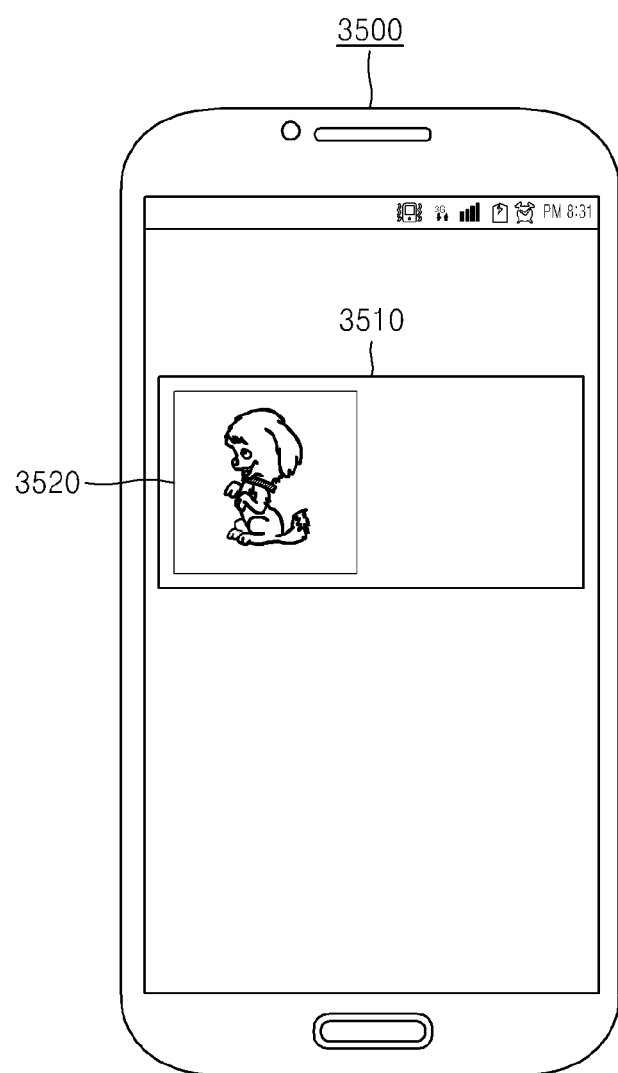

Referring to FIG. 37, when the image 3520 is selected by using the gallery application, the query input device 3500 may end, close, or hide the gallery application, and display the selected image 3520 in the query input window 3510.

Alternatively, according to another exemplary embodiment, the query input device 2500 may divide a display region thereof. In this case, the query input device 3500 may display an execution screen of the gallery application in one of a plurality of divided regions, thereby enabling the user 1 to select an image.

Figure 38:
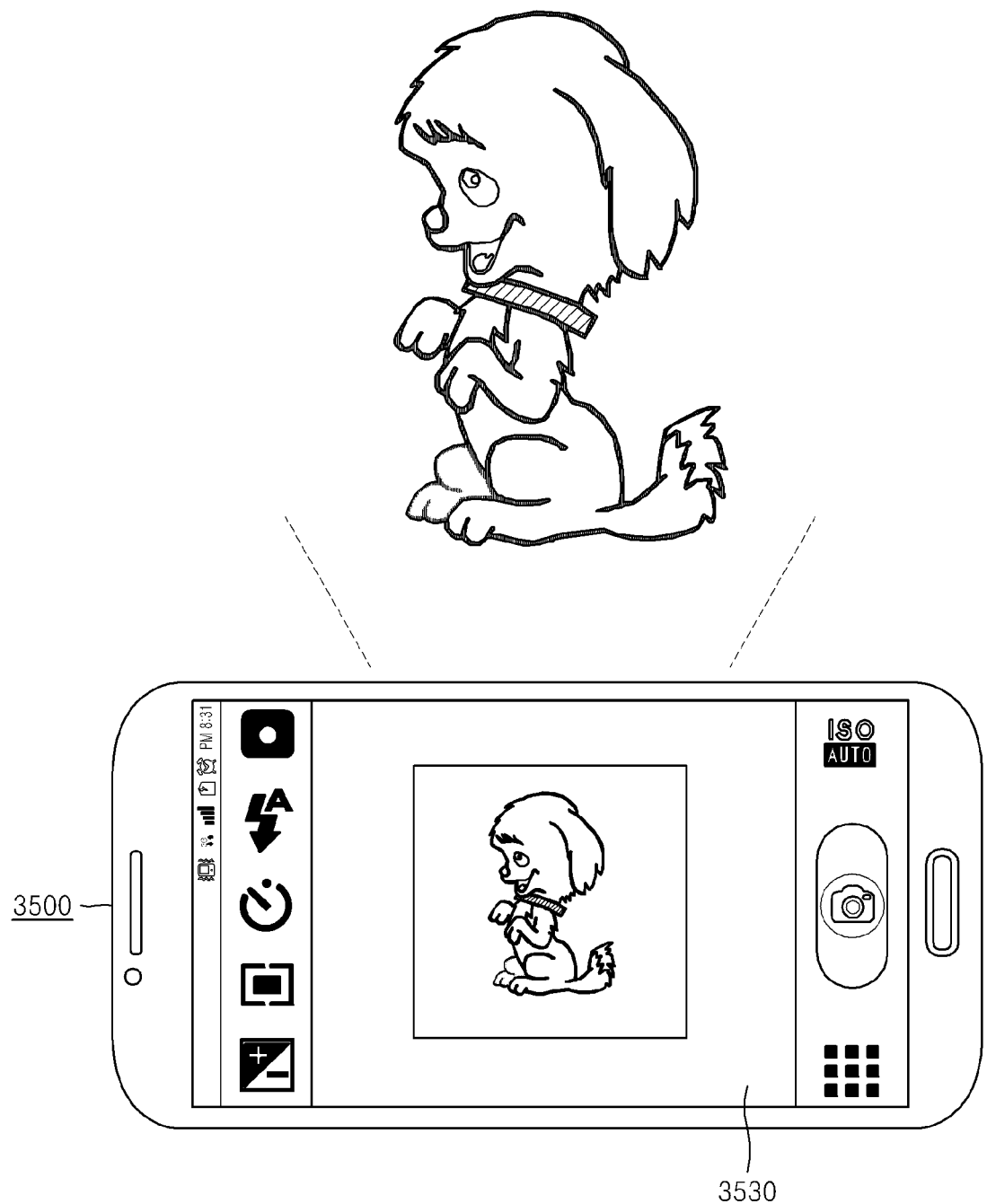

When the user 1 selects the photographing icon 3512, the query input device 3500 may execute an application 3530 that operates a camera for taking a picture, as illustrated in FIG. 38. When an image is generated by using the camera, the query input device 3500 may receive the generated image as a query component, and as illustrated in FIG. 37, the image may be displayed in the query input window 3510.

According to another exemplary embodiment, the user 1 may input an address with an image located thereat by using the image address input window 3513. An image address may be an address indicating a position of an image like a URL address, although it is understood that one or more other exemplary embodiments are not limited thereto.

In FIG. 37, it is illustrated that the image received as the query component is displayed in the query input window 3510, although it is understood that a position at which the image received as the query component is displayed may vary in one or more other exemplary embodiments.

Moreover, a method of receiving a query (in which a query type of a query component is a video) may be implemented similarly to a method of receiving an image as a query component, as described above.

When an image or a video is received as a query component, a keyword may be acquired from the image or video by using image recognition or an OCR operation. A search may be performed by using the acquired keyword. Alternatively, the query input device may compare an image itself with an index to search for a similar image.

Figure 39:
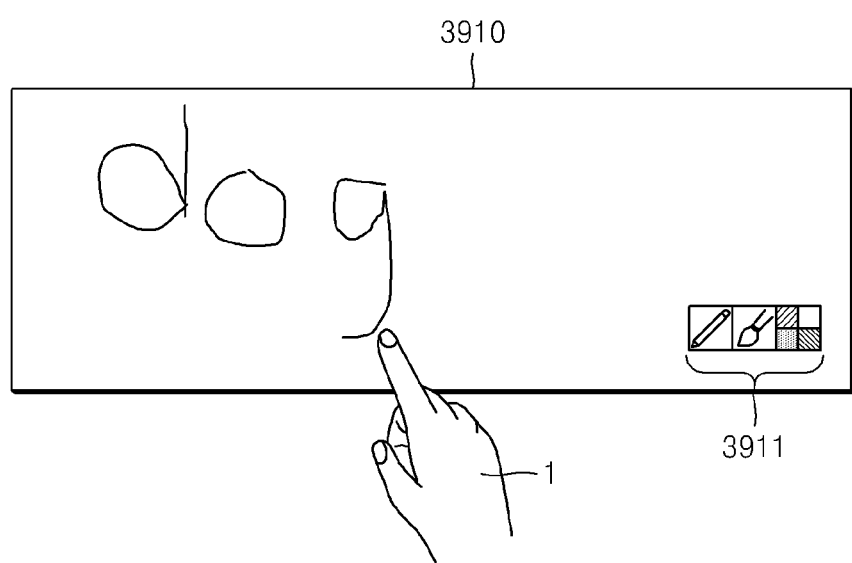
FIG. 39 is an exemplary diagram illustrating a method of receiving a query component in which a query type is sketch information, according to an exemplary embodiment.

FIG. 39 is an exemplary diagram illustrating a method of receiving a query component in which a query type is sketch information, according to an exemplary embodiment.

When a query type included in a query is sketch information, a query input window 3910 may include a sketch input tool 3911 for inputting the sketch information. The sketch input tool 3911 according to an exemplary embodiment may include one or more icons for selecting at least one of a pen mode, a brush mode, a fountain pen mode, a color or thickness of a line, etc. A user 1 may set a sketch input mode by using the sketch input tool 3911, and input sketch information to a region, which receives a query component in which a query type is sketch information, by using a touch input, a mouse input, a track pad input, a gesture input, etc.

When sketch information is received, the received sketch information may be displayed in the query input window 3910. The received sketch information may be converted into a keyword, and the keyword acquired from the sketch information may be used for a search. Alternatively, the search may be performed by using a form of the sketch information itself.

Figure 40:
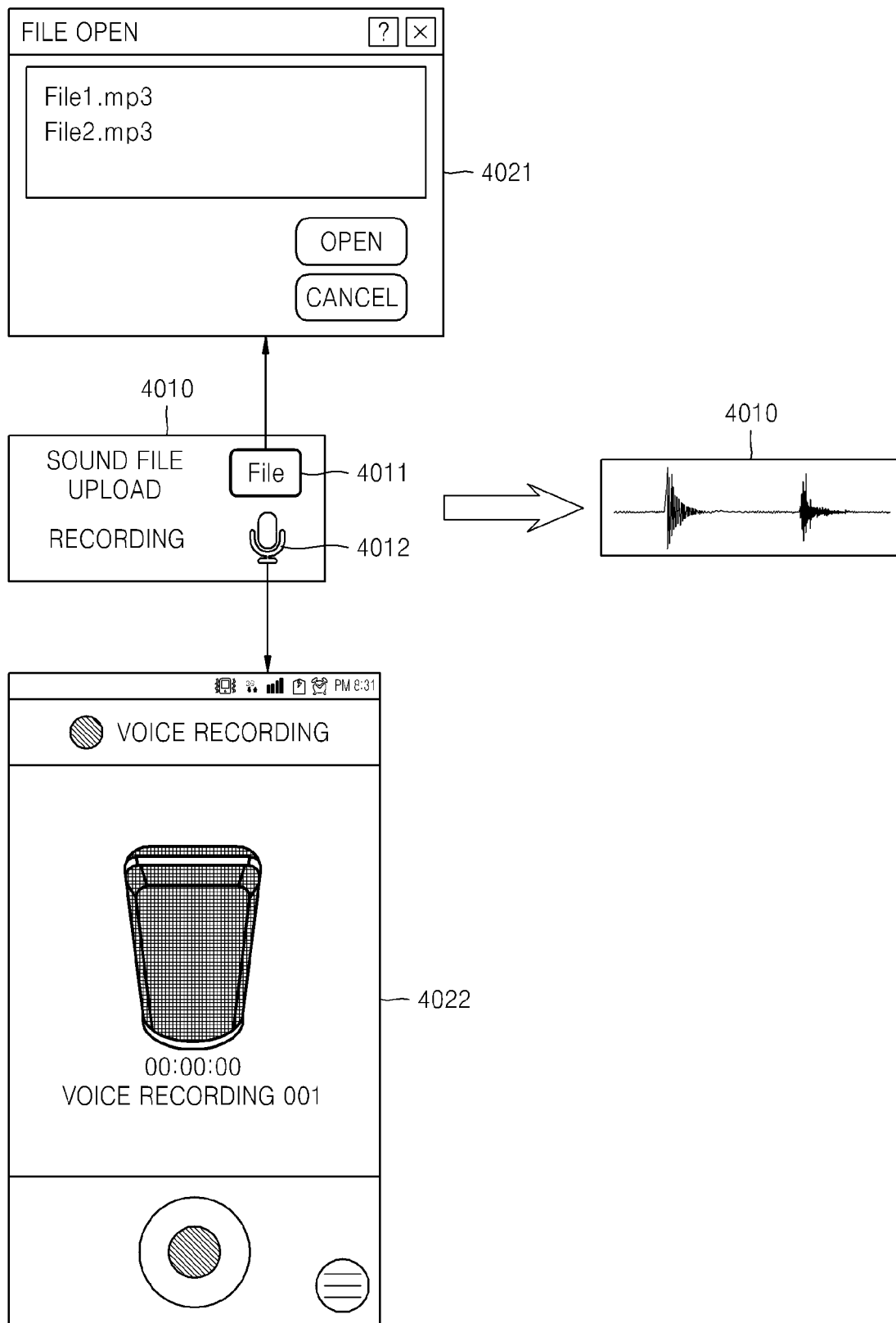
FIG. 40 is an exemplary diagram illustrating a method of receiving a query component in which a query type is sound information, according to an exemplary embodiment.

FIG. 40 is an exemplary diagram illustrating a method of receiving a query component in which a query type is sound information, according to an exemplary embodiment.

When a query type included in a query is sound information, the query input device may display a query input window 4010 that includes a tool for receiving the sound information. The tool for receiving the sound information may include, for example, at least one of a sound file upload button 4011 and a sound recording icon 4012.

When the sound file upload button 4011 is selected, the query input device may display a file selection window 4021 for selecting a sound file. A user may select a voice file (i.e., audio file), which is to be input as a query component, by using the file selection window 4021.

Alternatively, when the sound recording icon 4012 is selected, the query input device may operate a microphone (an image of which may be included in the query input window 4010), and execute an application 4022 that records a sound. The query input device may receive acquired voice information as a query component by using the executed application 4022.

When voice information is input, the query input device may display a waveform, a voice spectrum, or a filename of the voice information input to the query input window 4010.

The voice information received as the query component may be used for a music search by comparing a waveform itself of a voice with an index, or a keyword obtained through conversion using voice recognition may be used for a search.

Figure 41:
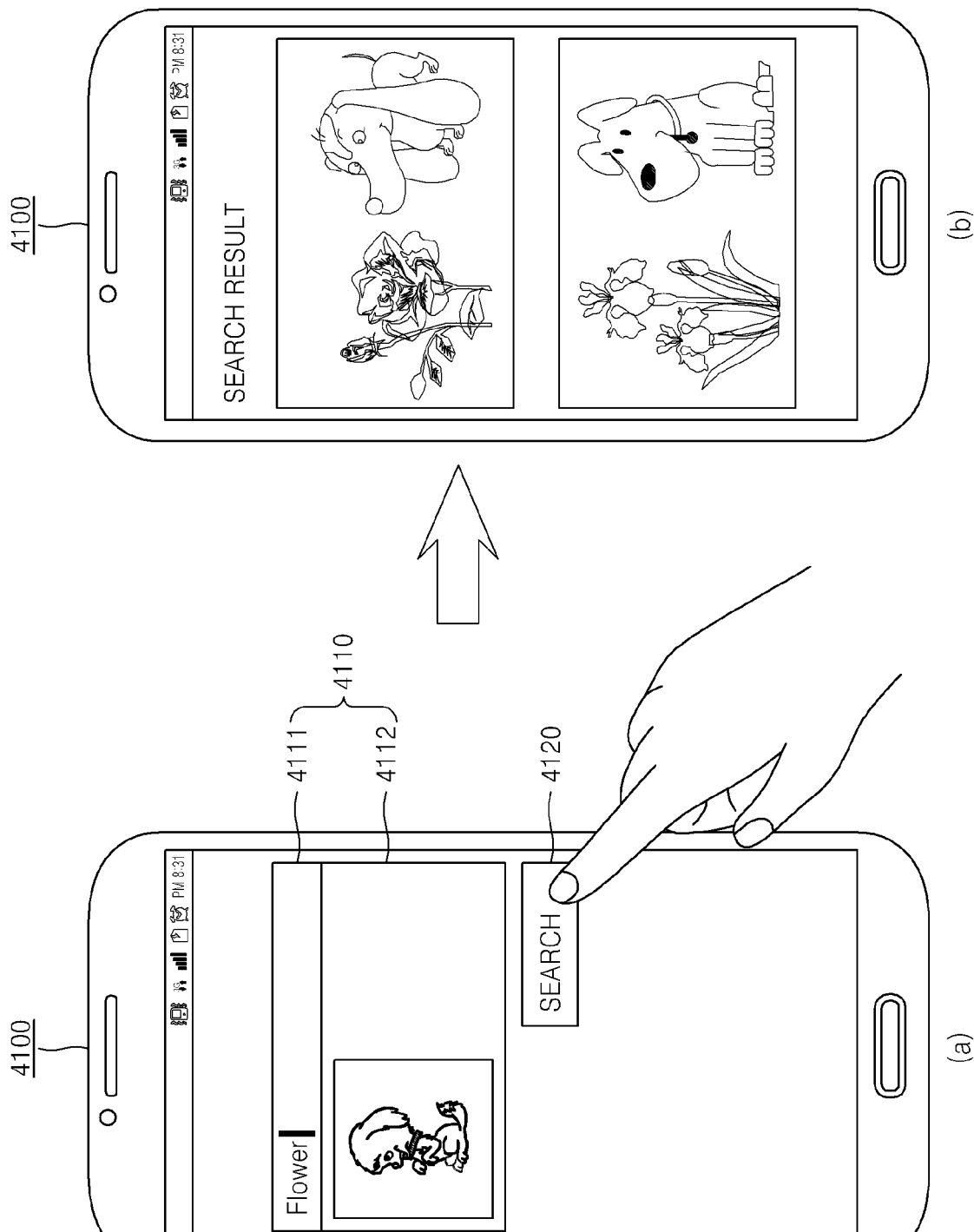
FIG. 41 is an exemplary diagram illustrating a method of receiving a query, including a plurality of query components having a plurality of query types, and displaying a search result, according to an exemplary embodiment.

FIG. 41 is an exemplary diagram illustrating a method of receiving a query, including a plurality of query components having a plurality of query types, and displaying a search result, according to an exemplary embodiment.

When query types included in a query include a text and an image, a query input window displayed in a query input device 4100 may include a first region 4111 for inputting the text and a second region 4112 for inputting the image. As illustrated in FIG. 41 (a), when a text "Flower" and an image including a shape of a dog are received as query components, the text "Flower" may be displayed as a first display item in the region 4111, and the received image may be displayed as a second display item in the region 4112.

Here, a user may manually select the first region 4111 to place the first region 4111 in a ready state to receive an input of the text, and may manually select the second region 4112 to place the second region 4112 in a ready state to receive an input of the image. However, it is understood that one or more other exemplary embodiments are not limited thereto. For example, according to another exemplary embodiment, after or in response to the user inputting a first query component (e.g., text) in the first region, the second region 4112 may automatically enter the ready state to receive an input of the second query component (e.g., image). In this regard, a controller of the query input device 4100 may determine to automatically switch from a first ready state (i.e., first state) in which the first region 4111 can receive the first query component to a second ready state (i.e., second state) in which the second region 4112 can receive the second query component. For example, if the second query component corresponds to an audio or voice information query type, the controller may control to automatically switch the query input device 4100 to the second ready state in which a microphone is automatically activated or operated to receive the second query component. Furthermore, if the second query component corresponds to an image query type, the controller may control to automatically switch the query input device 4100 to the second ready state in which a camera is automatically activated or operated to receive the second query component or in which an interface to select an image is displayed to receive the second query component.

When the ready state is automatically switched as described above, the controller may control to output an indicator of the automatic switching and/or the second ready state. For example, the indicator may include at least one of an audio indicator or output (e.g., predetermined notification sound), a visual indicator or output (e.g., a predetermined icon, a predetermined symbol, a predetermined image, etc.), an auxiliary device output (e.g., a blinking LED or an LED of a predetermined color on the query input device 4100), a vibration output, etc. In this case, the visual indicator may be displayed in the query input window or outside of the query input window in various exemplary embodiments.

Furthermore, the controller may determine to automatically switch from the first ready state to the second ready state based on determining a completion of an input of the first query component. For example, if the first query component is an image, the controller may determine to automatically switch from the first ready state to the second ready state in response to an image captured by a camera of the query input device 4100 or in response to a user selection of an image. Moreover, if the first query component is a text or a sketch, the controller may determine to automatically switch from the first ready state to the second ready state in response to a predetermined period of time elapsing from a last user input to the first region 4111 (e.g., two seconds after a last text character is input to the first region 4111).

When switching to the second ready state, the controller may also control to change a display of the query input window, a display of the second region 4112, or a display of a graphical user interface. In this regard, the change of the display may be based on the query type corresponding to the second query component or the second region 4112. According to another exemplary embodiment, the controller may control to display the second region 4112 or a user interface to receive an input of the second query component in response to switching to the second ready state.

When a user 1 selects a search button 4120 in a state where the received text and the received image are displayed, as illustrated in FIG. 41 (b), the query input device 4100 may display a search result that is obtained by performing a multimodal search. In FIG. 41, an image including both a flower and a dog are displayed as the search result.

Figure 42:
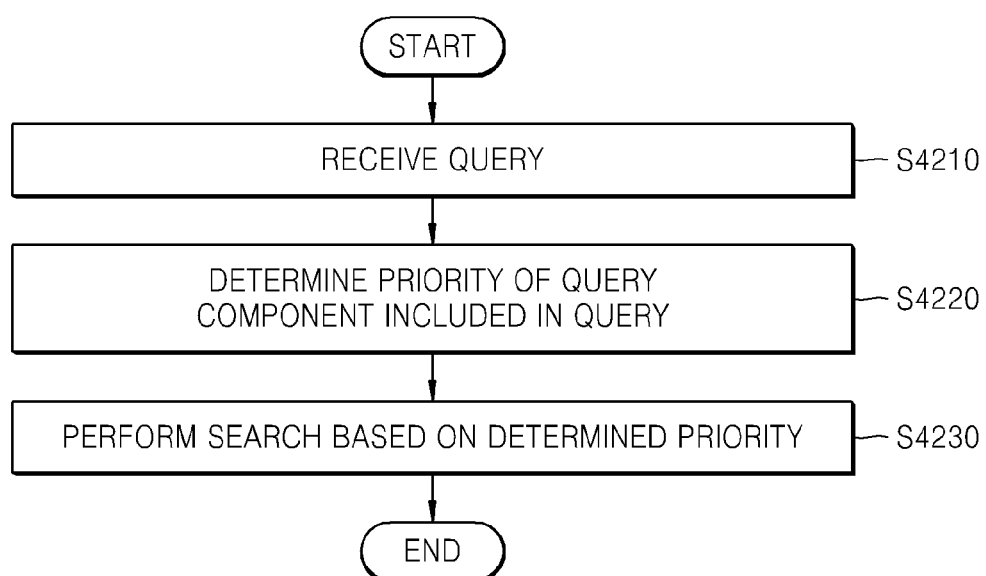
FIG. 42 is a flowchart illustrating a process of performing a search, according to an exemplary embodiment.

FIG. 42 is a flowchart illustrating a process of performing a search, according to an exemplary embodiment.

The query input device according to an exemplary embodiment may receive a query in operation S4210, and determine a priority of a query component included in the received query in operation S4220. In operation S4220, the query input device may determine the priority of the query component, based on a query type of the query component. For example, when a text, an image, and voice information are included in the query, the priority of the query component may be determined in the order of the text, the voice information, and the image.

The priority of the query component may be variously determined. For example, a user may set priorities of a plurality of query types. According to an exemplary embodiment, when priorities of query types are set, a priority may be determined based on a query type of a received query component. According to another exemplary embodiment, a priority of a query component may be determined based on an order in which the query component is received through the query input window. However, this is merely an example for describing an exemplary embodiment, and it is understood that one or more other exemplary embodiments are not limited thereto.

In operation S4230, a search may be performed based on the determined priority. For example, a first search may be performed based on a text included in a query, and then, by using voice information that is a query component having a lower priority than that of the text, a second search may be performed on a result of the first search performed based on the text.

A priority of a query component may be determined by the query input device. Alternatively, when a search is performed by using the search engine server including the search engine, the priority of the query component may be determined by the search engine server.

Figure 43:
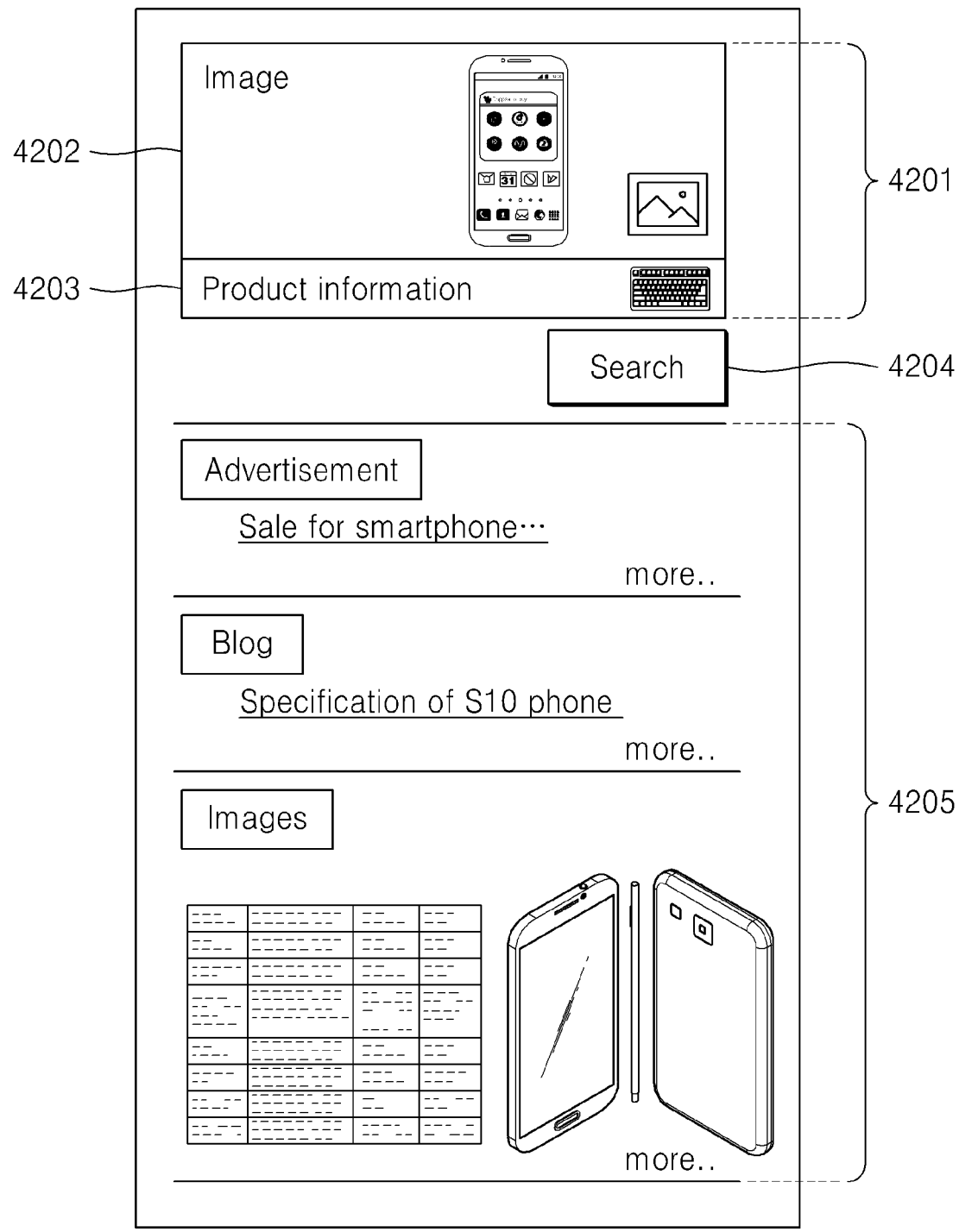
FIG. 43 is an exemplary diagram illustrating a result obtained by performing a multimodal search, according to an exemplary embodiment.

FIG. 43 is an exemplary diagram illustrating a result obtained by performing a multimodal search, according to an exemplary embodiment.

According to an exemplary embodiment, the query input device may display a query input window 4201. The query input window 4201 may include at least one query component input region which displays a received query component (i.e., a display item corresponding to the received query component). According to an exemplary embodiment, the query input device may display a query component that is received, based on a priority of a query type of the received query component. Referring to FIG. 43, when a priority of an image query type is higher than that of a text query type, an image input region 4202 may be displayed above a text input region 4203.

A query component is input by using the query input window 4201, and then, when a user selects a search button 4204, a result of a search performed by using the query component may be displayed in a search result display region 4205. Here, among a plurality of query components, a query component having a highest priority may be determined as a main query component, and a query component having a lowest priority may be determined as a sub query component. Among search results based on the main query component, information selected by the sub query component may be displayed in a search result region. For example, referring to FIG. 43, among pieces of information about a smartphone included in an image, advertisement information including product information of the smartphone, a blog, and an image may be displayed in a search result region 4205.

Figures 44, 45:
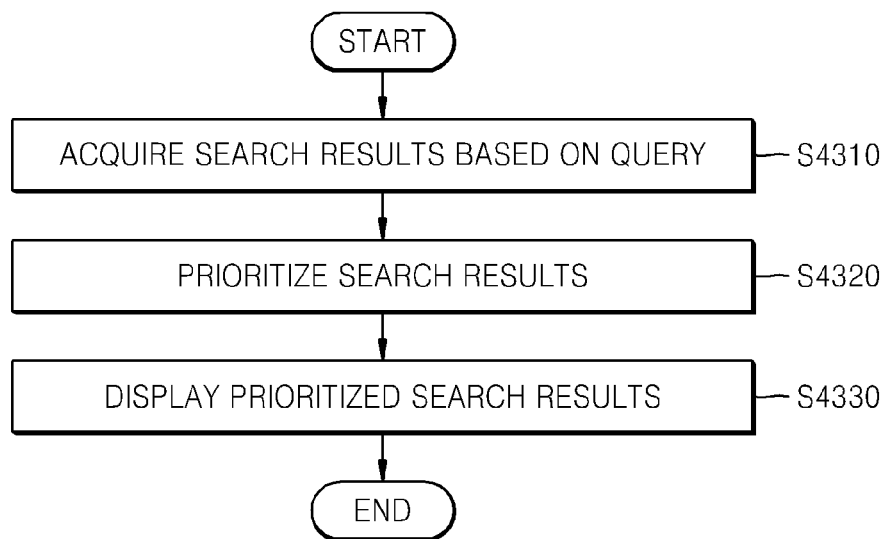
FIG. 44 is a flowchart illustrating a process of displaying a search result, according to another exemplary embodiment.
FIG. 45 is an exemplary diagram illustrating a priority of a search result according to another exemplary embodiment.

FIG. 44 is a flowchart illustrating a process of displaying a search result, according to another exemplary embodiment.

In operation S4310, a plurality of search results may be acquired (i.e., determined or obtained) based on a query received through a query input window. Here, the acquired plurality of search results may be prioritized in operation S4320. For example, priorities of the acquired plurality of search results may be determined based on a degree that matches a query. As another example, the priorities of the acquired plurality of search results may be determined based on a time when information including a corresponding search result is generated.

In operation S4330, the prioritized search results may be displayed in the query input window, based on priorities thereof. Here, the search results may be displayed in another device instead of the query input device. For example, the search results may be displayed in another device included in a home network connected to the query input device.

FIG. 45 is an exemplary diagram illustrating priorities of search results according to another exemplary embodiment. According to the present exemplary embodiment, a search result may be prioritized based on a type thereof. A priority of a search result may be set by a user, or may be determined based on a user's feedback or usage history. For example, when the user does not have interest in an advertisement, the user may directly set the advertisement search result type to a low priority, or when the number of times advertisement information is selected is relatively small (or below a predetermined value), the query input device may set the advertisement search result type to a relatively low priority.

For example, referring to FIG. 45, a priority based on a result type may be determined in the order of an image, a blog, news, a web document, and an advertisement. Herein, it is described that a priority of a search result is determined by the query input device. However, it is understood that one or more other exemplary embodiments are not limited thereto. For example, according to another exemplary embodiment, when a search is performed by using an external search engine server, the priority of the search result may be determined by the external search engine server.

Figure 46:
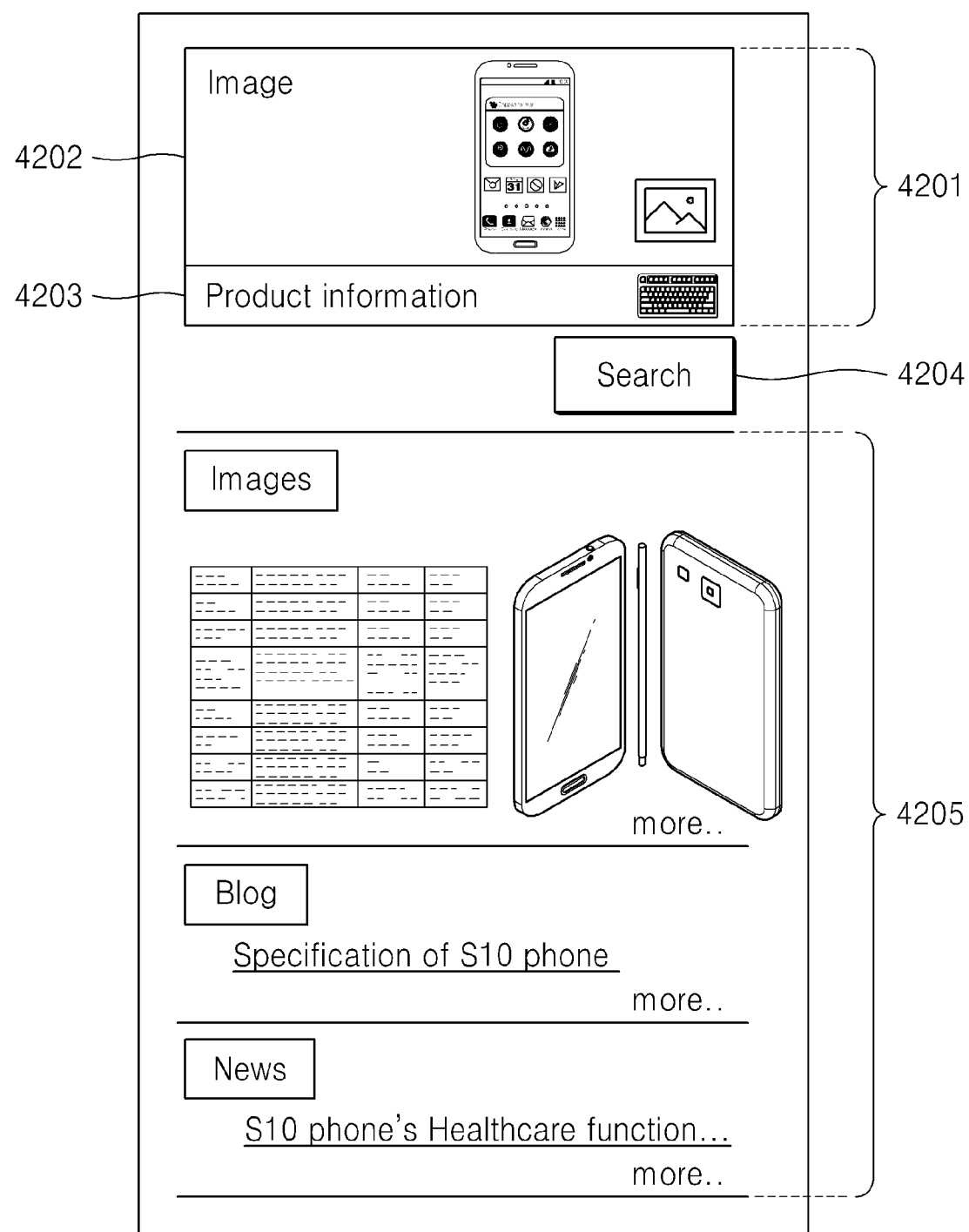
FIG. 46 is an exemplary diagram illustrating a result obtained by performing a multimodal search, according to another exemplary embodiment.

FIG. 46 is an exemplary diagram illustrating a result obtained by performing a multimodal search, according to another exemplary embodiment. In the exemplary embodiment of FIG. 46, the same query as that of the exemplary embodiment of FIG. 43 is input. A query input window 4201, including an image input region 4202 and a text input region 4203, and a search button 4204 may be displayed.

Moreover, the exemplary embodiment of FIG. 46 represents a case in which a priority of a search result is set as illustrated in FIG. 45. Even when the same query is input, a search result may be differently displayed depending on a priority of the search result. That is, search results may be displayed in the order of an image, a blog, and news in a result display region 4205-1, based on priorities of the search results.

Figure 47:
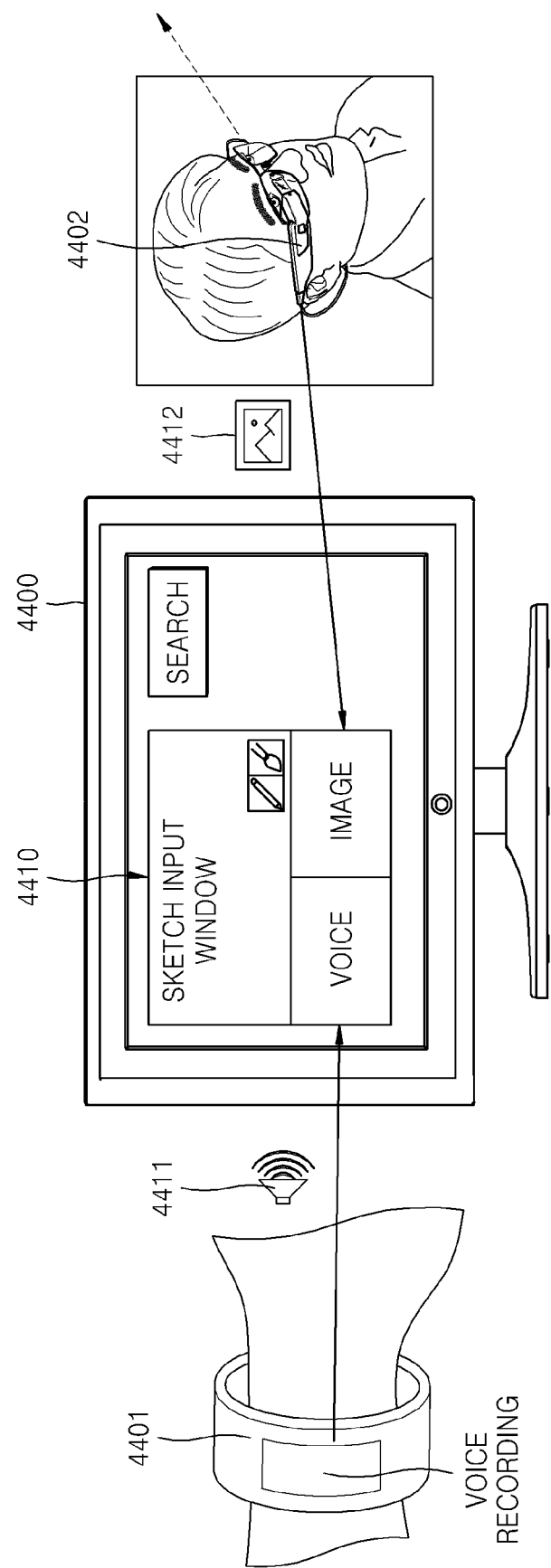
FIG. 47 is an exemplary diagram illustrating a method of receiving a query by using a plurality of devices, according to an exemplary embodiment.

FIG. 47 is an exemplary diagram illustrating a method of receiving a query by using a plurality of devices, according to an exemplary embodiment. According to the present exemplary embodiment, query components included in a query may be input by using a plurality of devices. In FIG. 47, it is illustrated that a query input device 4400 is a connected TV, although it is understood that the query input device 4400 is not limited to the form illustrated in FIG. 47 in one or more other exemplary embodiments, and may instead be implemented as a PC, a smartphone, a smart device, a laptop computer, a portable multimedia player, a tablet device, a netbook, a workstation, etc.

When query types included in a query are sketch information, voice information, and an image, the query input device 4400 may display a query input window 4410 for inputting the sketch information, the voice information, and the image.

The query input device 4400 may request voice information 4411 from a smart watch 4401 communicable with the query input window 4401. The smart watch 4401 may denote an embedded system watch equipped with various operations in addition to those of general clocks. For example, the smart watch 4401 may perform a calculation operation, a translation operation, a recording operation, a communication operation, etc. The smart watch 4401, which receives a request for the voice information 4411 from the query input device 4400, may operate a microphone included in the smart watch 4401 to generate the voice information 4411, and transmit the generated voice information 4411 to the query input device 4400. The query input device 4400 may receive the voice information 4411, transmitted from the smart watch 4401, as a query component. The smart watch 4401 may communicate with the query input device 4400 by using wired communication or wireless communication such as Bluetooth, Wi-Fi direct, near field communication (NFC), infrared data association (IrDA), radio frequency (RF) communication, wireless local area network (LAN), etc.

Moreover, the query input device 4400 may request an image 4412 from smart glasses 4402 communicable with the query input device 4400. The smart glasses 4402 denote a wearable device equipped with a head-mounted display (HMD). The smart glasses 4402 may perform a calculation operation, a translation operation, a recording operation, a communication operation, etc. The smart glasses 4402, which receive a request for the image 4412 from the query input device 4400, may generate the image 4412 captured by a camera included in the smart glasses 4402. The smart glasses 4402 may transmit the generated image 4412 to the query input device 4400. The query input device 4400 may receive the image 4412, transmitted from the smart glasses 4402, as a query component. The smart glasses 4402 may communicate with the query input device 4400 by using wired communication or wireless communication such as Bluetooth, Wi-Fi direct, NFC, IrDA, RF communication, wireless LAN, etc.

Moreover, the query input device 4400 may directly receive sketch information by using a query input tool output to the query input device 4400. The query input device 4400, which has received voice information, an image, and sketch information, may perform a search based on a query including the voice information, the image, and the sketch information.

The smart watch 4401 and the smart glasses 4402 of FIG. 47 may be replaced with other devices communicable with the query input device 4400 in one or more other exemplary embodiments.

Figure 48:
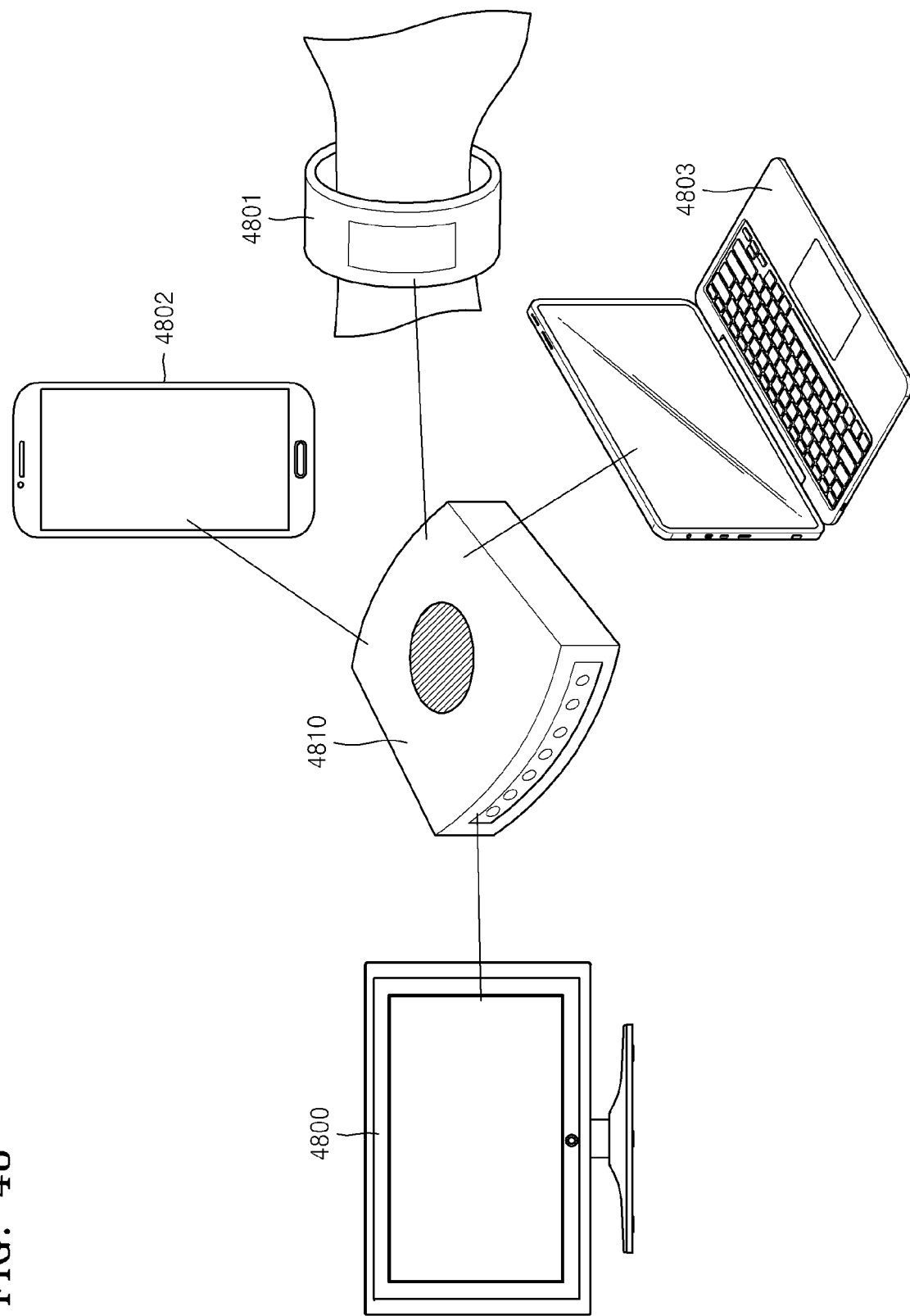
FIG. 48 is an exemplary diagram illustrating a method of receiving a query component by using a plurality of devices, according to another exemplary embodiment.

FIG. 48 is an exemplary diagram illustrating a method of receiving a query component by using a plurality of devices, according to another exemplary embodiment.

According to the present exemplary embodiment, the query input device 4800 may receive a query component, which is to be added to or included in a query, by using a device that is connected to the query input device 4800 over a network. Referring to FIG. 48, the query input device 4800 may search for a plurality of devices 4801 to 4803 that are connected to the query input device 4800 through a gateway 4810, in order to select one or more devices from which a query component is to be provided. Here, the query input device 4800 may select the device from which the query component is to be provided based on a query type of the query component. For example, when a query type of a query component to be received is voice information, the query input device 4800 may select a device including a voice input operation from among the devices 4801 to 4803.

According to an exemplary embodiment, the query input device 4800 may broadcast a request for a query component. The query input device 4800 may receive respective device profiles of the devices 4801 to 4803 from the devices 4801 to 4803 in response to the request. Here, each of the device profiles may include information about one or more operations provided by a corresponding device. The query input device 4800 may select a device that provides a query component, based on the received device profiles.

Alternatively, when the gateway 4810 manages device profiles of devices connected to the gateway 4810, the gateway 4810 may select a device, which provides a query component, in response to a request. When the gateway 4810 selects a device that provides a query component, the gateway 4810 may transmit a request for the query component to the selected device.

According to another exemplary embodiment, the query input device 4800 may broadcast a request including information about a query type. The devices 4801 to 4803, which have received the request including the information about the query type, may determine whether it is possible to provide a query component having the query type included in the request. A device, which provides the query component having the query type included in the request among the devices 4801 to 4803, may transmit a response to the request to the gateway 4810 or to the query input device 4800.

When two or more devices are selected by the query input device 4800 or the gateway 4810, the query input device 4800 may display a list of the selected devices. A user may select a device from which a query component is to be input, from the displayed list of the devices.

Figure 49:
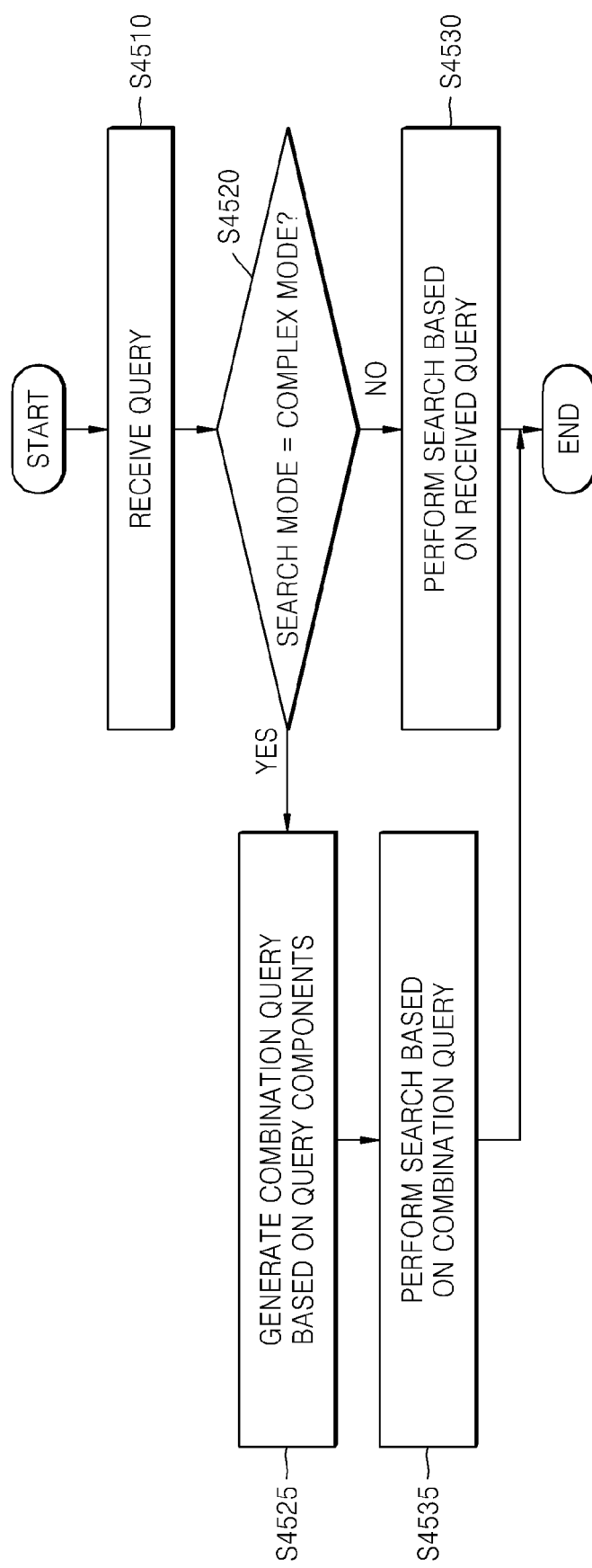
FIG. 49 is a flowchart illustrating a process of performing a search, according to an exemplary embodiment.

FIG. 49 is a flowchart illustrating a process of performing a search, according to an exemplary embodiment.

Referring to FIG. 49, when a query is received in operation S4510, the query input device according to the present exemplary embodiment may determine whether a search mode when a query is received is the multimodal mode in operation S4520. Here, operation S4510 denotes that the query input device receives the query input to a query input window according to a search performance command. When the search mode is determined as a single mode search in operation S4520, the query input device may perform a search based on a query type included in the query in operation S4530.

When the search mode is determined as the multimodal mode in operation S4520, the query input device may generate a combination query based on a plurality of query components in operation S4525. Here, the combination query denotes that query components having a plurality of query types are combined. According to one or more exemplary embodiments, the query components may be variously combined. For example, the query components may be simply combined. In detail, for example, when a text "bag" and a voice "price" are input as query components, a query may be composed of a keyword "bag price". As another example, the combination query may include a keyword or a main feature (for example, a feature included in an image) that is added into a query component. Furthermore, as another example, the combination query may include extension keywords generated from the query components. Moreover, as another example, the combination query may be characterized in that the query components are prioritized based on a priority of a query type. In operation S4525, the query input device may extract a relation between the plurality of query types included in the query, and generate the combination query, based on the extracted relation. In operation S4535, the query input device may perform a search based on the combination query that is generated in operation S4525.

Here, operations S4525, S4535, and S4530 may be performed by an external server instead of the query input device.

Figure 50:
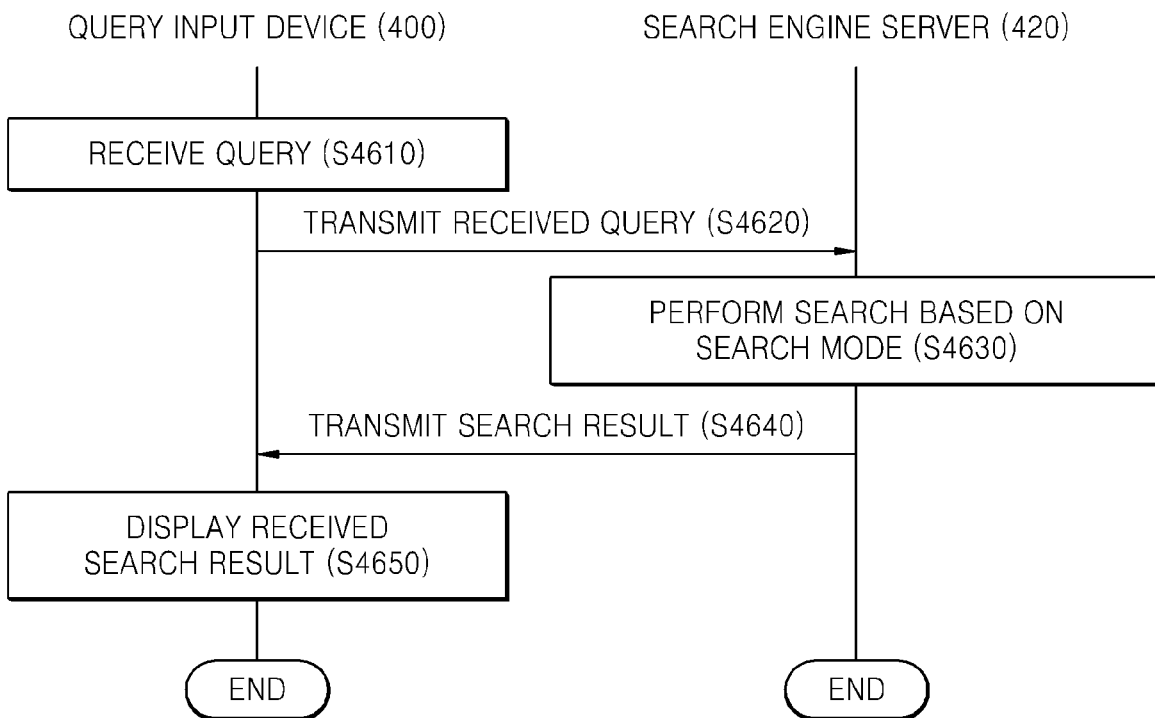
FIG. 50 is a flowchart illustrating a process of performing a search, according to an exemplary embodiment.

FIG. 50 is a flowchart illustrating a process of performing a search, according to an exemplary embodiment.

In operation S4610, the query input device 400 according to the present exemplary embodiment may receive a query through a displayed query input window.

In operation S4620, the query input device 400 may transmit the received query to the search engine server 420. Here, when a search mode is a multimodal search, the query transmitted to the search engine server 420 may be a combination query in which query components having a plurality of query types are combined. According to one or more exemplary embodiments, the query components may be variously combined. For example, the query components may be simply combined. In detail, for example, when a text "bag" and a voice "price" are input as query components, a query may be composed of a keyword "bag price". As another example, the combination query may include a keyword or a main feature (for example, a feature included in an image) that is added into a query component. Furthermore, as another example, the combination query may include extension keywords generated from the query components. Moreover, as another example, the combination query may be characterized in that the query components are prioritized based on a priority of a query type. According to an exemplary embodiment, the query transmitted to the search engine server 420 may include information indicating a search mode.

In operation S4630, the search engine server 420 may perform a single search or the multimodal search according to the search mode, for processing the received query. In operation S4640, the search engine server 420 may transmit a search result, which is selected in S4630, to the query input device 400.

Figure 51:
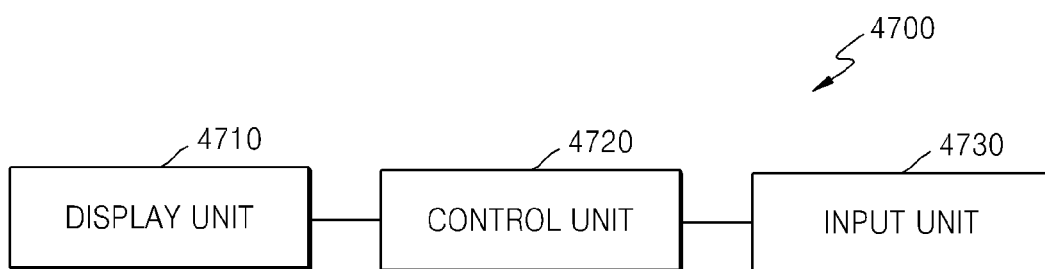
FIG. 51 is a block diagram illustrating a structure of a query input device according to an exemplary embodiment.

FIG. 51 is a block diagram illustrating a structure of a query input device 4700 according to an exemplary embodiment.

A query input device 4700 according to an exemplary embodiment may include a display 4710, a controller 4720, and an input device 4730 (e.g., input unit).

The display 4710 may display a query input window. The display 4710 may display various pieces of information in addition to a query input. The query input device 4700 may include two or more the displays 4710 depending on an implementation type. The display 4710 may include a display device such as a liquid crystal display (LCD), a light-emitting diode (LED) display, a cathode ray tube (CRT) display, a plasma display panel (PDP), an organic LED (OLED) display, an active-matrix OLED (AMOLED) display, a thin-film-transistor (TFT) display, etc. Also, the display 4710 may include a touch sensor and a touch screen having a layered structure depending on an implementation type. When the display 4710 performs a display operation and an input operation such as a touch screen, the display 4710 may perform an operation of the input device 4730 and/or the input device 4730 may be implemented as the display 4710.

According to an exemplary embodiment, when the search mode is a multimodal search mode, the display 4710 may display a query input window. The query input window denotes an interface through which a query including a plurality of query types is received. Alternatively, when the search mode is a single search mode, the query input device 4700 may display a single query input window. The single query input window denotes a query input window through which a query including only one query type is received.

The input device 4730 may receive a query, including a plurality of query components corresponding to a plurality of query types, through the query input window displayed by the display 4710 based on a user input. The input device 4730 may receive a query component, such as a text or sketch information, by using a keyboard, a keypad, a virtual keypad, a track pad, a writing pad, etc. Alternatively, the query input device 4700 may receive a query component, such as an image, voice information, or a video, to obtain or generate a query according to a user input.

The controller 4720 may control the elements of the query input device 4700. The controller 4720 may include a central processing unit (CPU), a read-only memory (ROM) which stores a control program, and a random access memory (RAM) that stores a signal or data input from the outside of the query input device 4700 or is used as a memory area in work performed by the query input device 4700. The CPU may include one or more processors such as a single core, a dual core, a triple core, or a quad core. The CPU, the ROM, and the RAM may be connected to each other through an internal bus.

The controller 4720 may acquire at least one search result for the received query. When the controller 4720 includes a search engine, the controller 4720 may directly select at least one search result for the query. When the controller 4720 does not include the search engine, the controller 4720 may transmit the query to a search engine server including the search engine, and acquire at least one search result from the search engine server. The controller 4720 may control the display 4710 to display the at least one acquired search result. The display 4710 may display the acquired at least one search result according to a control by the controller 4720.

Moreover, the controller 4720 may select a plurality of query types which are to be selected or used for a query. The query input window displayed by the display 4710 may receive a query input according to the selected query types. Also, as in the above-described exemplary embodiment, the query input window displayed by the display 4710 may be differently displayed depending on the selected query types.

Furthermore, according to an exemplary embodiment, the display 4710 may display a search mode selection object for selecting a search mode. The input device 4730 may receive a user input for the search mode selection object. Here, when the user input is an input that switches the search mode to the multimodal mode, the controller 4720 may switch the search mode to the multimodal mode. When the search mode is switched to the multimodal mode, the display 4710 may change the query input window to a query input window including a plurality of input modes. According to an exemplary embodiment, the query input window may include regions respectively corresponding to a plurality of query types.

Also, the display 4710 may display a query type list. According to an exemplary embodiment, when the search mode is the single mode, the display 4710 may display a single query type list, and when the search mode is the multimodal mode, the display 4710 may display a multimodal query type list. The controller 4720 may determine at least one query type, included in a query, from the query type list displayed by the display 4710. Here, in order to determine at least one query type, the input device 4730 may receive an input that drags and drops a target from the query type list to a region in which the query input window is displayed or is to be displayed.

Moreover, according to an exemplary embodiment, the controller 4720 may detect a query type of a received query component. The query input window displayed by the display 4710 may include a region that displays the received query component (i.e., a display item corresponding to the received query component), and a region that receives a query component. The display 4710 may display the received query component in a region corresponding to the received query component, based on the detected query type.

Further, the query input window displayed by the display 4710 may include at least one query input tool for inputting a query component corresponding to each query type.

Also, the controller 4720 may convert a text, included in a search result, into a voice, or convert a voice (i.e., audio) into a text.

According to an exemplary embodiment, after or in response to the user inputting a first query input to the query input window, the controller 4720 may determine to automatically switch from a first ready state (i.e., first state) in which the first query component can be received to a second ready state (i.e., second state) in which the second query component can be received. For example, if the second query component corresponds to an audio or voice information query type, the controller 4720 may control to automatically switch the query input device 4700 to the second ready state in which a microphone is automatically activated or operated to receive the second query component. Furthermore, if the second query component corresponds to an image query type, the controller 4720 may control to automatically switch the query input device 4700 to the second ready state in which a camera is automatically activated or operated to receive the second query component or in which an interface to select an image is displayed to receive the second query component.

When the ready state is automatically switched as described above, the controller 4720 may control to output an indicator of the automatic switching and/or the second ready state. For example, the indicator may include at least one of an audio indicator or output (e.g., predetermined notification sound), a visual indicator or output (e.g., a predetermined icon, a predetermined symbol, a predetermined image, etc.), an auxiliary device output (e.g., a blinking LED or an LED of a predetermined color on the query input device 4700), a vibration output, etc.

Furthermore, the controller 4720 may determine to automatically switch from the first ready state to the second ready state based on determining a completion of an input of the first query component. For example, if the first query component is an image, the controller 4720 may determine to automatically switch from the first ready state to the second ready state in response to an image captured by a camera of the query input device 4700 or in response to a user selection of an image. Moreover, if the first query component is a text or a sketch, the controller 4720 may determine to automatically switch from the first ready state to the second ready state in response to a predetermined period of time elapsing from a last user input to the a region of the query input window corresponding to the first query component or first query type.

When switching to the second ready state, the controller 4720 may also control to change a display of the query input window, a display of one or more regions of the query input window, or a display of a graphical user interface. In this regard, the change of the display may be based on the query type corresponding to the second query component. According to another exemplary embodiment, the controller 4720 may control to display a user interface to receive an input of the second query component in response to switching to the second ready state.

It is understood that the query input window may be vary and is not limited those described above.

FIGS. 52 to 57 are exemplary diagrams illustrating a method of performing a multimodal search, according to another exemplary embodiment.

Figure 52:
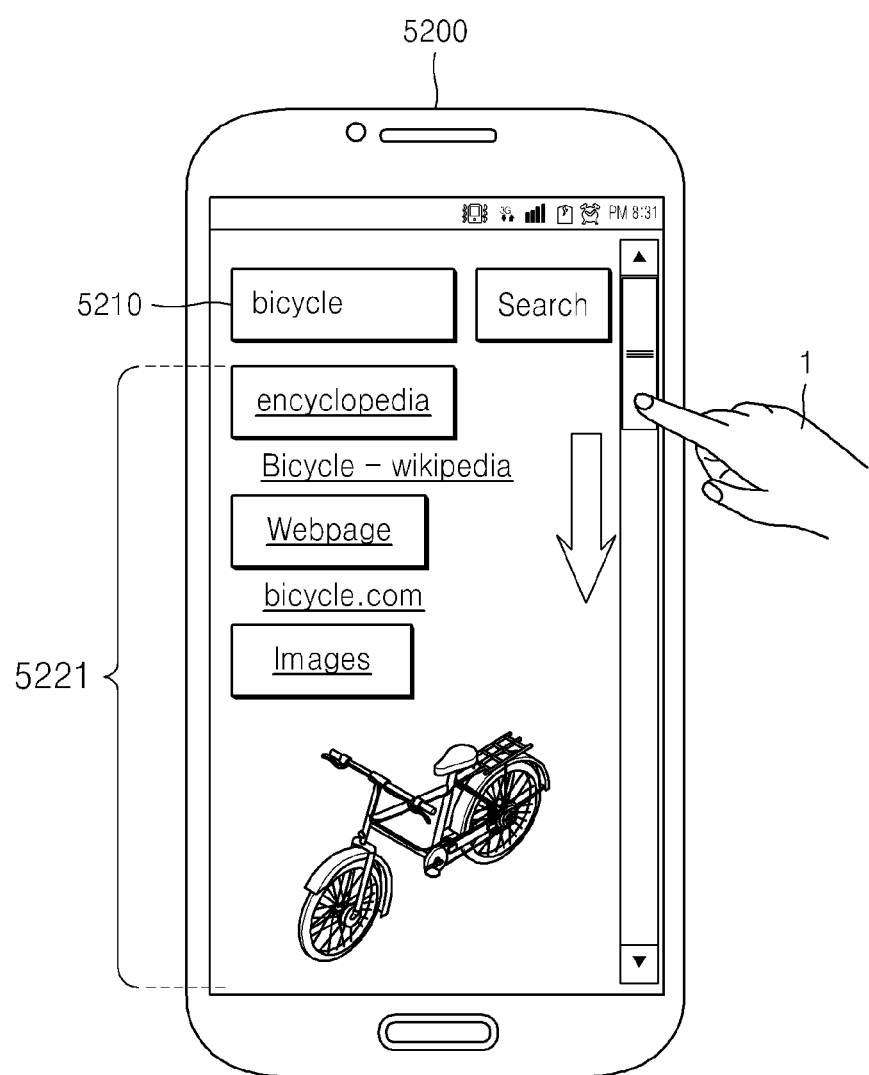
FIGS. 52 to 57 are exemplary diagrams illustrating a method of performing a multimodal search, according to another exemplary embodiment.

Referring to FIG. 52, a query input device 5200 may receive, generate, or obtain a query "bicycle", and display a search result 5221 including encyclopedia information, webpage information, and an image that are searched based on the query. Here, a user 1 may scroll a screen displayed by a display, to check a search result that is not currently displayed by the display.

Figure 53:
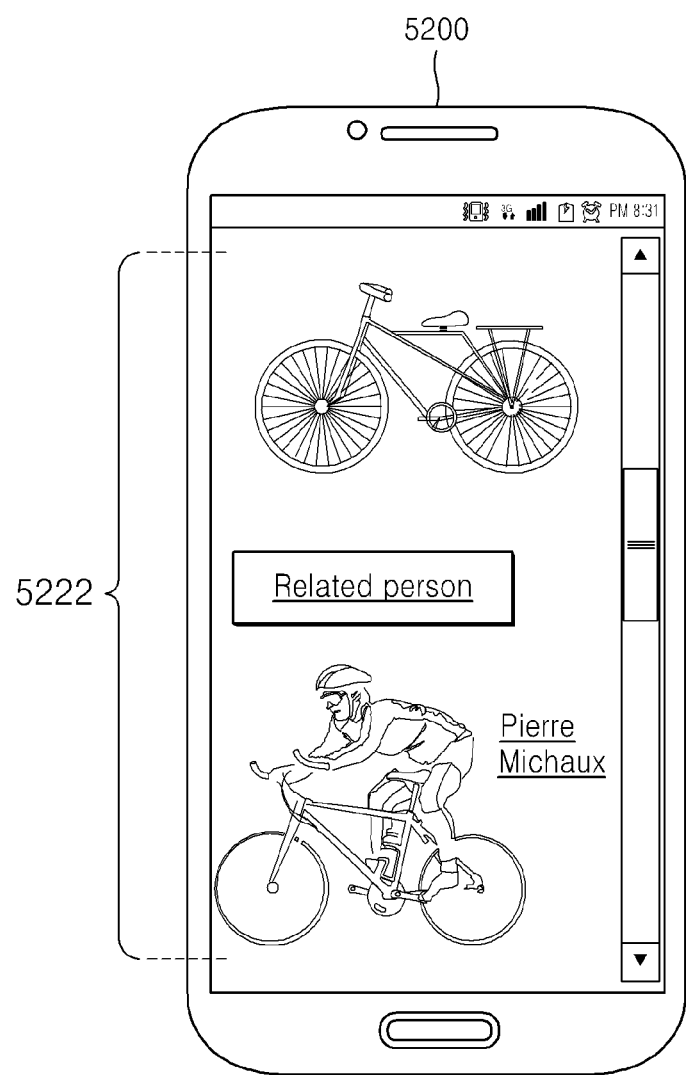

Referring to FIG. 53, a screen is scrolled, and thus, a plurality of search results 5222 that are not previously displayed by the display may be displayed by the display. In this case, since the screen is scrolled, a query input window 5210 may not be displayed on the screen.

Figure 54:
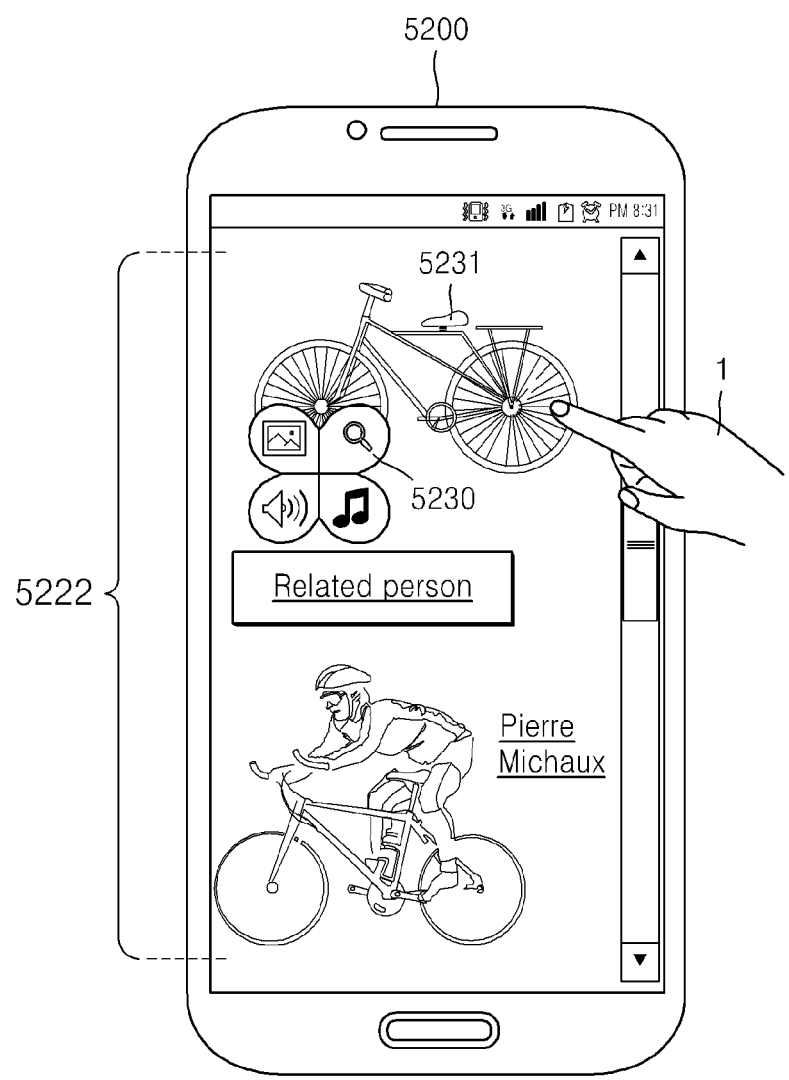

The user 1 may select an image 5231 included in the search results 5222. For example, referring to FIG. 54, the user 1 may select a bicycle image 5231 from among the search results 5222. Here, the user 1 may select the image 5231 by using a touch screen or a mouse, although it is understood that one or more other exemplary embodiments are not limited thereto. When the image 5231 is selected, the query input device 5200 may display a query type list near the selected image 5231. Referring to FIG. 54, the query input device 5200 may display a floating icon 5230 near the selected image 5231. The floating icon 5230 may correspond to at least one query type.

Figure 55:
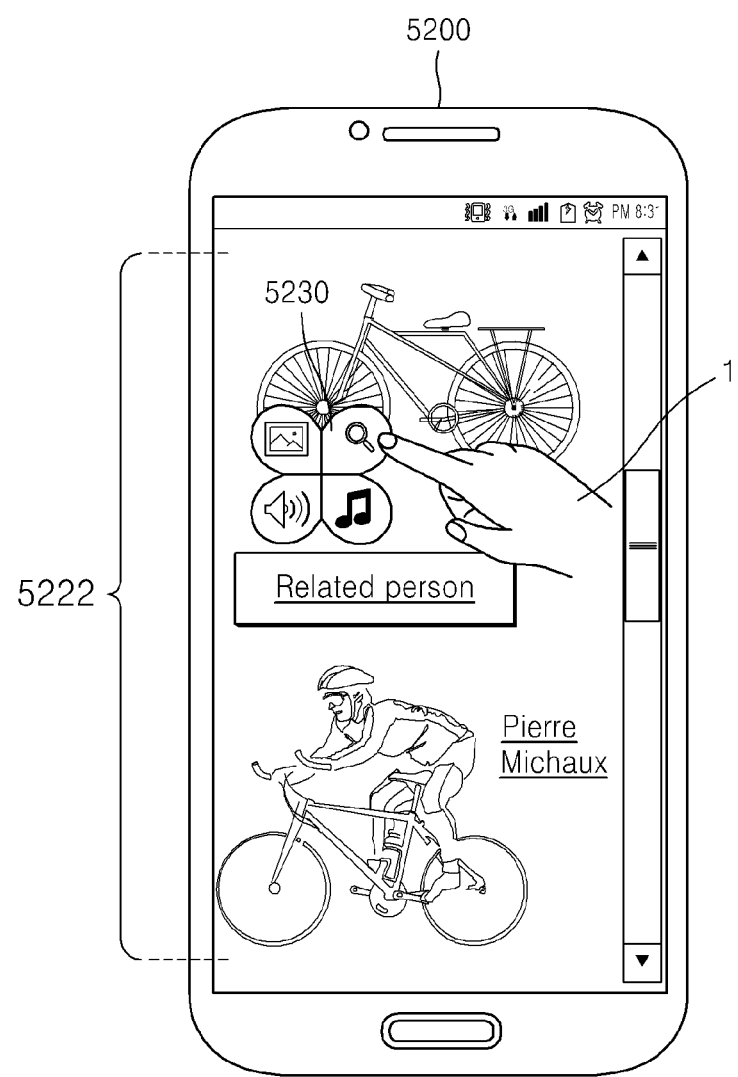
Figure 56:
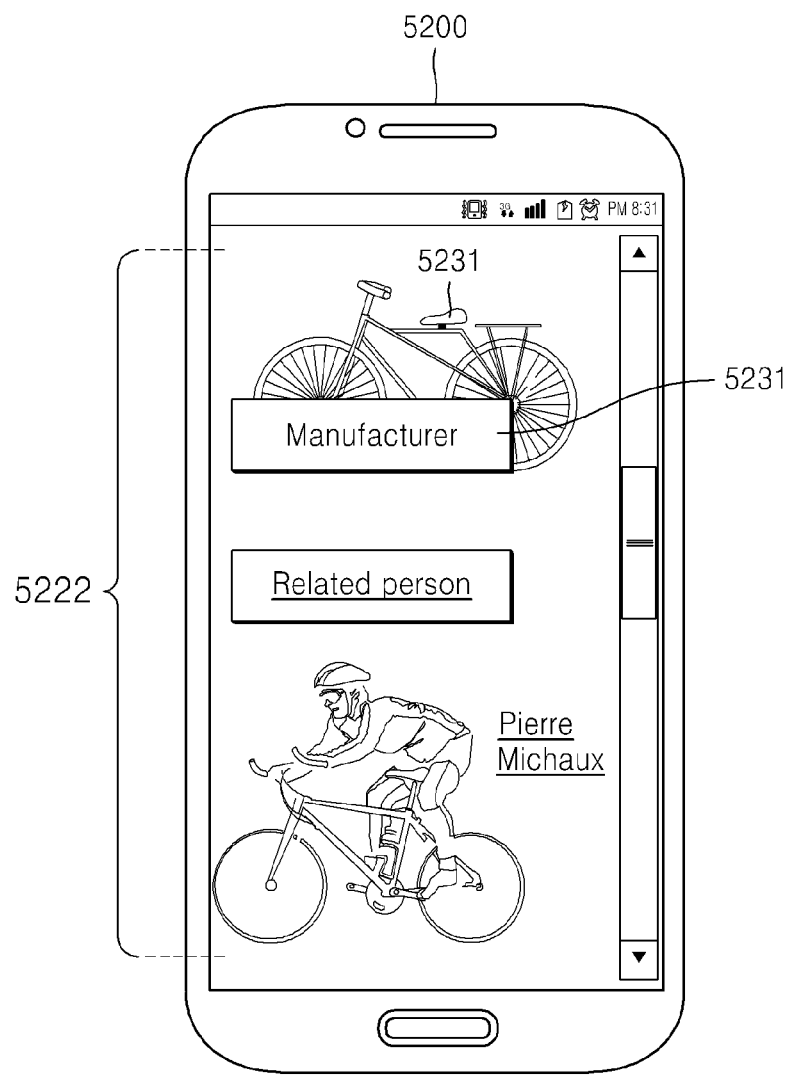

Referring to FIG. 55, the user 1 may select the displayed floating icon 5230. Referring to FIG. 56, the floating icon 5230 is selected, and thus, the query input device 5200 may display a query input region 5231 for inputting a query type corresponding to the floating icon 5230. The query input device 5200 may receive a query component through the query input region 5231.

Figure 57:
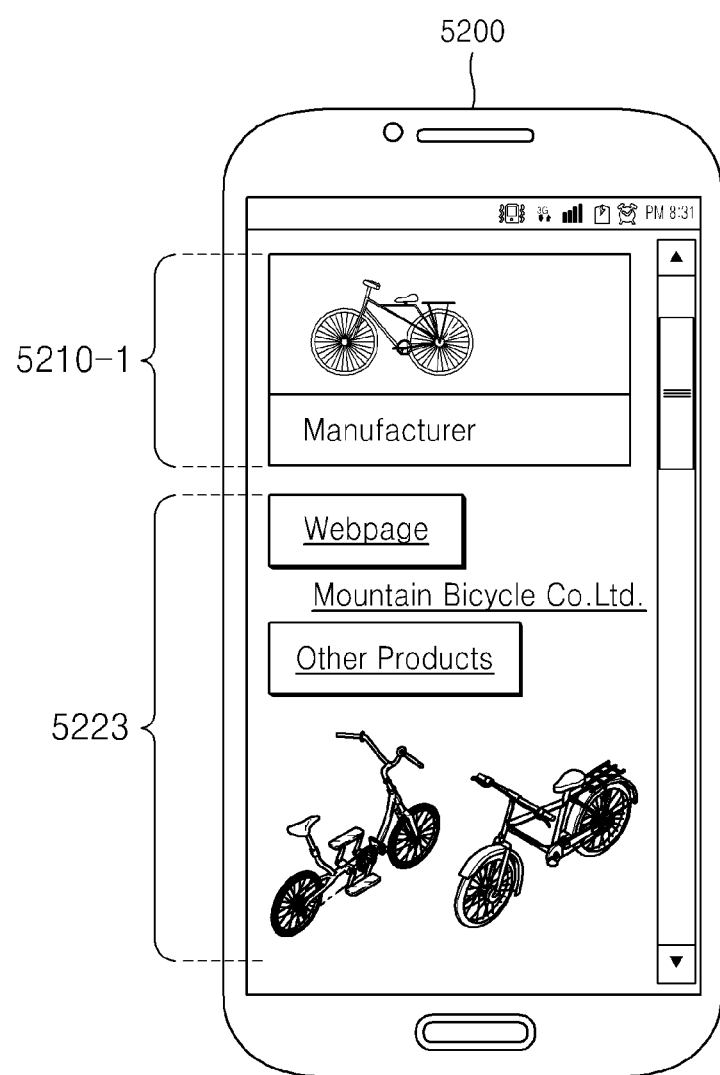

Referring to FIG. 57, the query input device 5200 may perform a search based on a selected search result and a query 5210-1 that includes a query component received through the query input region 5231. As illustrated in FIG. 57, based on a bicycle image and a text "manufacturer", the query input device 5200 may display, in the result display region 5223, a bicycle manufacturer homepage included in an image and information about other products manufactured by the bicycle manufacturer. That is, the query input device 5200 receives a search result selected from a search result display region and receives each query component by using the query input region 5231, and thus, in the exemplary embodiment of FIG. 56, it may be described that a query component is received by using the search result display region and the query input region 5231 as query input windows.

Figure 58:
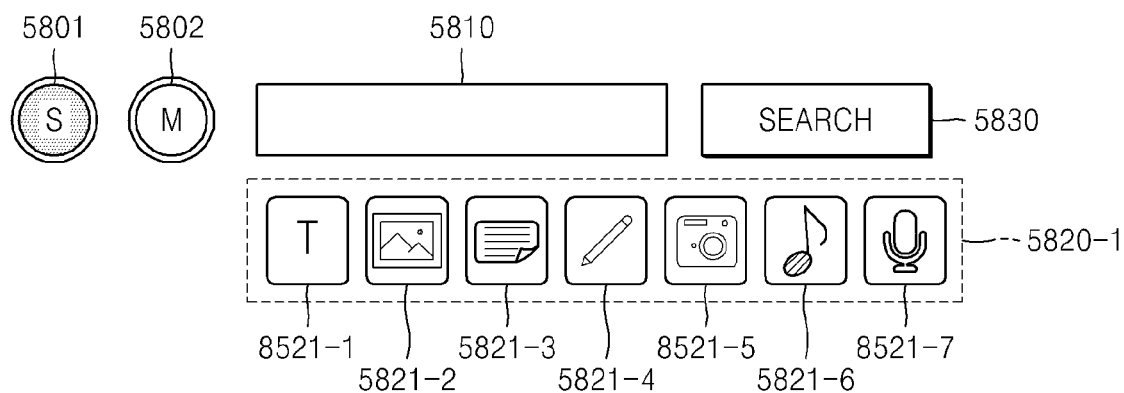
FIG. 58 is an exemplary diagram illustrating a method of displaying a query type list, according to another exemplary embodiment.

FIG. 58 is an exemplary diagram illustrating a method of displaying a query type list, according to another exemplary embodiment.

According to the present exemplary embodiment, the query input device may display a single mode selection object 5801, a multimodal mode selection object 5802, a query input window 5810, a search button 5830, and a single query type list 5820-1. As illustrated in FIG. 58, the single query type list 5820-1 may include a plurality of icons that respectively correspond to a plurality of query types (each icon corresponding to one query type).

The query input device may determine a query type, through which the query input window 5810 is received, by using an icon included in the single query type list 5820-1. For example, when a text icon 5821-1 is selected, the query input device may display a user interface for inputting a text to the query input window 5810. Alternatively, when an image icon 5821-2 is selected, the query input device may display a user interface for inputting an image to the query input window 5810. Furthermore, when a document icon 5821-3 is selected, the query input device may display a user interface for inputting a document to the query input window 5810. Moreover, when a sketch icon 5821-4 is selected, the query input device may display a user interface for inputting sketch information to the query input window 5810. Also, when a camera icon 5821-5 is selected, the query input device may execute a camera application, and display an image, acquired by using the camera application, in the query input window 5810. Further, when a music icon 5821-6 is selected, the query input device may perform a music search based on voice information which is acquired by using a microphone. Alternatively, when a recording icon 5821-7 is selected, the query input device may operate the microphone, and acquire voice information by using the microphone.

Figure 59:
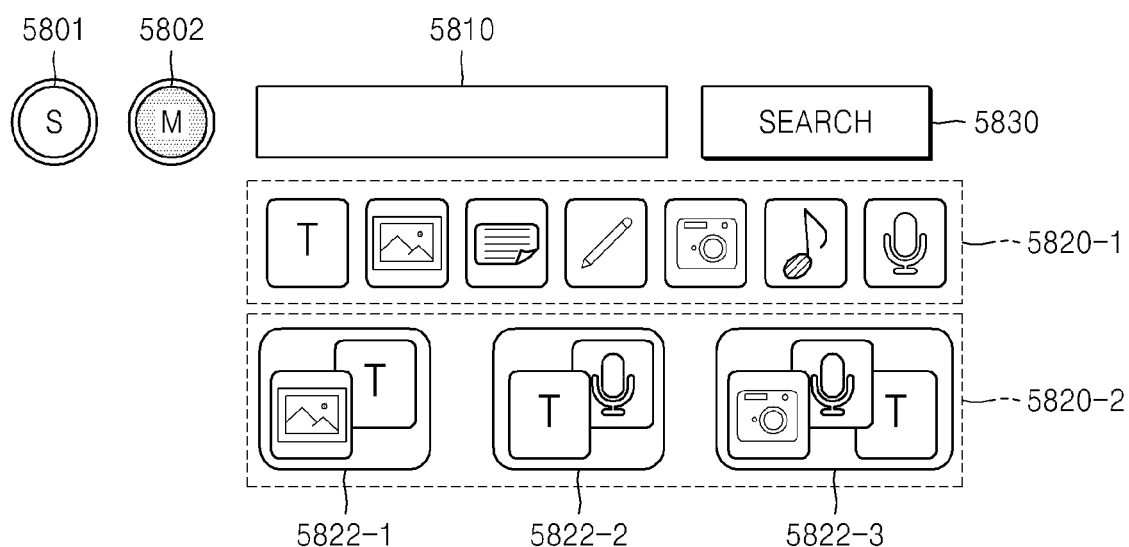
FIG. 59 is an exemplary diagram illustrating a method of displaying a query type list, according to another exemplary embodiment.

FIG. 59 is an exemplary diagram illustrating a method of displaying a query type list, according to another exemplary embodiment.

When the multimodal mode selection object 5802 is selected, the query input device may set a search mode to the multimodal mode. According to the present exemplary embodiment, when the search mode is the multimodal mode, the query input device may display a multimodal query type list 5820-2. In this case, the multimodal query type list 5820-2 may include a combination icon in which a plurality of icons are combined. The combination icon may indicate a multimodal query type by using an icon included in the combination icon. Also, according to an exemplary embodiment, the query input device may indicate priorities of query types, based on a display of an icon. For example, a combination icon 5822-1 of an image and a text illustrated in FIG. 59 indicates that a priority of the image is higher than that of the text. Also, a combination icon 5822-2 of a text and a voice indicates that a priority of the text is higher than that of the voice. Also, a combination icon 5822-3 of a camera, a voice, and a text indicates that priorities of the query types are in the order of the camera, the voice, and the text.

Figure 60:
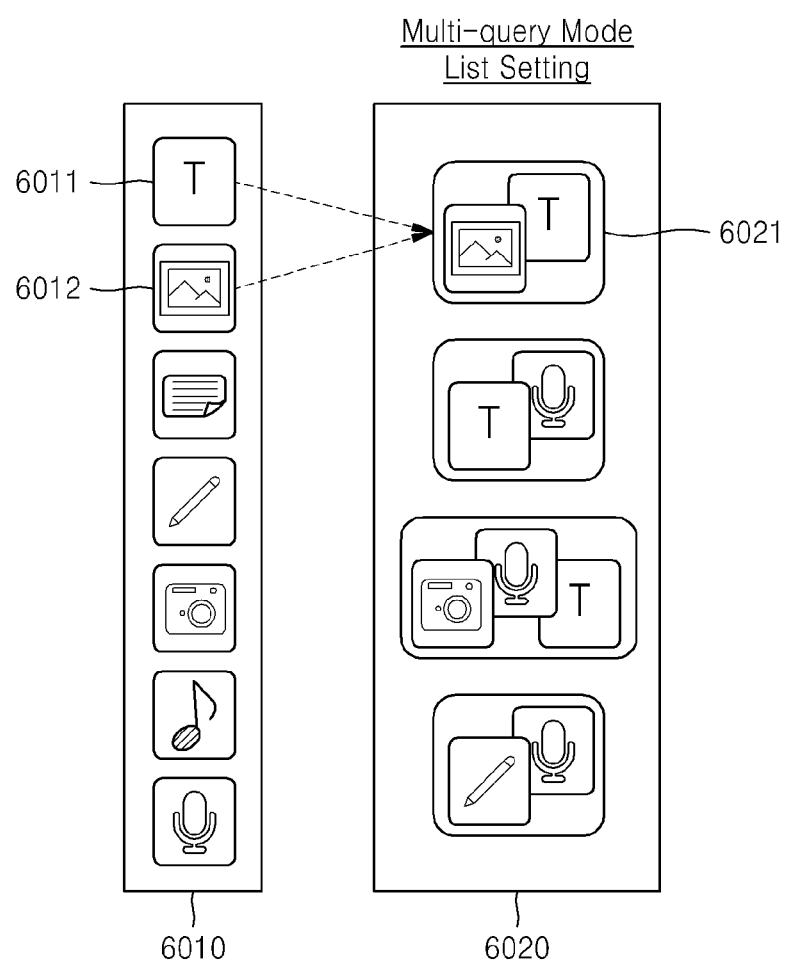
FIG. 60 is an exemplary diagram illustrating a method of generating a multimodal query type list, according to an exemplary embodiment.

FIG. 60 is an exemplary diagram illustrating a method of generating a multimodal query type list, according to an exemplary embodiment.

According to an exemplary embodiment, the query input device may generate a plurality of combination icons 6020 corresponding to a plurality of query types by using a plurality of icons 6010 respectively corresponding to a plurality of query types (each icon corresponding to one query type). For example, when a user selects a text icon 6011 and an image icon 6012 from among the icons 6010, the query input device may generate a combination icon 6021 in which the text icon 6011 is combined with the image icon 6012. In this case, the user may also set a priority for the query types (e.g., according to an order of selecting the icons or by modifying the combination icon 6021) and the combination icon 6021 may reflect the set priority. Alternatively, the priorities may be pre-set or predetermined.

According to an exemplary embodiment, when the search mode is the multimodal search mode, the query input device may display a multimodal query type list including the combination icons 6020 set by the user.

FIGS. 61 to 65 are exemplary diagrams illustrating a method of performing a multimodal search, according to another exemplary embodiment.

According to the present exemplary embodiment, a query input device 6100 may display an indicator 6102 that indicates the search mode as the multimodal mode. Also, the query input device 6100 may display a query input window 6110 and a search button 6130.

Furthermore, according to the present exemplary embodiment, the query input device 6100 may display a collection 6120 of query input tools for inputting a query component when the query input window 6110 is selected. Alternatively, according to another exemplary embodiment, the query input device 6100 may display the collection 6120 of the query input tools for inputting a query component when a menu button included in the query input device 6100 is selected. The query input tools may be included in the query input window 6110.

Figure 61:
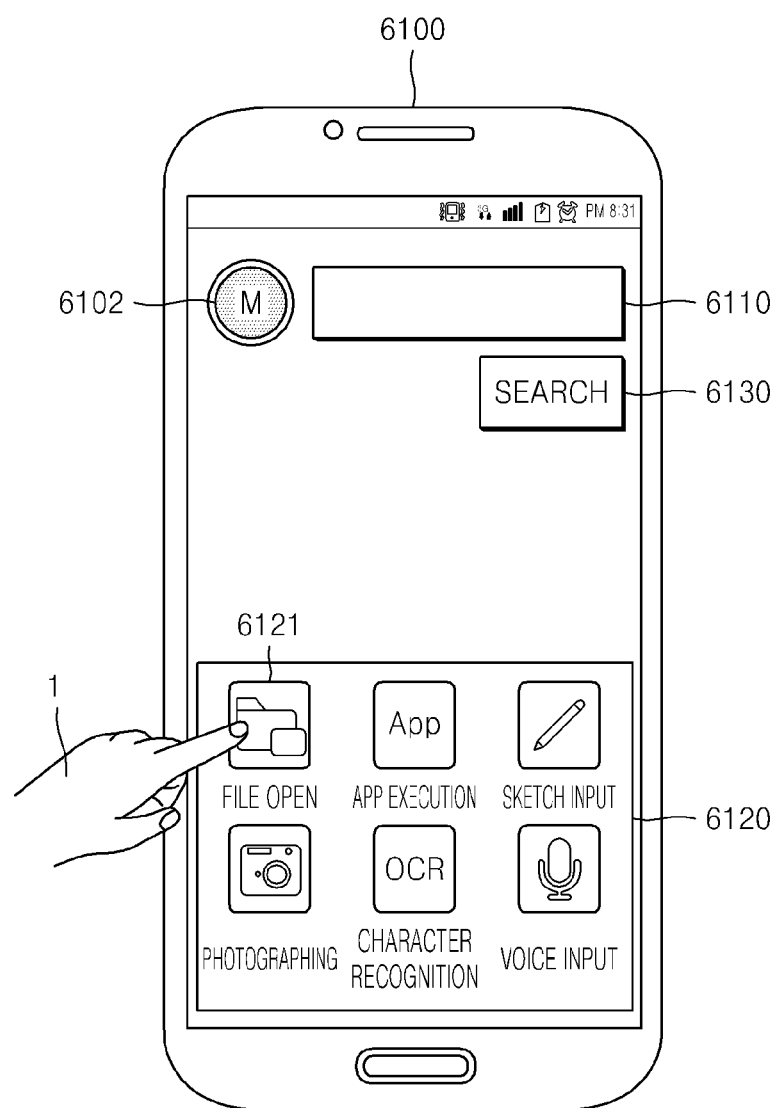
FIGS. 61 to 65 are exemplary diagrams illustrating a method of performing a multimodal search, according to another exemplary embodiment.
Figure 62:
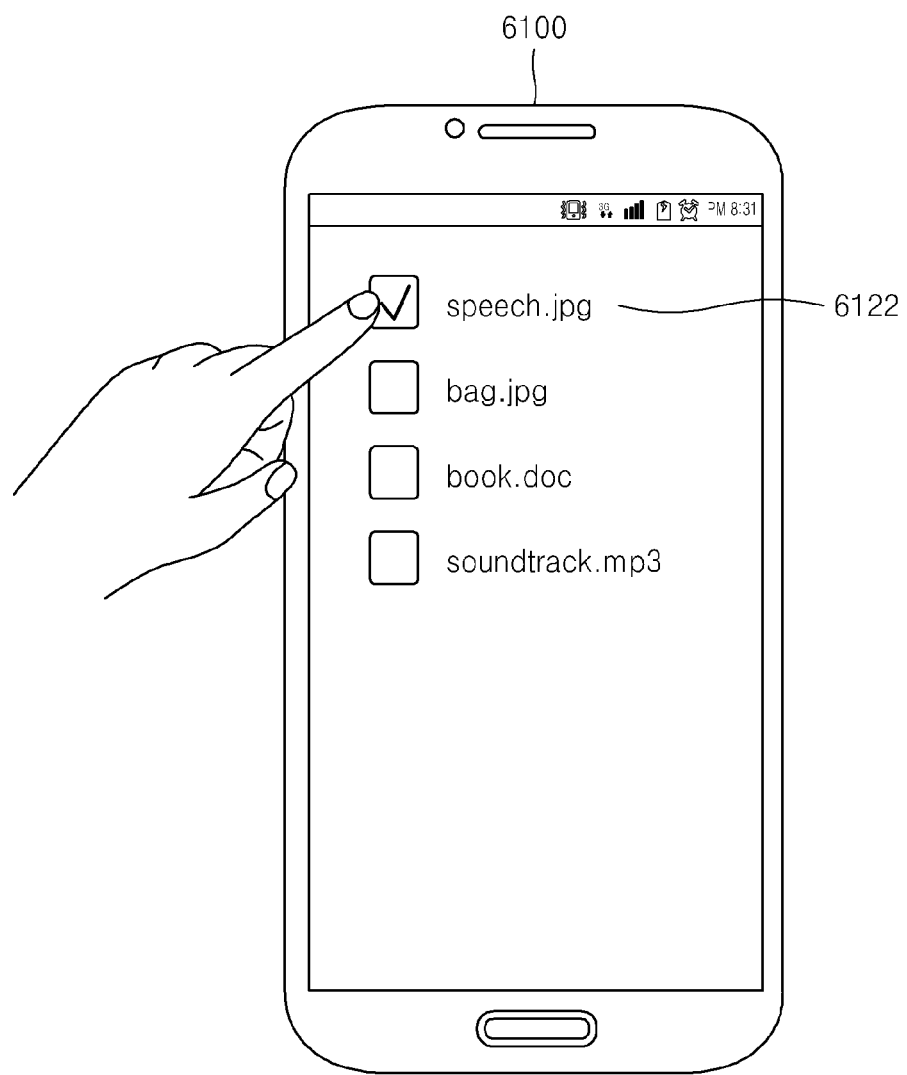

As illustrated in FIG. 61, when a user 1 selects a file open icon 6121 from the collection 6120 of the query input tools, the query input device 6100 may display a user interface for selecting a file. FIG. 62 is an exemplary diagram illustrating a user interface for selecting a file.

As illustrated in FIG. 62, when the user 1 selects a file 6122, the query input device 6100 may receive the selected file 6122 as a query component. Also, the query input device 6100 may detect a query type corresponding to the selected file 6122. For example, as illustrated in FIG. 62, when an extension of the selected file 6122 is jpg, the query input device 6100 may determine a query type, corresponding to the selected file 6122, as an image.

Figure 63:
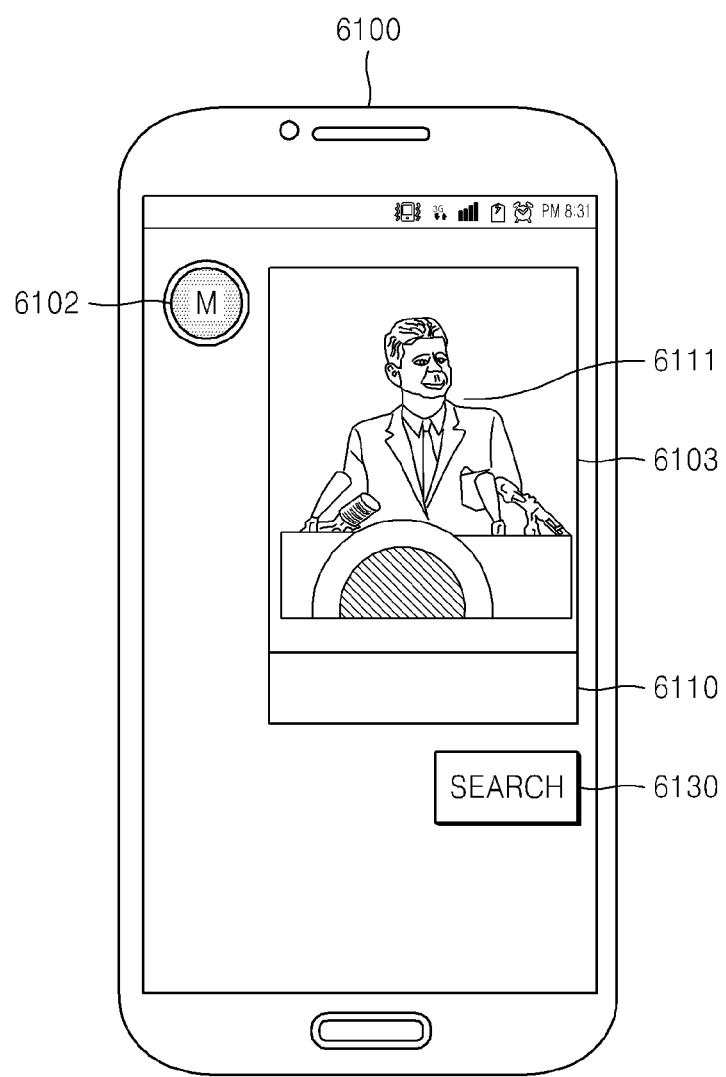
Figure 64:
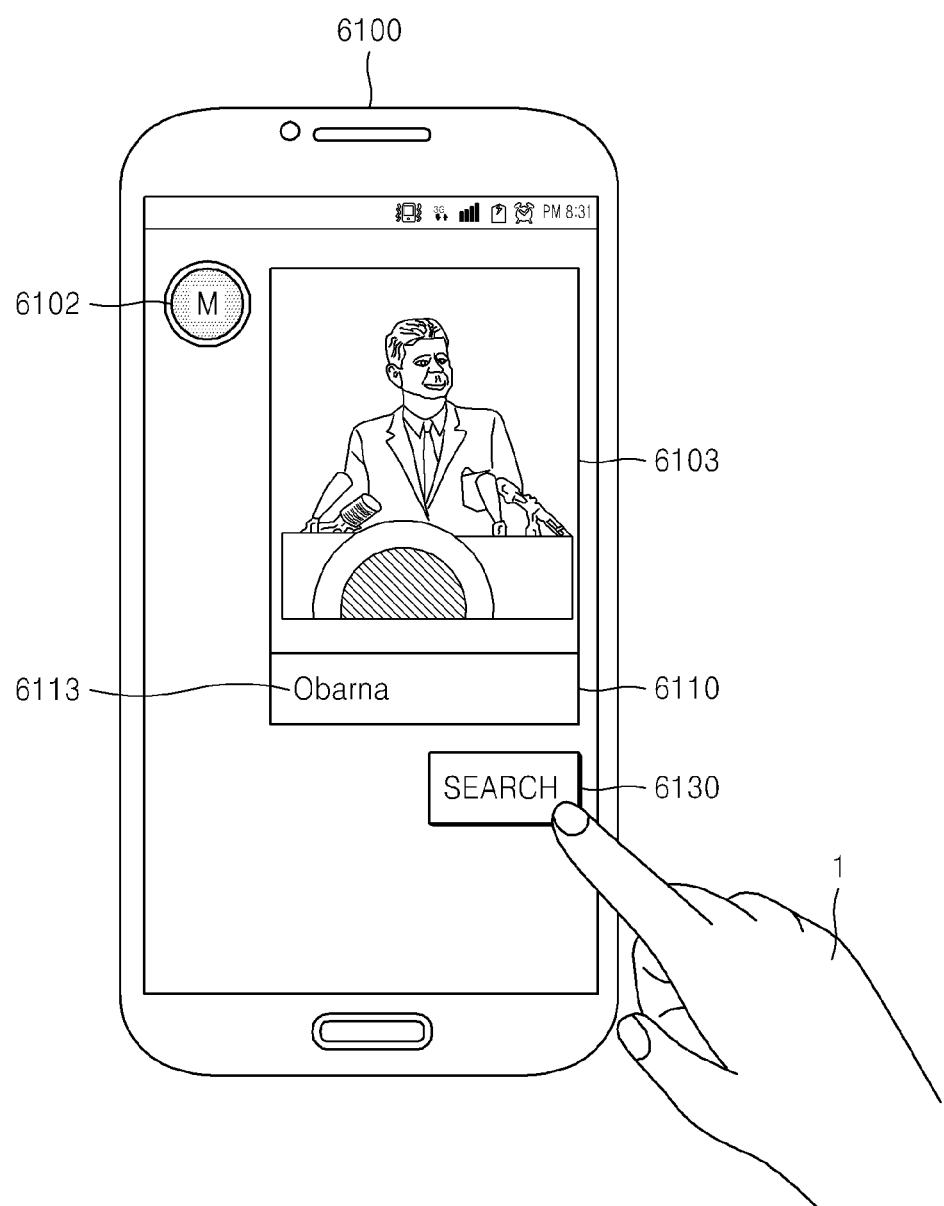
Figure 65:
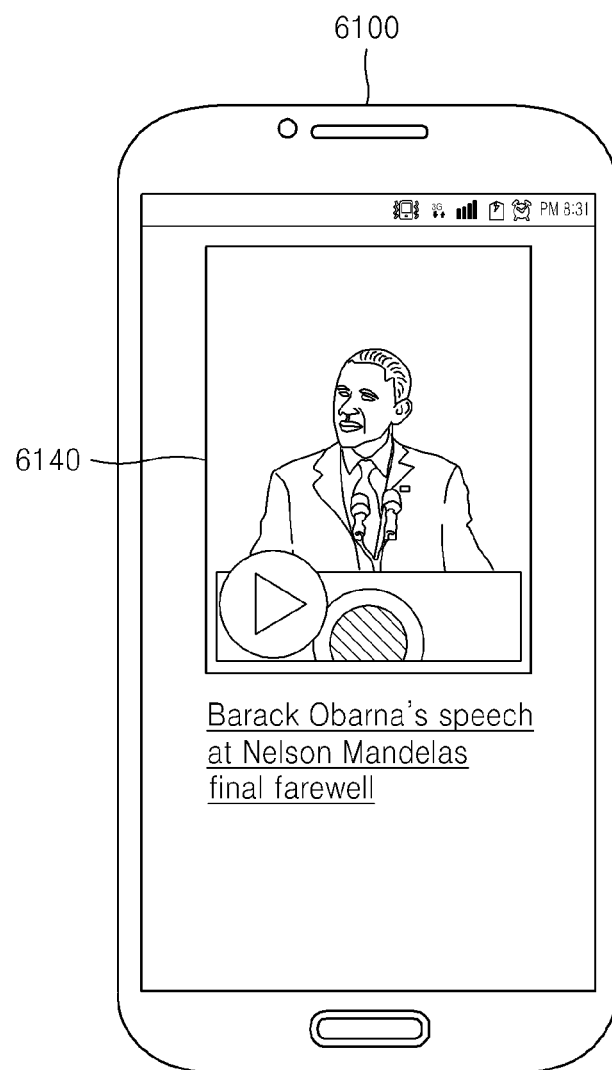

The query input device 6100 may display a received query component (i.e., a display item corresponding to the received query component) according to the detected query type. For example, referring to FIG. 63, the query input device 6100 may display a received image 6111 in a region 6103 that displays a query component. In FIG. 63, it is illustrated that the region 6103 that displays the query component is combined with a query input window 6110 including a region that receives the query component, although it is understood that the form of the region 6103 displaying the query component may vary in one or more other exemplary embodiments. For example, the region 6103 may be included in the query input window 6110, or may be disposed in a separated space. When a plurality of query components are sequentially or simultaneously received through the query input window 6110, the received plurality of query components may be accumulated or displayed together in the region 6103, or displayed in separate regions.

Moreover, the query input device 6100 may receive an additional query component through a region that receives a query component included in the query input window 6110. For example, referring to FIG. 64, a user 1 may input a text "Obarna" to the query input window 6110.

When the user 1 selects a search button 6130, the query input device 6100 may perform a search based on the accumulated query component(s) and the detected query type(s). For example, referring to FIGS. 64 and 65, the query input device 6100 may display a video 6140, in which Obarna gives a speech, as a search result on the basis of an image 6102 of a speaking scene and a text 6113 "Obarna".

Figure 66:
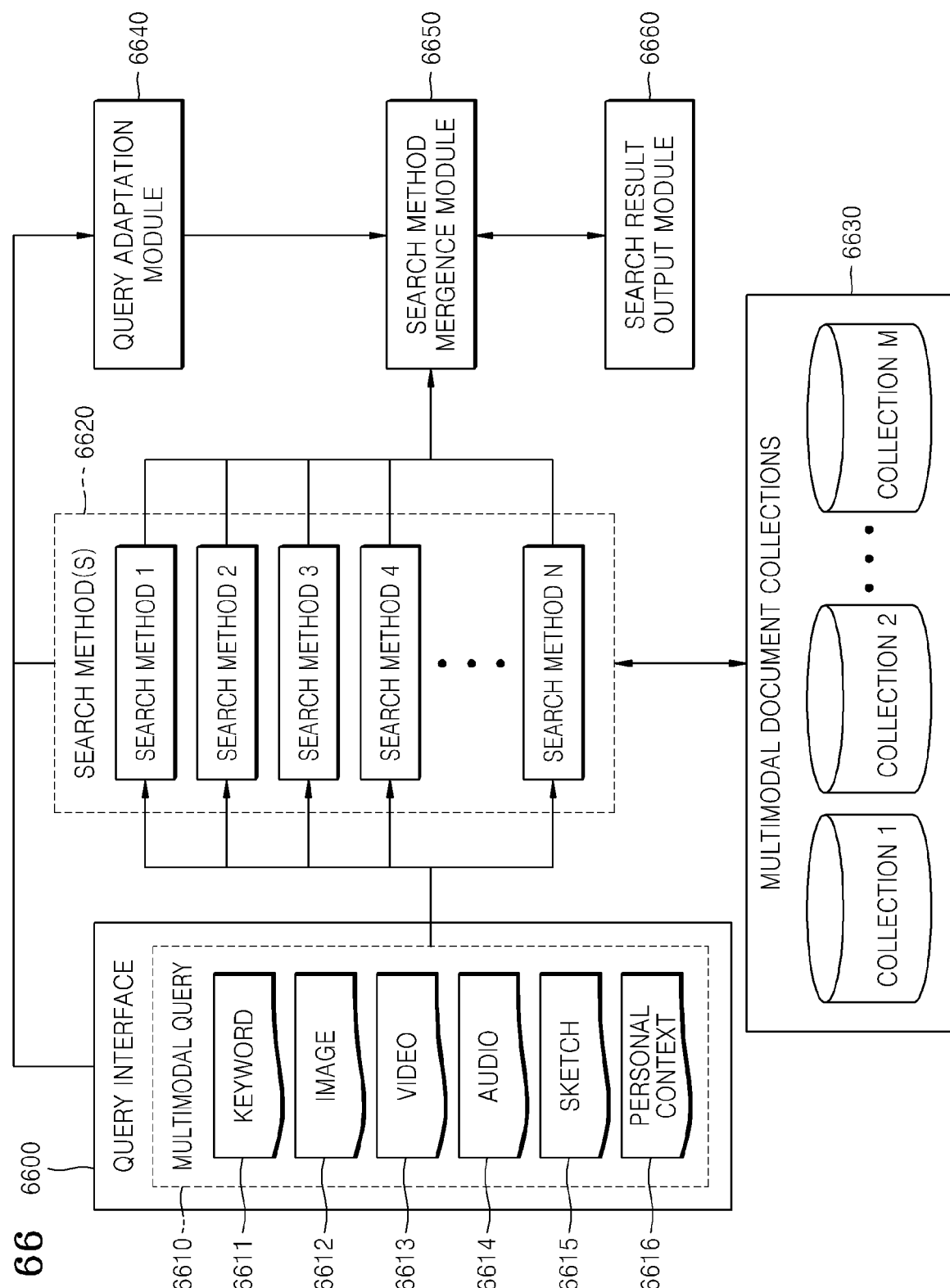
FIG. 66 is a block diagram illustrating a framework for performing a multimodal search based on a query having a plurality of query types, according to an exemplary embodiment.

FIG. 66 is a block diagram illustrating a framework for performing a multimodal search based on a query having a plurality of query types, according to an exemplary embodiment. In detail, FIG. 66 is a block diagram illustrating a framework for a query-adaptive multimodal search.

A query interface 6600 may receive a combination query 6610 in which a plurality of query components are combined. The plurality of query components may include at least one of a keyword 6611, an image 6612, a video 6613, a voice 6614, sketch information 6615, context information 6616, etc. Here, the context information 6616 denotes information, which clarifies a query, like a user's current state or personal history and preference information. For example, the context information 6616 may include a priority of a query type.

Moreover, the query interface 6600 may include a unit or device for receiving the combination query 6610. For example, the query interface 6600 may include at least one of a keyboard for receiving the keyword 6611, a camera for acquiring the image 6612 or the video 6613, a microphone for acquiring the voice 6614, a touch screen for acquiring the sketch information 6615, a sensor for acquiring the context information 6616, etc.

A search method(s) 6620 denotes an algorithm(s) that is used to match a query with a database so as to select documents depending on a suitability of the documents. For example, in a video search system, while a division search method is processing query text keywords and is matching the query text keywords with voice recognition information, a thumbnail image of a video may be matched with visual content by a single search method. The combination query 6610 may be processed by a plurality of the search methods 6620, thereby acquiring a search result.

A database that matches a query may include a document collection(s) 6630. The database includes pieces of information that are to be searched. Documents included in the database may have different modalities. Each of the documents denotes a unit of information included in the database. For example, each document may include one page on the Web, one screen in a video corpus, or one image of photo collection.

A query adaptation module 6640 may adjust a processing order of the search method(s) 6620 of processing a query. For example, when desiring to search for a photo of a famous person in a news video, weight may be given to a text search method, but when desiring to search for a sports scene, weight may be given to an example-based image search method.

A search method mergence module 6650 may merge search results obtained by the plurality of search methods 6620. The merged search results may be output through a search result output module 6660.

In the above-described exemplary embodiments, it is described that a query input window displays a display item corresponding to a query component (i.e., query input). Here, it is understood that the display item may be the query component itself or a representation of the query component (such as a waveform, a thumbnail image, a preview image, etc.). Furthermore, according to one or more exemplary embodiments, a first display item corresponding to a first query type and a second display item corresponding to a second query type may be displayed such that the first query type and the second query type are distinguishable from each other.

One or more exemplary embodiments may be implemented in the form of a storage medium that includes computer executable instructions, such as program modules, being executed by a computer. Computer-readable media may be any available media that may be accessed by the computer and includes volatile media such as RAM, non-volatile media such as ROM, and removable and non-removable media. In addition, the computer-readable media may include computer storage media and communication media. Computer storage media includes the volatile media, non-volatile media, and removable and non-removable media implemented as any method or technology for storage of information such as computer readable instructions, data structures, program modules, or other data. The medium of communication may be computer-readable instructions, and other data in a modulated data signal such as data structures, or program modules, or other transport mechanism and includes any information delivery media. Examples of the computer storage media include ROM, RAM, flash memory, CD, DVD, magnetic disks, or magnetic tapes. It is further understood that one or more of the above-described components and elements of the above-described apparatuses and devices may include hardware, circuitry, one or more processors, etc.

It should be understood that exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A method, comprising:
    obtaining an input image for a search request;
    displaying, on a display of an electronic device, the obtained input image;
    obtaining a partial region of the displayed input image;
    sending, toward an external search server, the search request based at least on the obtained partial region of the displayed input image;
    receiving, from the external search server, a search result based at least on the search request; and
    displaying, on the display together with the obtained partial region, the search result received from the external search server,
    wherein the displayed search result comprises:
        an image of a search result product corresponding to a product, an image of which is comprised in the obtained partial region, and
        a price for the search result product,
    wherein the displayed search result is displayed together with the image of the product comprised in the obtained partial region, and
    wherein the displayed input image is a single displayed image and the obtained partial region is obtained as a partial region of the single displayed image.

2. The method of claim 1, wherein the obtained partial region of the displayed input image is automatically determined based at least on an image detection analysis.

3. The method of claim 1, wherein the obtained partial region of the displayed input image is manually selected based on a user input.

4. The method of claim 3, wherein the user input comprises at least one of a drag input and a touch input with respect to the displayed input image.

5. The method of claim 1, wherein the displayed search result comprises a plurality of images.

6. The method of claim 1, wherein the obtaining the input image comprises capturing, by a camera of the electronic device, the input image.

7. The method of claim 1, wherein the sent search request comprises at least one of an image file corresponding to the obtained partial region, position information corresponding to the obtained partial region, and product information corresponding to the obtained partial region.

8. An electronic device, comprising:
    a display;
    a memory storing instructions; and
    at least one hardware processor configured to execute the instructions to at least:
        obtain an input image for a search request;
        display, on a display of an electronic device, the obtained input image;
        obtain a partial region of the displayed input image;
        send, toward an external search server, the search request based at least on the obtained partial region of the displayed input image;
        receive, from the external search server, a search result based at least on the search request; and
        display, on the display together with the obtained partial region, the search result received from the external search server, wherein the displayed search result comprises:
an image of a search result product corresponding to a product, an image of which is comprised in the obtained partial region, and
a price for the search result product,
wherein the displayed search result is displayed together with the image of the product comprised in the obtained partial region, and
wherein the displayed input image is a single displayed image and the obtained partial region is obtained as a partial region of the single displayed image.

9. The electronic device of claim 8, wherein the obtained partial region of the displayed input image is automatically determined based at least on an image detection analysis.

10. The electronic device of claim 9, wherein the obtained partial region of the displayed input image is manually selected based on a user input.

11. The electronic device of claim 8, wherein the user input comprises at least one of a drag input and a touch input with respect to the displayed input image.

12. The electronic device of claim 8, wherein the displayed search result comprises a plurality of images.

13. The electronic device of claim 8, wherein the obtained input image is obtained via a camera of the electronic device.

14. The electronic device of claim 8, wherein the sent search request comprises at least one of an image file corresponding to the obtained partial region, position information corresponding to the obtained partial region, and product information corresponding to the obtained partial region.

15. A non-transitory computer-readable recording medium having recorded thereon instructions executable by at least one hardware processor of an electronic device having a display to cause the electronic device to perform operations comprising:
obtaining an input image for a search request;
displaying, on a display of an electronic device, the obtained input image;
obtaining a partial region of the displayed input image;
sending, toward an external search server, the search request based at least on the obtained partial region of the displayed input image;
receiving, from the external search server, a search result based at least on the search request; and
displaying, on the display together with the obtained partial region, the search result received from the external search server,
wherein the displayed search result comprises:
an image of a search result product corresponding to a product, an image of which is comprised in the obtained partial region, and
a price for the search result product,
wherein the displayed search result is displayed together with the image of the product comprised in the obtained partial region, and
wherein the displayed input image is a single displayed image and the obtained partial region is obtained as a partial region of the single displayed image.

16. The non-transitory computer-readable recording medium of claim 15, wherein the obtained partial region of the displayed input image is automatically determined based at least on an image detection analysis.

17. The non-transitory computer-readable recording medium of claim 15, wherein the obtained partial region of the displayed input image is manually selected based on a user input.

18. The non-transitory computer-readable recording medium of claim 17, wherein the user input comprises at least one of a drag input and a touch input with respect to the displayed input image.

19. The non-transitory computer-readable recording medium of claim 15, wherein the displayed search result comprises a plurality of images.

20. The non-transitory computer-readable recording medium of claim 15, wherein the obtaining the input image comprises capturing, by a camera of the electronic device, the input image.

21. The non-transitory computer-readable recording medium of claim 15, wherein the sent search request comprises at least one of an image file corresponding to the obtained partial region, position information corresponding to the obtained partial region, and product information corresponding to the obtained partial region.

* * * * *